United States Patent [19]

Taga et al.

[11] Patent Number: 4,702,341
[45] Date of Patent: Oct. 27, 1987

[54] FOUR WHEEL DRIVE VEHICLE SLIPPAGE CONTROL DEVICE AND METHOD LIMITING CENTER DIFFERENTIAL ACTION ACCORDING TO INPUT TORQUE SUPPLIED THERETO

[75] Inventors: Yutaka Taga; Seitoku Kubo; Yuji Kashihara; Kunio Morisawa; Mitsuru Takada; Yasunari Nakamura, all of Toyota, Japan

[73] Assignee: Toyota Jidosha Kabushiki Kaisha, Aichi, Japan

[21] Appl. No.: 940,751

[22] Filed: Dec. 11, 1986

[30] Foreign Application Priority Data

Dec. 13, 1985 [JP] Japan ............................... 60-280662
Mar. 19, 1986 [JP] Japan ............................... 61-061801
Mar. 19, 1986 [JP] Japan ............................... 61-061802
Mar. 24, 1986 [JP] Japan ............................... 61-065314
Apr. 18, 1986 [JP] Japan ............................... 61-089347
May 6, 1986 [JP] Japan ............................... 61-105468
May 8, 1986 [JP] Japan ............................... 61-105542
May 30, 1986 [JP] Japan ............................... 61-125197
Jun. 24, 1986 [JP] Japan ............................... 61-149079
Jul. 9, 1986 [JP] Japan ............................... 61-161298

[51] Int. Cl.$^4$ .......................................... B60K 17/34
[52] U.S. Cl. .................................. 180/249; 364/424.1
[58] Field of Search ............... 180/249, 250, 248, 233; 74/688; 364/424.1

[56] References Cited

U.S. PATENT DOCUMENTS 4,558,414 12/1985 Sakakiyama ........................ 180/233

FOREIGN PATENT DOCUMENTS 2140104 11/1984 United Kingdom ................ 180/249
2172863 10/1986 United Kingdom ................ 180/249

Primary Examiner—John A. Pekar
Attorney, Agent, or Firm—Parkhurst & Oliff

[57] ABSTRACT

In a four wheel drive power transmission system for a vehicle, a power distribution device receives rotational power from an engine and provides rotational power to the combination of the front wheels and also to the combination of the rear wheels, and is controllable either to provide differential action between the front wheels combination and the rear wheels combination, or for this differential action to be at least partially inhibited by torque transmission. This slippage control device includes: a subsystem which estimates the torque being input to the power distribution device for four wheel drive from the transmission mechanism; and a subsystem which provides differential action inhibition of the power distribution device according to the thus estimated value of the torque being input to it from the transmission mechanism. The method of operation of this device is also described.

48 Claims, 32 Drawing Figures

FOUR WHEEL DRIVE VEHICLE SLIPPAGE CONTROL DEVICE AND METHOD LIMITING CENTER DIFFERENTIAL ACTION ACCORDING TO INPUT TORQUE SUPPLIED THERETO

BACKGROUND OF THE INVENTION

The present invention relates to a slippage control method and device for a four wheel drive power transmission system for a vehicle, and more particularly relates to such a slippage control method and device for such a four wheel drive power transmission system for a vehicle such as an automobile adapted for four wheel drive operation, particularly adapted to control the differential action of a differential device which is provided for distributing power between the front wheels of the vehicle and the rear wheels of the vehicle, in which the construction and operation thereof are improved so as to improve the quality of slippage control and thereby improve vehicle drivability and other operational characteristics.

The present invention has been described in Japanese Patent Application Ser. Nos. Showa 60-280662 (1985), Showa (61-061801 (1986), Showa 61-061802 (1986), Showa 61-065314 (1986), Showa 61-089347 (1986), Showa 61-105468 (1986), Showa 61-105542 (1986), Showa 61-125197 (1986), Showa 61-149079 (1986), and SHowa (61-161298 (1986), all of which were filed by an applicant the same as the entity assigned or owed duty of assignment of the present patent application; and the present patent application hereby incorporates into itself by reference the text of said Japanese Patent Applications and the claims and the drawings thereof; copies are appended to the present application.

Nowadays a greatly increasing number of automotive vehicles are being constructed with four wheel drive transmission systems, because such four wheel drive operation, in which all four wheels of the vehicle are powered from its engine via its transmission, is very suitable for driving on poor or slippery road surfaces such as in mud or over bad ground, or upon roads covered with mud, snow, ice, or rain. In other words, four wheel drive operation provides a much higher degree of stability and drivability for the vehicle in conditions where the coefficient of friction between the wheels and the surface upon which the vehicle is riding is relatively low. Also, four wheel drive operation is beneficial for aiding with hill climbing characteristics and high speed stability characteristics. Therefore, the so called full time four wheel drive type of transmission, which remains always engaged to four wheel drive without any episodes of two wheel driving, is becoming more and more popular.

In such a four wheel drive transmission system for an automotive vehicle, it is usual to provide a center differential device for distributing rotational power between the front wheels of the vehicle and the rear wheels of the vehicle, as well as the per se conventional rear differential device that provides differential action between the two rear vehicle wheels and the also per se conventional front differential device that provides differential action between the two front vehicle wheels. Such a central or front-rear differential device is provided in order to provide a differential action between said front vehicle wheels (considered as a pair) and said rear vehicle wheels (also considered as a pair) when the vehicle is turning around a curve, in order to eliminate the possibility of the occurrence of the so called tight corner braking phenomenon created by the difference in the turning radiuses of the front wheels of the vehicle and the rear wheels thereof. And such provision of such a central or front-rear differential device is effective for achieving this result. However, a problem that arises with such provision of such a central or front-rear differential device is that, if at any time even one only of the four vehicle wheels should break away from the road surface and should start to spin, then no drive power or at least severely reduced drive power is provided to the other three vehicle wheels. This type of problem is particularly likely to arise in the event that the road conditions are poor due to rain, snow, dust, dirt, or the like which deteriorate the coefficient of the vehicle wheels on the road surface, and thereby vehicle drivability can be severely reduced.

In order to counteract this effect, it has been practiced to provide a device to such a front-rear differential device which prevents said front-rear differential device from performing differential action, in a selective fashion. When such a center differential action inhibition means, which typically may be either a viscous fluid type friction coupling or may be a friction engaging means such as a hydraulic clutch or a hydraulic brake, is actuated, it causes the differential action provided by said front-rear differential device between the front vehicle wheels and the rear vehicle wheels to be at least partially prevented, and instead said front vehicle wheels, considered as a pair, are driven from the vehicle engine, and also said rear vehicle wheels, considered as a pair, are at least partially independently driven from said vehicle engine. Thereby, the problem outlined above, of loss of power to the other three vehicle wheels when one of the vehicle wheels starts to spin, is at least partially obviated. Such types of structure are at least partly disclosed, for example, in Japanese Utility Model Application Laying Open Publication Ser. No. 47-203 (1972), Japanese Patent Application Laying Open Publication Ser. No. 50-147027 (1975), Japanese Patent Application Laying Open Publication Ser. No. 55-72420 (1980), Japanese Patent Application Laying Open Publication Ser. No. 57-15019 (1982), Japanese Patent Application Laying Open Publication Ser. No. 58-20521 (1983), Japanese Patent Application Laying Open Publication Ser. No. 58-20521 (1983), Japanese Patent Application Laying Open Publication Ser. No. 59-151661 (1984), Japanese Patent Application Laying Open Publication Ser. No. 59-184025 (1984), Japanese Patent Application Laying Open Publication Ser. No. 59-206228 (1984), and Japanese Patent Application Laying Open Publication Ser. No. 60-176827 (1985), none of which is it intended hereby to admit as prior art to the present patent application except to the extent in any case required by applicable law. Also, attention should be paid to the not yet published Japanese Patent Application Ser. Nos. 60-280662 (1985), 61-65314 (1986), 61-87655 (1986), 61-105474 (1986), 61-105475 (1986), and 61-105542 (1986), again none of which is it intended hereby to admit as prior art to the present patent application except to the extent in any case required by applicable law.

Further, in the event that the front-rear differential device is of an unequal distribution type which distributes drive torque substantially unequally between the front vehicle wheels and the rear vehicle wheels, then, during periods in which said front-rear differential device is not being prohibited from providing its differential action by the above mentioned differential action inhibition means, the amounts of torque distributed between the front vehicle wheels and the rear vehicle wheels are different. In the case that the amount of torque distributed to the rear vehicle wheels is larger than the amount of torque distributed to the front vehicle wheels, the performance of the vehicle for starting off from rest is improved; while, in the converse case that the amount of torque distributed to the front vehicle wheels is larger than the amount of torque distributed to the rear vehicle wheels, the performance of the vehicle for straight ahead driving operation, and the stability of such straight ahead driving operation, are improved.

The following type of problem, however, can tend to arise in a so called full time four wheel drive vehicle fitted with such a front-rear differential device equipped with such a differential action inhibition means, in the particular case that said differential action inhibition means is a viscous fluid type friction coupling. Such a viscous fluid type friction coupling provides a drag effect which increases as the difference between the rotational speed of its rotational power input member and the rotational speed of its rotational power output member increases, and according to this action it is impossible, if the differential action inhibition means is a viscous fluid type friction coupling, for the differential action between the front wheels of the vehicle and the rear wheels of the vehicle to be totally locked up or prevented. In other words, the greater the differential rotation speed of the front vehicle wheels and the rear vehicle wheels, the greater the torque transmission capacity of the differential action inhibition means, but the front vehicle wheels and the rear vehicle wheels cannot ever be completely connected together. With increase in its capacity, such a differential action inhibition means which is a viscous fluid type friction coupling can produce an operational state close to the locked up state, but along with this increase in capacity, even when the differential rotation speed of the front vehicle wheels and the rear vehicle wheels is relatively low, the torque transmission capacity is relatively large, and therefore the differential restriction effect provided is excessive. On the other hand, if a relatively small capacity such differential action inhibition means is utilized for the viscous fluid type friction coupling, certainly when the vehicle is proceeding around a curve or corner the tight corner braking phenomenon will be prevented from occurring, but the tire slippage amount will be considerably increased, and unless the differential rotation speed of the front vehicle wheels and the rear vehicle wheels is increased during tire slippage the necessary differential restriction rate will not be obtained, and although the loss of driving power on all the vehicle wheels will actually be prevented nevertheless an increase in the driving force exerted on the tire or tires which has slipped cannot be expected. Moreover, in the case where such a viscous fluid type friction coupling is fitted as such a differential action inhibition means to the front-rear differential device, the torque transmission capacity thereof will inevitably depend strongly upon the temperature of the working fluid thereof, and it is difficult to maintain the selection of an appropriate torque transmission capacity under all conditions of use.

On the other hand, in the case that a friction engaging mechanism such as a hydraulic clutch or a hydraulic brake is fitted as such a differential action inhibition to the front-rear differential device, the typical action thereof is an ON/OFF action with complete engagement and complete disengagement, but with such switchover the manner of four wheel driving inevitably changes suddenly, and, particularly in the circumstances of a manual transmission operational regime, the decision as to when to perform such ON/OFF action for the friction engaging mechanism is difficult, and in practice appropriate configuration and operation are very difficult.

Further it has been proposed, in order to avoid the occurrence of the tight corner braking phenomenon, to release the differential action inhibition means when the vehicle is going around a corner; but it is very difficult in practice to carry out proper control of said differential action inhibition means so as to be satisfactory in all vehicle operational conditions, since driving conditions for the vehicle may rapidly fluctuate. For example, if the differential action inhibition means is always released when the vehicle is going around a corner, when the coefficient of friction between the tires on the vehicle wheels and the road surface is relatively large, the occurrence of the tight corner braking phenomenon is indeed substantially prevented, but, in the contrary case when the coefficient of friction between the tires on the vehicle wheels and the road surface is relatively small, slippage of the tires on the road surface tends to occur, and effective vehicle driving force may no longer be obtained. To carry out optimal control it is in theory preferable to detect the actual ongoing value of said coefficient of friction between the tires on the vehicle wheels and the road surface, and to carry out the control of the differential action inhibition means in the light thereof, but in practice it is difficult to detect this coefficient of friction. However, said coefficient of friction between the tires on the vehicle wheels and the road surface is the most important factor governing whether slippage of the vehicle wheels is likely to occur or not, and said coefficient of friction can vary over an extremely wide range, depending upon whether or not rain or snow is falling, and upon whether or not the road surface is covered with a film of frozen frost or with ice, among other factors.

Further, various concepts have been mulled for controlling the engagement and the release of the differential action inhibition means according to the vehicle operational conditions, but one problem has been that when said differential action inhibition means is changed over from the released condition to the engaged condition a certain delay occurs in its action, and further when said differential action inhibition means actually starts to be engaged a sudden rise in torque transmission provided thereby occurs, which can cause a large transmission shock.

The following problem also can arise with such a system. Generally, in a vehicle such as an automobile, the front wheels thereof are the wheels which provide steering action for the vehicle, and therefore, particularly if slippage should occur between the front wheels and the road surface, the quality of vehicle steering performance will be severely compromised, and vehicle stability will be deteriorated.

Further, the above outlined problems are particularly troublesome in the case that the transmission of the vehicle is of the continuously variable type: this presents some specific problems of implementation with regard to avoidance of the tight corner braking phenomenon.

Now, the previously mentioned Japanese Patent Application Laying Open Publication Serial No. 55-72420 (1980) discloses a four wheel drive device constructed so that, during four wheel drive operation, when the difference between the rate of rotation of the rear vehicle wheels and the rate of rotation of the front vehicle wheels is at least a certain value, in other words when slippage is occurring between at least one vehicle wheel tire and the road surface, the differential control clutch is engaged and the front vehicle wheels and the rear vehicle wheels are directly coupled, while at other times during four wheel drive said center differential control clutch is disengaged and the center differential device is allowed to carry out its differential function. But if the question is asked as to whether or not it is satisfactory that when slippage occurs between at least one vehicle wheel tire and the road surface the front vehicle wheels and the rear vehicle wheels always and uniformly should be completely directly coupled together, the answer is that, on the contrary, if the rear vehicle wheels and the front vehicle wheels are completely directly coupled together by said differential control clutch, then there is a danger that with variations in the coefficient of friction of the road surface being driven upon slippage will occur between the rear vehicle wheels and the front vehicle wheels together and the road surface.

In the particular case that said differential control clutch is a wet clutch, the viscosity of the lubricating oil therefor inevitably changes with temperature, and as a result the torque transmission capacity thereof fluctuates with such changes in the temperature of its lubricating oil; even for the same clutch engagement pressure, the torque transmission capacity is lower if the lubricating oil temperature is higher and on the other hand is greater if the lubricating oil temperature is lower.

Therefore, in the summer the torque transmission capacity of such a wet clutch will tend to be insufficient, whereas in the winter there is a tendency for the torque transmission capacity of such a wet clutch to be excessive.

In particular, when the lubricating oil of the wet clutch is one and the same as the operating oil of the vehicle automatic speed change device, then the temperature thereof will be influenced by the operation of the fluid torque converter of the vehicle automatic speed change device, and it is a fact that usually there are relatively large changes in the temperature of such lubricating oil, and therefore particularly in this case the fluctuation in the torque transmission capacity of the wet clutch is large, and there is a danger that the desired control of the torque transmission capacity will not be possible.

SUMMARY OF THE INVENTION

The inventors of the present invention have considered the various problems detailed above in the aforementioned type of four wheel drive type vehicle incorporating such a four wheel drive power transmission system fitted with such a center differential action inhibition means, from the point of view of the desirability of minimizing the slippage of the vehicle by inhibiting the operation of the front-rear differential device at appropriate times, while still not performing such inhibition more than actually necessary.

Accordingly, it is the primary object of the present invention to provide an improved slippage control method for a four wheel drive type vehicle, and a corresponding device for implementing said method, of the general type described above, which avoid the problems detailed above.

It is a further object of the present invention to provide such a slippage control method and device, which do not entail inhibiting the action of the front-rear differential device longer than necessary.

It is a further object of the present invention to provide such a slippage control method and device, which do not entail releasing the inhibition of the action of the front-rear differential device earlier than appropriate.

It is a further object of the present invention to provide such a slippage control method and device, which particularly inhibit the action of the front-rear differential device in vehicle operational conditions in which vehicle wheel slippage is particularly likely to occur.

It is a further object of the present invention to provide such a slippage control method and device, which always provide an appropriate amount of such front-rear differential device differential action inhibition.

It is a further object of the present invention to provide such a slippage control method and device, which have the capacity completely to lock together the front vehicle wheels and the rear vehicle wheels, in appropriate circumstances.

It is a yet further object of the present invention to provide such a slippage control method and device, which are particularly effective, in the case that the vehicle front-rear differential device is of an unequal distribution type which distributes drive torque substantially unequally between the front vehicle wheels and the rear vehicle wheels.

It is a yet further object of the present invention to provide such a slippage control method and device, which are effective for arranging appropriate distribution of drive torque between the front vehicle wheels and the rear vehicle wheels.

It is a yet further object of the present invention to provide such a slippage control method and device, which prevent the occurrence of the tight corner braking phenomenon.

It is a yet further object of the present invention to provide such a slippage control method and device, which thus prevent the occurrence of the tight corner braking phenomenon, even although the coefficient of friction between the tires on the vehicle wheels and the road surface is not required to be directly detected.

It is a yet further object of the present invention to provide such a slippage control method and device, which avoid the loss of drive power on all the vehicle wheels due to slippage of just one wheel.

It is a yet further object of the present invention to provide such a slippage control method and device, which maximize vehicle controllability.

It is a yet further object of the present invention to provide such a slippage control method and device, which are not subject to problems due to delay in increase of torque transmission amount provided by a means for such front-rear differential device differential action inhibition.

It is a yet further object of the present invention to provide such a slippage control method and device, which minimize transmission shock.

It is a yet further object of the present invention to provide such a slippage control method and device, which maximize good vehicle hill climbing characteristics.

It is a yet further object of the present invention to provide such a slippage control method and device, which maximize vehicle forward running stability.

It is a yet further object of the present invention to provide such a slippage control method and device, which maximize vehicle turning stability.

It is a yet further object of the present invention to provide such a slippage control method and device, which maximize vehicle steering stability.

It is a yet further object of the present invention to provide such a slippage control method and device, which particularly ensure that the wheels of the vehicle which provide steering action therefor—typically the front wheels thereof—do not undergo undue slippage.

It is a yet further object of the present invention to provide such a slippage control method and device, which are particularly useful in conditions of slippery road surface such as due to rain, sleet, snow, dust, sand, or dirt.

It is a yet further object of the present invention to provide such a slippage control method and device, which are not particularly sensitive to working fluid temperature.

It is a yet further object of the present invention to provide such a slippage control method and device, which can be well applied to the case of a manual type transmission regime.

It is a yet further object of the present invention to provide such a slippage control method and device, which avoids excessive transmission of drive torque from a vehicle wheel which is slipping to a vehicle wheel which is not slipping.

It is a yet further object of the present invention to provide such a slippage control method and device, which prevent slippage from being extended to those of the vehicle wheels which are not currently slipping.

It is a yet further object of the present invention to provide such a slippage control method and device, which are particularly applicable in the case that the transmission of the vehicle to which they are to be applied is of the continuously variable type.

It is a yet further object of the present invention to provide such a slippage control method and device, which are particularly helpful in the case that the road surface on which the vehicle to which they are to be applied is covered with ice or snow.

It is a yet further object of the present invention to provide such a slippage control method and device, which are particularly helpful in the case that the road surface on which the vehicle to which they are to be applied is undergoing precipitation such as falling of rain or sleet or snow or the like.

It is a yet further object of the present invention to provide such a slippage control method and device, which are corrected for lubricant temperature in the vehicle transmission system.

It is a yet further object of the present invention to provide such a slippage control method and device, which are suitable for both winter and summer application.

According to the most general device aspect of the present invention, these and other objects are attained by, for a four wheel drive power transmission system for a vehicle with two front wheels, two rear wheels, a transmission mechanism, and an engine, comprising a power distribution device for four wheel drive which receives rotational power from said engine via said transmission mechanism and which provides said rotational power to the combination of the front wheels of said vehicle and also to the combination of the rear wheels of said vehicle, said power distribution device for four wheel drive comprising a means for providing differential action between said combination of said front wheels of said vehicle and said combination of said rear wheels of said vehicle, and a means for selectively inhibiting its said differential action by providing torque transmission capacity: a slippage control device, comprising: (a) a means for estimating the torque being input to said power distribution device for four wheel drive from said transmission mechanism; and: (b) a means for controlling the torque transmission capacity of said differential action inhibition means of said power distribution device for four wheel drive according to the thus estimated value of said torque being input to said power distribution device for four wheel drive from said transmission mechanism; and, according to the most general method aspect of the present invention, these and other objects are attained by, for a four wheel drive power transmission system for a vehicle with two front wheels, two rear wheels, a transmission mechanism, and an engine, comprising a power distribution device for four wheel drive which receives rotational power from said engine via said transmission mechanism and which provides said rotational power to the combination of the front wheels of said vehicle and also to the combination of the rear wheels of said vehicle, said power distribution device for four wheel drive comprising a means for providing differential action between said combination of said front wheels of said vehicle and said combination of said rear wheels of said vehicle, and a means for selectively inhibiting its said differential action by providing torque transmission capacity; a slippage control method, wherein: (a) the torque being input to said power distribution device for four wheel drive from said transmission mechanism is estimated; and: (b) the torque transmission capacity of said differential action inhibition means of said power distribution device for four wheel drive is controlled according to the thus estimated value of said torque being input to said power distribution device for four wheel drive from said transmission mechanism. Further, according to specializations of the present invention, the above specified and other objects may be more particularly attained by a slippage control method as described above, said transmission mechanism being selectively engagable to one or another of at least two speed stages, wherein said torque transmission capacity of said differential action inhibition means of said power distribution device for four wheel drive is further controlled according to the currently engaged speed stage of said transmission mechanism; and by a slippage control device as described above, said transmission mechanism being selectively engagable to one or another of at least two speed stages, wherein said means for controlling said torque transmission capacity of said differential action inhibition means of said power distribution device for four wheel drive further does so according to the currently engaged speed stage of said transmission mechanism. The means for controlling said torque transmission capacity of said differential action inhibition means may be so constituted as to freely vary its torque transmission capacity according to a control signal which it receives from the outside, and as such a means for controlling said torque transmission capacity of said differential action inhibition means there may for example be used a hydraulic servo type of wet multi plate clutch, or an electromagnetic powder type clutch.

The slippage control device and method of the present invention, as specified above, are effective because, since the torque transmission capacity of the differential action inhibition means is controlled according to the value of said torque being input to said power distribution device for four wheel drive from said transmission mechanism, and for example is increased along with increase of said input torque, an appropriate distribution of drive torque between the front vehicle wheels and the rear vehicle wheels is performed according to said value of input torque being supplied to the power distribution device for four wheel drive from the transmission mechanism, whereby the vehicle can be driven with as far as possible the maximum drive force practicable in view of the driving conditions at the time. When one vehicle wheel is slipping, without producing slippage in another vehicle wheel, the slippage amount of the already slipping wheel can be reduced, and, even during this slipping, a relatively high proportion of the vehicle driving force is transmitted to the road surface, and at this time also, within the limits of slippage not occurring on all wheels, the vehicle can be driven with as far as possible the maximum driving force.

Furthermore, in the four wheel drive device according to the present invention, by controlling the torque transmission capacity of the differential action inhibition means according to the currently engaged speed stage of the transmission mechanism in addition to the input torque specified as above, by for example increasing said torque transmission capacity the lower is the currently engaged speed stage of said transmission mechanism, under driving conditions in which, because the engaged speed stage of the transmission mechanism is a relatively low speed stage, there is a tendency for the input torque to increase, the torque transmission capacity of the differential action inhibition means is set to be larger, and thereby it is easier for the differential action of said power distribution device for four wheel drive to be completely prevented, in other words for said power distribution device to be put into the locked up state, and a rotational speed difference between the front vehicle wheels and the rear vehicle wheels will no longer be present, and even if one vehicle wheel is in the slippage state and vehicle drive power is lost on it, the possibility of a state such that the drive power is lost on all vehicle wheels is positively prevented.

By, furthermore, controlling the torque transmission capacity of said differential action inhibition means according to said input torque, and when that input torque is relatively small setting also the torque transmission capacity to be relatively small, and by, further, when the accelerator pedal which controls the load on the vehicle power source (the engine) is released so as to cause an engine operational condition being substantially the idling engine operational condition, setting the torque transmission capacity of the differential action inhibition means to substantially zero, thereby, in many cases, in conformity with the fact that the driving of the vehicle around a curve or a corner is carried out with low or substantially idling engine load or with the accelerator pedal released, in such a turning condition the torque transmission capacity of the differential action inhibition means is set to an extremely low value or zero, and thereby the differential action of said power distribution device for four wheel drive is effectively performed, so that occurrence of the tight corner braking phenomenon is, so to speak, prevented before the event.

Further, according to a more particular device aspect of the present invention, the above specified objects and others are attained by a slippage control device as first defined above, wherein said means for controlling the torque transmission capacity of said differential action inhibition means of said power distribution device for four wheel drive controls said differential action inhibition means to be substantially locked up and to have an effectively infinite torque transmission capacity, when said torque being input to said power distribution device for four wheel drive from said transmission mechanism is less than a determinate value; and on the other hand controls said differential action inhibition means to be at least somewhat incompletely engaged and to have a limited torque transmission capacity, when said torque being input to said power distribution device for four wheel drive from said transmission mechanism is greater than said determinate value; and, according to a more particular method aspect of the present invention, the above specified objects and others are attained by a slippage control method as first defined above, wherein said means for controlling the torque transmission capacity of said differential action inhibition means of said power distribution device for four wheel drive controls said differential action inhibition means to be substantially locked up and to have an effectively infinite torque transmission capacity, when said torque being input to said power distribution device for four wheel drive from said transmission mechanism is less than a determinate value; and on the other hand controls said differential action inhibition means to be at least somewhat incompletely engaged and to have a limited torque transmission capacity, when said torque being input to said power distribution device, for four wheel drive from said transmission mechanism is greater than said determinate value.

According to the above described control device and method, the four wheel drive differential control clutch is as far as possible completely engaged, and relative rotation of the front and rear wheels is thereby prevented whenever possible, and thereby four wheel drive operation of the vehicle is effectively exploited as far as practicable; while, on the other hand, at times when the tight corner braking phenomenon is liable to occur, when as a result of a fall in the driving force the vehicle driver increases the output of the engine, the input torque therefore increases, and the four wheel drive differential control clutch goes into the incompletely engaged state, and relative rotation of the front wheels and rear wheels is at least somewhat permitted, and thereby severe occurrence of the tight corner braking phenomenon is prevented.

According to the above described control concept, when the coefficient of friction between the tires fitted to the vehicle wheels and the road surface is low, slipping likely occurs between the tires and the road surface; while, on the other hand, when the coefficient of friction between the tires fitted to the vehicle wheels and the road surface is high, slipping of the four wheel drive control clutch likely occurs, and because of these facts at all times occurrence of the tight corner braking phenomenon is avoided.

Further, according to a more particular device aspect of the present invention, the above specified objects and others are attained by a slippage control device as first defined above, wherein said means for controlling the torque transmission capacity of said differential action inhibition means of said power distribution device for four wheel drive controls said torque transmission capacity to be a determinate non zero value, when said torque being input to said power distribution device for four wheel drive from said transmission mechanism is substantially zero; and, according to a more particular method aspect of the present invention, the above specified objects and others are attained by a slippage control method as first defined above, wherein said means for controlling the torque transmission capacity of said differential action inhibition means of said power distribution device for four wheel drive controls said torque transmission capacity to be a determinate non zero value, when said torque being input to said power distribution device for four wheel drive from said transmission mechanism is substantially zero. And, further, according to a yet more particular device aspect of the present invention, the above specified objects and others are attained by a slippage control device as just defined above, wherein, as said torque being input to said power distribution device for four wheel drive from said transmission mechanism increases from substantially zero, said means for controlling the torque transmission capacity of said differential action inhibition means of said power distribution device for four wheel drive controls said torque transmission capacity to be increased; and, according to a more particular method aspect of the present invention, the above specified objects and others are attained by a slippage control method as just defined above, wherein, as said torque being input to said power distribution device for four wheel drive from said transmission mechanism increases from substantially zero, said means for controlling the torque transmission capacity of said differential action inhibition means of said power distribution device for four wheel drive controls said torque transmission capacity to be increased.

According to the above described control device and method, the differential action inhibition means is never completely disengaged, and thereby the engagement of said differential action inhibition means, or in other words the control thereof in order to increase the torque transmission capacity, can be carried out with good responsiveness, there is no sudden increase in the torque transmission capacity thereof, and no large transmission shock is likely to be produced.

Also, according to the above described control device and method according to this aspect of the present invention, in the case that a center differential device is provided, whenever one wheel slips with respect to the road surface, at least to the extent of the portion of the torque transmission capacity of the differential action inhibition means corresponding to said certain amount torque is transmitted to the wheels which are not slipping, and thereby in all cases a loss of power to all the vehicle wheels caused by the differential effect of the center differential device as a result of one vehicle wheel only slipping is positively and definitely avoided.

Further, according to a more particular device aspect of the present invention, the above specified objects and others are attained by a slippage control device as first defined above, said two front wheels of said vehicle being steering wheels thereof, wherein said means for controlling the torque transmission capacity of said differential action inhibition means of said power distribution device for four wheel drive so controls said torque transmission capacity so as to prevent said two front vehicle wheels from slippage; and, according to a more particular method aspect of the present invention, the above specified objects and others are attained by a slippage control method as first defined above, said two front wheels of said vehicle being steering wheels thereof, wherein said means for controlling the torque transmission capacity of said differential action inhibition means of said power distribution device for four wheel drive so controls said torque transmission capacity so to prevent said two front vehicle wheels from slippage. Further, according to a yet more particular device aspect of the present invention, the above specified objects and others are attained by a slippage control device as just defined above, wherein said means for controlling the torque transmission capacity of said differential action inhibition means of said power distribution device for four wheel drive controls said torque transmission capacity in a manner substantially proportional to said torque being input to said power distribution device for four wheel drive from said transmission mechanism; and, according to a yet more particular method aspect of the present invention, the above specified objects and others are attained by a slippage control method as just defined above, wherein said means for controlling the torque transmission capacity of said differential action inhibition means of said power distribution device for four wheel drive controls said torque transmission capacity in a manner substantially proportional to said torque being input to said power distribution device for four wheel drive from said transmission mechanism.

According to the particular control devices and methods described above according to these aspects of the present invention, the drive torque distribution ratio with respect to the front vehicle wheels and the rear vehicle wheels is controlled by the differential action inhibition means in such a manner that the application of an excessive drive torque to the front vehicle wheels is avoided, and thereby slippage of the front vehicle wheels with respect to the road surface is avoided.

Further, according to a more particular device aspect of the present invention, the above specified objects and others are attained by a slippage control device as just defined above, wherein the proportionality constant by which said means for controlling the torque transmission capacity of said differential action inhibition means of said power distribution device for four wheel drive controls said torque transmission capacity thereof in relation to said torque being input to said power distribution device for four wheel drive from said transmission mechanism is varied according to manual control; and, according to a more particular aspect of the present invention, the above specified objects and others are attained by a slippage control method as just defined above, wherein the proportionality constant by which said means for controlling the torque transmission capacity of said differential action inhibition means of said power distribution device for four wheel drive controls said torque transmission capacity thereof in relation to said torque being input to said power distribution device for four wheel drive from said transmission mechanism is varied according to manual control.

According to the above described particular concepts, since the torque transmission capacity of the differential action inhibition means of said power distribution device for four wheel drive is increased proportionally in response to increase in said torque being input to said power distribution for four wheel drive from said transmission mechanism, an appropriate distribution of drive torque between the front vehicle wheels and the rear vehicle wheels is made according to the input torque, whereby the vehicle can be driven with as far as possible the maximum drive force for the driving conditions at the time; when one vehicle wheel is slipping, without producing slippage in another vehicle wheel, the slippage amount of the already slipping vehicle wheel can be reduced, and, even during this slippage, a considerable part of the applied drive force is transmitted to the road surface, and at this time also within the limits of slippage not occurring on all the vehicle wheels, the vehicle can be driven with as far as possible the maximum driving force; and, furthermore, the degree of differential restriction provided by said differential action inhibition means can be freely manually set according to the particular preference of the vehicle driver and according to the decision of said vehicle driver, so that driving conditions can be obtained which reflect, even more than in the previously described possibilities for the present invention, the preferences and intentions of said vehicle driver.

Further, according to a more particular device aspect of the present invention, the above specified objects and others are attained by a slippage control device as first defined above, said transmission mechanism being of a continuously variable type, wherein the torque transmission capacity of said differential action inhibition means of said power distribution device for four wheel drive is controlled according to the estimated value of torque being input to said power distribution device for four wheel drive from said transmission mechanism and according to the speed ratio currently being provided by said transmission mechanism; and, according to a more particular method aspect of the present invention, the above specified objects and others are attained by a slippage control method as first defined above, said transmission mechanism being of a continuously variable type, wherein the torque transmission capacity of said differential action inhibition means of said power distribution device for four wheel drive is controlled according to the estimated value of torque being input to said power distribution device for four wheel drive from said transmission mechanism and according to the speed ratio currently being provided by said transmission mechanism.

According to the above described concepts, since the torque transmission capacity of the differential action inhibition means is controlled according to the estimated value of torque being input to said power distribution device for four wheel drive from said transmission mechanism and according to the speed ratio currently being provided by said transmission mechanism, the torque transmission capacity is increased with an increase in the input torque to the transmission mechanism, and thereby the distribution of drive torque between the front wheels and the rear wheels is controlled appropriately according to the input torque, whereby the vehicle can be driven with as far as possible the maximum drive force for the various driving conditions; when one vehicle wheel is slipping, without producing slippage in another vehicle wheel, the slippage amount of the already slipping vehicle wheel can be reduced, and even during this slipping, much of the drive force is transmitted to the road surface, and at this time also within the limits of slippage not occurring on all vehicle wheels, the vehicle can be driven with as far as possible the maximum drive force.

Furthermore, if when the engine output torque is a low value close to zero the torque transmission capacity is also set to be small, and by, further, when the accelerator pedal which controls the load of the engine or other power source is released, setting the torque transmission capacity of the differential action inhibition means to substantially zero, in many cases, in conformity with the fact that turning a corner is carried out with low load or with the accelerator pedal released, while turning, the torque transmission capacity of the differential action inhibition means is set to an extremely low value or zero, and thereby the center differential device carries out effective differential action, so that occurrence of the tight corner braking phenomenon is prevented before the event.

Further, according to a more particular device aspect of the present invention, the above specified objects and others are attained by a slippage control device as first defined above, further comprising a means for detecting the coefficient of friction of the road surface on which said vehicle is running, wherein the torque transmission capacity of said differential action inhibition means of said power distribution device for four wheel drive is controlled according to the thus detected value of road surface coefficient of friction, so as to be relatively higher when said coefficient of friction is low and to be relatively lower when said coefficient of friction is high; and, according to a more particular method aspect of the present invention, the above specified objects and others are attained by a slippage control method as first defined above, wherein further the coefficient of friction of the road surface on which said vehicle is running is detected, and wherein the torque transmission capacity of said differential action inhibition means of said power distribution device for four wheel drive is controlled according to the thus detected value of road surface coefficient of friction, so as to be relatively higher when said coefficient of friction is low and to be relatively lower when said coefficient of friction is high.

According to the above described particular concepts, by setting the torque transmission capacity of the differential action inhibition means according to the coefficient of friction of the road surface being driven on, the locking up of the different device is carried out appropriately, occurrence of the tight corner braking phenomenon is avoided, and, even if one vehicle wheel slips, a reduction in the drive power to all the vehicle wheels is avoided.

Further, according to a more particular device aspect of the present invention, the above specified objects and others are attained by a slippage control device as first defined above, further comprising a means for detecting the external temperature, wherein the torque transmission capacity of said differential action inhibition means of said power distribution device for four wheel drive is controlled according to the thus detected value of external temperature, so as to be relatively higher when said external temperature is low and so as to be relatively lower when said external temperature is high; and, according to a more particular method aspect of the present invention, the above specified objects and others are attained by a slippage control method as first defined above, wherein the torque transmission capacity of said differential action inhibition means of said power distribution device for four wheel drive is controlled according to the detected value of external temperature, so as to be relatively higher when said external temperature is low and so as to be relatively lower when said external temperature is high. And in both cases, optionally but preferably, the control of said torque transmission capacity of said differential action inhibition means of said power distribution device for four wheel drive is performed according to the detected value of external temperature, so as to be relatively higher when said external temperature is below approximately 0° C. and so as to be relatively lower when said external temperature is higher than approximately 0° C. The above defined slippage control device may further comprise a means for detecting external precipitation conditions, in which case said torque transmission capacity of said differential action inhibition means of said power distribution device for four wheel drive should be further controlled according to the thus detected external conditions, so as to be relatively higher when external precipitation is occurring and so as to be relatively lower when external precipitation is not occurring, and in this case said means for detecting external precipitation conditions may preferably be a wiper motor switch; and in the above define slippage control method external precipitation conditions may further be detected, and said torque transmission capacity of said differential action inhibition means of said power distribution device for four wheel drive may further be controlled according to the thus detected external conditions, so as to be relatively higher when external precipitation is occurring and so as to be relatively lower when external precipitation is not occurring, in which case said external precipitation conditions may preferably be detected according to the setting of a wiper motor switch.

According to the above described concepts, when the outside temperature is not more than the certain value of for example 0° C., and particularly when the road surface being driven on is being wettened by rain or snow or the like which may be falling so that a wet road surface is being driven on and the outside temperature is not more than the certain value—this being the time when there is a particular danger of the road surface being driven on being frozen—then at this time the torque transmission capacity of the differential restriction device is increased, and the drive state of the vehicle approaches the four wheel drive state with the front and rear wheels being substantially directly coupled, and thereby the drivability of the vehicle is improved and the vehicle wheels do not so easily slip with respect to the road surface being driven on, and even if one of the front wheels or rear wheels is on such a road surface where it is easy for slippage to occur, it is made harder for said wheel or wheels to slip.

Further, according to a more particular device aspect of the present invention, the above specified objects and others are attained by a slippage control device as first defined above, further comprising a means for detecting external precipitation conditions, wherein said torque transmission capacity of said differential action inhibition means of said power distribution device for four wheel drive is further controlled according to the thus detected external precipitation conditions, so as to be relatively higher when external precipitation is occurring and so as to be relatively lower when external precipitation is not occurring; and, according to a more particular method aspect of the present invention, the above specified objects and others are attained by a slippage control method as first defined above, wherein further external precipitation conditions are detected, and wherein said torque transmission capacity of said differential action inhibition means of said power distribution device for four wheel drive is further controlled according to the thus detected external precipitation conditions, so as to be relatively higher when external precipitation is occurring and so as to be relatively lower when external precipitation is not occurring. In either case, said external precipitation conditions may be detected according to the setting of a wiper motor switch; and in such a case, optionally but preferably, said torque transmission capacity of said differential action inhibition means of said power distribution device for four wheel drive is further controlled according to the wiper speed set on said wiper switch, so as to be relatively higher when a relatively higher wiper speed is set and so as to be relatively lower when a relatively lower wiper speed is set. Further, said torque transmission capacity of said differential action inhibition means of said power distribution device for four wheel drive may be only so controlled, when said wiper switch has been set for at least a certain time interval.

According to the above described concepts, although during rainfall or snowfall the road surface being driven on is wettened by rain or snow and becomes a wet or frozen over or icy road surface, and thereby it becomes easier for one or more of the vehicle wheels to slip with respect to the road surface being driven on, but nevertheless, since at this time the torque transmission capacity of the differential action inhibition means is increased and the drive state of the vehicle approaches the four wheel drive state with the front and rear vehicle wheels being directly coupled together, thereby the drivability of the vehicle is improved and the vehicle wheels do not so easily slip with respect to the road surface being driven on, and, even if one of the front vehicle wheels or rear vehicle wheels does in fact slip with respect to the road surface being driven on, a reduction in the drive force to all of the vehicle wheels is avoided.

As a simple detection method for detecting rainfall or snowfall, the detection may be detection of the operation of a wiper motor provided on the vehicle, as suggested above, and since the operating speed of the wiper motor will be higher the greater the amount of rain or snow falling, thus, by increasing the torque transmission capacity of the differential restriction device when the operating speed of the wiper motor is higher, the more severe the state of falling rain or snow the closer the four wheel drive state comes to that four wheel drive state in which the front and rear wheels are directly coupled together, and thus the driving stability on a wet road surface is even further improved.

Finally, according to a yet more particular device aspect of the present invention, the above specified objects and others are attained by a slippage control device as first defined above, further comprising a means for detecting temperature of lubricant being supplied to said differential action inhibition means of said power distribution device for four wheel drive, wherein said differential action inhibition means is further controlled according to the thus detected temperature of lubricant supplied thereto; and, according to a yet more particular method aspect of the present invention, the above specified objects and others are attained by a slippage control method as first defined above, wherein further the temperature of lubricant being supplied to said differential action inhibition means of said power distribution device for four wheel drive is detected, and wherein said differential action inhibition means is further controlled according to the thus detected temperature of lubricant supplied thereto.

According to the concept described above, as the temperature of the lubricant of the differential action inhibition means changes, the engagement pressure for said differential action inhibition means is changed (typically, as the temperature of the lubricant of the differential action inhibition means increases, the engagement pressure of said differential action inhibition means is increased), whereby fluctuations in the torque transmission capacity of said differential action inhibition means due to fluctuations in the temperature of the lubricant being supplied thereto are compensated for, and even if there is a large change in the temperature of the lubricant of the differential action inhibition means, control of the torque transmission capacity of the differential action inhibition means can be carried out positively according to the desired control characteristics.

BRIEF DESCRIPTION OF THE DRAWINGS

The present invention will now be described with respect to the preferred embodiments of the device and of the method thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and flow chart steps and so on in the various figures relating to one preferred embodiment, and like parts and gaps and spaces and flow chart steps and so on in figures relating to different preferred embodiments; and:

DESCRIPTION OF THE PREFERRED EMBODIMENTS

The present invention will now be described with reference to the preferred embodiments thereof, and with reference to the figures.

First Exemplary Overall Vehicle Power Train Structure

Figure 1:
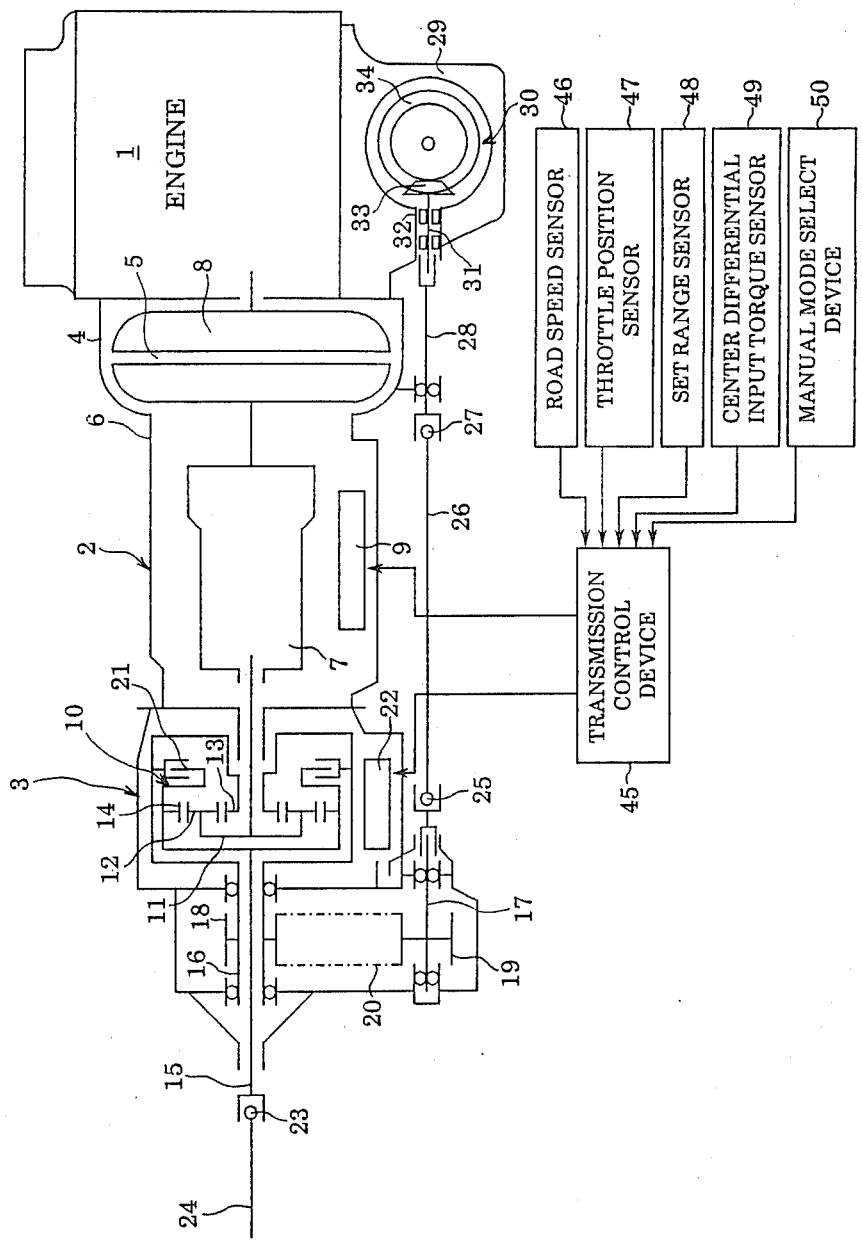
FIG. 1 is a schematic longitudinal skeleton view of a vehicle power train and of a control system therefor which incorporates certain ones of the preferred embodiments of the slippage control device of the present invention, for practicing the respective preferred method embodiments.

FIG. 1 is a schematic longitudinal skeleton view of a vehicle power train which incorporates some of the preferred embodiments of the four wheel drive power transmission system slippage control device of the present invention, said device performing corresponding method embodiments. In this figure, the reference numeral 1 denotes an internal combustion engine of said vehicle, which is mounted, in this first exemplary case, longitudinally in the front engine room (not particularly shown) of said vehicle. And the reference numeral 2 denotes an automatic speed change device (automatic transmission) of a per se known type, while 3 denotes a four wheel drive power transfer device which is always operating in so called full time four wheel drive mode, so as always to drive both the rear pair of wheels of the vehicle and also the front pair of wheels of the vehicle, albeit with the differential action provided by this four wheel drive power transfer device 3 being selectably either provided or not provided, as will be explained in detail hereinafter.

In more detail, the automatic speed change device 2 incorporates a fluid torque converter 5 of a per se known construction, and the power input shaft of this fluid torque converter 5 is connected to and receives rotational power from a crank shaft of the internal combustion engine 1. And the fluid torque converter 5 is housed within a torque converter housing 4 fitted against and secured to the main body of the internal combustion engine 1, while the automatic speed change device 2 comprises a gear transmission mechanism 7, which is likewise housed within a speed change device housing fitted against and secured to the torque converter housing 4. And the input shaft of the gear transmission mechanism 7 is connected to and receives rotational power from the power output shaft of the fluid torque converter 5; and thereby the gear transmission mechanism 7 receives rotational power from the internal combustion engine 1, with a certain degree of slippage and also torque amplification being provided for said rotational power by the fluid torque converter 5 (unless a lock up clutch thereof, if provided thereto, is activated) as is per se conventional. This gear transmission mechanism 7 may for the purposes of this specification be of a per se known type incorporating various planetary gear mechanisms and friction engaging mechanisms such as clutches and brakes, and, according to selective actuation of said friction engaging mechanisms provided by an electrically controlled electric/hydraulic control mechanism 9 of a per se known sort including various speed change solenoids and so on, provides any one of a plurality of speed reduction stages between its said power input shaft and its power output shaft, its said power output shaft driving the four wheel drive power transfer device 3.

This four wheel drive power transfer device 3 incorporates a center differential device 10 of a planetary gear wheel type for providing full time differential action between the front wheels of the vehicle and the rear wheels of the vehicle during the full time four wheel drive operation thereof. Now the detailed construction of this center differential device 10 will be explained. It comprises a sun gear 13, a ring gear 14, a carrier 11, and a plurality of planetary pinions 12 rotatably mounted to said carrier 11 and meshed between the sun gear 13 and the ring gear 14 and performing planetary movement between them in a per se known manner. The carrier 11 functions as an input member for this center differential device 10, and is rotationally connected to the output shaft of the gear transmission mechanism 7 via a shaft which passes through the central axis of the hollow sun gear 13. The ring gear 14 functions as one power output member for the center differential device 10 for supplying power to the rear wheels of the vehicle, and is rotationally connected to a rear wheel power output shaft 15 which extends out of the four wheel drive power transfer device 3 in the direction to the left as seen in FIG. 1, i.e. towards the rear of the vehicle in this particular exemplary implementation. And the sun gear 13 functions as another power output member for the center differential device 10 for supplying power to the front wheels of the vehicle, and is rotationally connected to a sleeve shaped intermediate front wheel drive shaft 16 via a drum member fitted around the planetary gear mechanism as a whole. This intermediate front wheel drive shaft 16 is hollow and is fitted around the portion of the rear wheel power output shaft 15 within the housing of this four wheel drive power transfer device 3, and on its outside there is fixedly mounted a sprocket wheel 18. An endless chain 20 is fitted around this sprocket wheel 18 and another sprocket wheel 19 provided below said sprocket wheel 18, from the point of view of the figure and in the actual vehicle body also, and with its central axis parallel to the central axis of said sprocket wheel 18. The sprocket wheel 19 is fixedly mounted on a front wheel power output shaft 17, one end of which protrudes from the housing of this four wheel drive power transfer device 3 in the leftwards direction in the figure, i.e. towards the front end of the vehicle in this particular exemplary implementation.

Thus, the power distribution ratio (drive torque distribution) between the intermediate front wheel drive shaft 16 and the rear wheel power output shaft 15, when this four wheel drive power transfer device 3 is operating, is determined by the relative tooth counts of the sun gear 13 and the ring gear 14 in the following manner:

$Rr = 1/(1+Rg)$ $Rf = Rg(1+Rg)$ where:
Rr is the rear wheel distribution ratio;
Rf is the front wheel distribution ratio;
and Rg is the ratio of the number of teeth on the sun gear 13 to the number of teeth on the ring gear 14.

Because the number of teeth on the sun gear 13 is naturally greater than the number of teeth on the ring gear 14, thus, providing that the number of teeth on the sprocket wheel 18 and the number of teeth on the sprocket wheel 20 are the same, this four wheel drive power transfer device 3 is of the type which distributes a larger amount of torque to the rear vehicle wheels than to the front vehicle wheels.

Further, within the four wheel drive power transfer device 3 there is provided a hydraulically operated wet type multi plate type clutch 21, which selectively either rotationally connects together, in this first exemplary case, the sun gear 13 and the ring gear 14, or alternatively allows said members to rotate freely with respect to one another. This wet clutch 21 is selectively operated by an electrically actuated electric/hydraulic control device 22. Accordingly, the four wheel drive power transfer device 3, which receives rotational power input from the gear transmission mechanism 7 and outputs said rotational power to the rear wheel power output shaft 15 and to the front wheel power output shaft 17, can be caused either to provide differential action for distributing said rotational power between said rear wheel power output shaft 15 and said front wheel power output shaft 17, or not to provide any such differential action and just to drive said shafts 15 and 17 independently.

Via a universal joint 23 of a per se known sort, the rear end of the rear wheel power output shaft 15 rotationally drives the front end of a rear wheel propeller shaft 24. And the rear end of this rear wheel propeller shaft 24 is connected via another universal joint (not particularly shown) to a differential device, (not particularly shown either), for driving the rear wheels (also not shown) of the vehicle.

And, via a universal joint 25 also of a per se known sort, the front end of the front wheel power output shaft 17 rotationally drives the rear end of a front wheel propeller shaft 26. Thus, this front wheel propeller shaft 26 extends alongside and generally below the automatic speed change device 2 including the fluid torque converter 5 therein roughly parallel to the longitudinal axis thereof and on one side thereof. The front end of this front wheel propeller shaft 26 is rotationally connected, via another universal joint 27 also of a per se known sort, to the outer end of a drive pinion shaft 28 which constitutes the power input shaft of a front differential device 30 which drives the front wheels (not shown) of the vehicle, and the outer end of which is supported from the torque converter casing 4 by means of a bearing assembly. And this drive pinion shaft 28 is also rotatably supported at its intermediate portion from the casing 32 of the front differential device 30 (this casing 32 is integrally formed with the oil pan 29 of the internal combustion engine 1), and the inner end of this drive pinion shaft 28 is provided with a drive pinion 33 which is constituted as a bevel gear, with said drive pinion 33 being meshingly engaged with a driven ring gear 34 of the front differential device 30.

The Hydraulic Clutch

Figure 2:
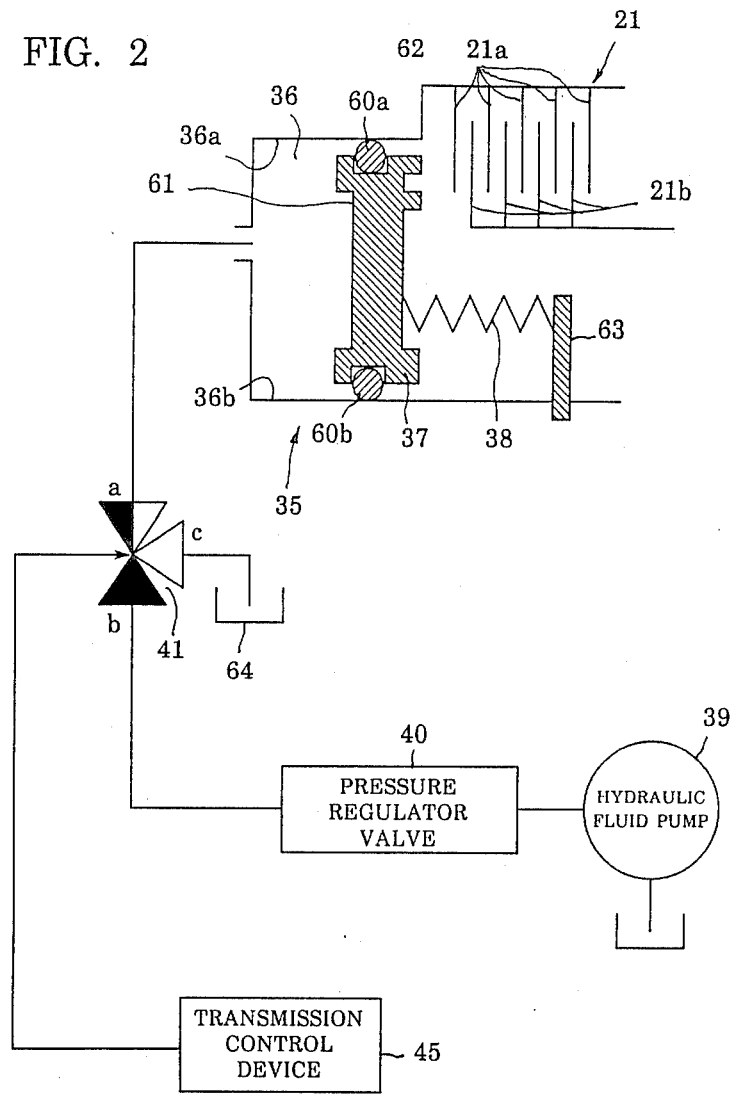
FIG. 2 is a schematic partial sectional view of a clutch of a central differential device of a four wheel drive power transfer device including in the FIG. 1 power train, said figure also showing in block diagram form an actuation and control system for said clutch.

In FIG. 2, there is shown a schematic partial sectional view of the clutch 21 of the central differential device 10 of the four wheel drive power transfer device 3 which thus selectively couples together the sun gear 13 and the ring gear 14, and there is further shown in block diagram form the actuation and control system for said clutch 21. In this figure, the reference numeral 21a and 21b denote two sets of clutch plates of said clutch 21, said clutch plate sets 21a and 21b being sandwiched together with the one 21a of said clutch plate sets being rotationally coupled to one of said sun gear 13 and said ring gear 14 while the other 21b of said clutch plate sets is rotationally coupled to the other of said sun gear 13 and said ring gear 14. Each of these clutch plates is in fact formed as a circularly symmetric flat annulus of which only a half section can be seen in FIG. 2. Similarly, a generally symmetric actuator is designated as 35, and this actuator 35 comprises an outer cylinder bore 36a and an inner cylinder bore 36b which cooperate to define a toroidal cylindrical space between them; these outer and inner cylinder bores 36a and 36b are formed in some member which rotates with one of the sun gear 13 and the ring gear 14. And an annular piston member 37 is fitted in said toroidal space, with its outer cylindrical surface sliding in the outer cylinder bore 36a with a sealing ring 60a interposed therebetween, and with its inner cylidrical surface sliding in the inner cylinder bore 36b with a sealing ring 60b interposed therebetween. Thereby, a hydraulic pressure chamber 36 is defined to the left of the piston member 37 in FIG. 2, between it and an end of the toroidal cylindrical space between the outer cylinder bore 36a and the inner cylinder bore 36b, with a surface designated as 61 of the piston member 37 serving to partly define said pressure chamber 36. The opposite side of the piston member 37 from the surface 61 thereof is formed with a pair of longitudinally raised circular ribs 62, and these ribs 62 are positioned so as to confront the superposed sandwich of the clutch plate sets 21a and 21b. And the piston member 37 is biased in the leftwards direction as seen in the figure, so as to reduce the volume of the pressure chamber 36, by an annular compression spring 38 which bears against an annular member 63 fitted to the inner cylinder bore 36b.

Thus, when hydraulic pressure of a particular pressure level is supplied to the pressure chamber 36, the piston member 37 is driven in the rightwards direction as seen in the figure against the biasing action of the compression spring 38 which is overcome, so that the raised circular ribs 62 press against the superposed sandwich of the clutch plate sets 21a and 21b, and this causes said clutch plate sets 21a and 21b to be rotationally coupled together, thereby rotationally coupling together the sun gear 13 and the ring gear 14. Further, the degree of rotational coupling together of said sun gear 13 and said ring gear 14 is determined by the magnitude of the pressure level supplied to said pressure chamber 36; and thereby the differential action of the central differential device 10 of the four wheel drive power transfer device 3 is impeded by an amount corresponding to the pressure level supplied to said pressure chamber 36. On the other hand, when no such hydraulic pressure is supplied to the pressure chamber 36, the piston member 37 is biased by the biasing action of the compression spring 38 in the leftwards direction as seen in the figure, so that the raised circular ribs 62 release the superposed sandwich of the clutch plate sets 21a and 21b, and this causes said clutch plate sets 21a and 21b to be rotationally decoupled from one another, thereby rotationally decoupling the sun gear 13 and the ring gear 14 and allowing them to rotate substantially independently; and thereby the central differential device 10 of the four wheel drive power transfer device 3 is allowed to perform differential action without substantial impediment thereof.

Hydraulic fluid pressure of any desired pressure level within a certain range is supplied to the pressure chamber 36 of this hydraulic actuator 35 by the following arrangements. A hydraulic fluid pump 39 picks up hydraulic fluid from a sump of the transmission system and pressurizes it. This pressurized hydraulic fluid is then supplied to a pressure regulator valve 40 of a per se known sort which regulates its pressure to a determinate line pressure value. This line pressure is then fed to a port designated as "b" of an electromagnetically actuated hydraulic fluid switching valve 41. This electromagnetically actuated hydraulic fluid switching valve 41 is of a per se known type, and has in all three ports, designated as "a", "b", and "c": when actuating electrical energy is supplied to a solenoid or the like (not particularly shown) of said electromagnetically actuated hydraulic fluid switching valve 41, then the port "a" thereof is communicated to the port "b" thereof while the port "c" thereof is communicated to no other port; while, on the other hand, when no such actuating electrical energy is supplied to said solenoid or the like of said electromagnetically actuated hydraulic fluid switching valve 41, then the port "a" thereof is communicated to the port "c" thereof while the port "b" thereof is communicated to no other port. The port "a" of this electromagnetically actuated hydraulic fluid switching valve 41 is communicated to the pressure chamber 36 of the hydraulic actuator 35, while on the other hand the port "c" of the electromagnetically actuated hydraulic fluid switching valve 41 is communicated to a hydraulic fluid drain designated as 64.

The electromagntically actuated hydraulic fluid switching valve 41 is supplied, from a transmission control device 45 which will be discussed in detail later, with a pulsed electrical signal. According to the duty ratio of this pulsed electrical signal, the ON/OFF duty factor of the electromagnetically actuated hydraulic fluid switching valve 41 is determined. When the pulsed electrical signal is in the ON state, then the port "a" of the electromagnetically actuated hydraulic fluid switching valve 41 is communicated to the port "b" thereof and is thus supplied with hydraulic fluid pressurized to line pressure level, while, on the other hand, when the pulsed electrical signal is in the OFF state, then the port "a" of the electromagnetically actuated hydraulic fluid switching valve 41 is communicated to the port "c" thereof and is thus drained. Therefore, according to the duty ratio of the pulsed electrical signal supplied by the transmission control device 45, the pressure provided in the pressure chamber 36 of the hydraulic actuator 35 can be set to any pressure level between zero and line pressure level, and thereby the degree of rotational coupling together of the sun gear 13 and the ring gear 14 of the central differential device 10 of the four wheel drive power transfer device 3 can be controlled to be any value between substantially zero and the substantially full rotational coupling together condition; and thereby the differential action of said central differential device 10 of said four wheel drive power transfer device 3 can be impeded by any amount between substantially zero and substantially the fully impeded condition.

Operation of This First Power Train

This vehicle power train operates as follows. When the clutch 21 of the four wheel drive power transfer device 3 is operated by the transmission control device 45 so as not to rotationally connect together the sun gear 13 and the ring gear 14, then the center differential device 10 functions so as to provide its differential effect between the rear wheel power output shaft 15 and the intermediate front wheel drive shaft 17, i.e. so as to receive rotational power provided by the engine 1 of the vehicle and transmitted to said four wheel drive power transfer device 3 via the automatic speed change device 2, and to distribute said rotational power between the rear wheels of the vehicle taken as a combination and the front wheels of the vehicle taken as a combination. Accordingly, in this case, the power distribution (torque distribution) ratio between the front wheels of the vehicle and the rear wheels of the vehicle is determined, when the four wheel drive power transfer device 3 is operating in the above mode, by the ratio of the tooth counts of the sun gear 11 and the ring gear 12, as explained above. On the other hand, when the clutch 21 of the four wheel drive power transfer device 3 is operated by the transmission control device 45 so as to completely rotationally connect together the sun gear 13 and the ring gear 14, then the center differential device 10 functions so as to provide no such differential effect between the rear wheel power output shaft 13 and the intermediate front wheel drive shaft 14, i.e. so as to distribute the rotational power provided from the engine 1 via the automatic speed change device 2 directly to the rear wheels 24 of the vehicle taken as a combination and also to the front wheels 28 of the vehicle taken as a combination in an even fashion without any provision of any differential effect. And intermediate modes of operation of the center differential device 10 are available according to intermediate degrees of rotational coupling together of the sun gear 13 and the ring gear 14, by appropriate control thereof exerted by the transmission control device 45 as explained above.

The Transmission Control System

The following detectors and sensors are provided to this system (vide FIG. 1). A road speed sensor 46 detects a value representative of the road speed of the vehicle by measuring the rotational speed of the rear wheel power output shaft 15, and outputs an electrical signal representative thereof. A throttle position sensor 47 detects a value representative of the current load on the internal combustion engine 1 by measuring the opening angle of the throttle valve (not particularly shown) of a carburetor (not shown either) of said engine 1, and outputs an electrical signal representative thereof. A set range sensor 48 detects the set position of a manual range setting valve which is provided for the transmission mechanism 2, or of a setting means therefor, and outputs an electrical signal representative thereof; this manual range setting valve is not particularly shown in the figures, but said setting means therefor is provided in the passenger compartment of the vehicle so as to be readily accessible to the driver of the vehicle, and can be set to any one of a number of set positions corresponding to various operational ranges for the transmission mechanism 2 such as "D" range, "2" range, "L" range, "R" range, "N" range, and "P" range. A center differential device input torque sensor 49 senses the torque that is being supplied as input torque to the four wheel drive power transfer device 3, and outputs an electrical signal representative thereof. And a manual mode select switch 50 is provided in the passenger compartment of the vehicle so as to be readily accessible to the driver of the vehicle, and can typically be set to various positions, first for indicating whether or not an auto mode for the locking operation of the central differential device 10 of the four wheel drive power transfer device 3 is set, and then, if auto mode is not set, for determining manually set operational characteritic. The output signals of these five sensors and switches 46, 47, 48, 49, and 50 are fed to a transmission control device 45.

This transmission control device 45 outputs control signals for controlling the electric/hydraulic control device 22 for the four wheel drive power transfer device 3 and the electrical/hydraulic control mechanism 9 for the gear transmission mechanism 7, as will now be explained. No concrete illustration of the structure of any particular realization of the transmission control device 45 will be given herein, since various possibilities for the details thereof can be easily supplemented by one of ordinary skill in the electronic art based upon the functional disclosures set out in this specification. In the various preferred embodiments of the present invention, in each case, the transmission control device 45 is typically concretely realized as a micro computer and its associated circuitry, said micro computer operating at the behest of a control program, various ones of which will be partially detailed shortly. However, it should be particularly understood that such realizations in the micro computer form, although preferred, are not the only ways in which the transmission control device 45 can be provided; in other possible embodiments it could be constituted as an electrical device not incorporating a microprocessor, or indeed it could be a purely hydraulic device. In the preferred case, however, such a microprocessor will typically comprise: a CPU (central processing unit) which obeys said control program to be described shortly and which inputs data, performs calculations, and outputs data; a ROM (read only memory) which stores said program to be described shortly and initialization data therefor and so on; and a RAM (random access memory) which stores the results of certain intermediate calculations and data and so on; and these devices together will constitute a logical calculation circuit, being joined together by a common bus which also links them to an input port and an output port which together perform input and output for the system. And the system will typically also include buffers for the electrical signals outputted from the various sensors and switches 46 through 50 to the input port device, and drive circuits through which actuating electrical signals are passed from the output port device to a speed change control solenoid or solenoids (not particularly shown in the figures) of the electrical/hydraulic control mechanism 9 for controlling the automatic speed change device 2 and to a differential device control solenoid of the electric/hydraulic control device 22 (also not particularly shown) for controlling the four wheel drive power transfer device 3.

The First Preferred Embodiments

Figure 3:
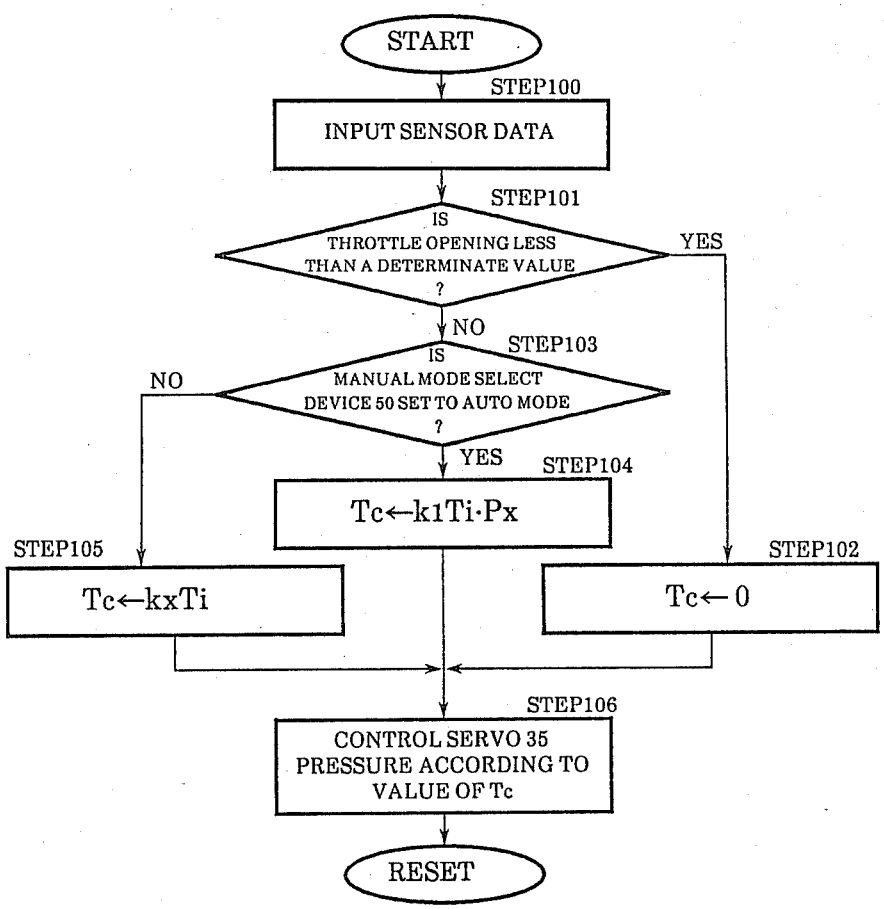
FIG. 3 is a partial flow chart for illustrating a slippage control portion of a program obeyed by a micro computer incorporated in said control system of FIG. 1, to realize the first preferred embodiments of the slippage control device and method of the present invention, said program portion being executed at regular and frequent intervals.

Now, in FIG. 3, a fragmentary flow chart is shown for a portion of the aforementioned control program which directs the operation of the transmission control device 45, according to the first preferred embodiment of the slippage control method of the present invention, so as to realize the first preferred embodiment of the slippage control device of the present invention. This flow chart will now be explained. It should be understood that the transmission control device 45 generally functions so as to engage an appropriate one of the various speed stages of the gear transmission mechanism 7 of the transmission mechanism 2 according to the current values of various vehicle operating parameters such as the vehicle road speed as sensed by the vehicle road speed sensor 46, the engine load (throttle opening) as sensed by the throttle position sensor 47, and the operating range of the transmission as manually set by the vehicle driver on the setting means therefor as sensed by the set range sensor 48; such a function may be performed in a per se conventional way, and no particular program therefor is shown or suggested in this specification, since various possibilities for the details thereof can be easily supplemented as appropriate by one of ordinary skill in the transmission control and the programming arts, particularly when based upon the functional disclosures set out in this specification. The flow chart of FIG. 3 only shows the portion of the control program of the transmission control device 45 which controls the clutch 21 of the center differential device 10 of the four wheel drive power transfer device 3, i.e. only shows the slippage control routine of the transmission control device 45. This program portion is executed at regular intervals of for example a few milliseconds, of course after the engine 1 is started as the four wheel drive vehicle incorporating it is driven.

Thus, in this slippage control routine, at its beginning after the START block, in its first step 100, the microprocessor incorporated in the transmission control device 45 inputs the data from the various sensors described above, and then the flow of control passes next to the decision step 101.

In this decision step 101, said microprocessor makes a decision as to whether or not the current value of engine throttle opening is less than a determinate value which corresponds to just above the idling engine operational condition. If the answer to this decision is YES, so that in fact the current value of engine throttle opening is less than said determinate value, then next the flow of control passes to the step 102. On the other hand, if the answer to this decision is NO, so that in fact the current value of engine throttle opening is greater than said determinate value, then next the flow of control passes to the decision step 103.

In this decision step 103, said microprocessor makes a decision as to whether or not the manual mode select device 50 is set to its position to indicate the auto operational mode. If the answer to this decision is NO, so that in fact the manual mode select device 50 is set to its position to indicate a manual operational mode, then next the flow of control passes to the step 105. On the other hand, if the answer to this decision is YES, so that in fact said manual mode select device 50 is set to its position to indicate the auto operational mode, then next the flow of control passes to the step 104.

In the step 102 at which point it has been determined that the current value of engine throttle opening is less than the determinate value therefor, the microprocessor sets to zero the value of a variable Tc that represents the torque transmission capacity to which it is desired that the clutch 21 should be set; and then the flow of control passes next to the step 106.

Alternatively, on the other hand, in the step 104 at which point it has been determined that the current value of engine throttle opening is less than the determinate value therefor and the operational mode is the auto mode, the microprocessor sets the value of said torque transmission capacity Tc for the clutch 21 to k1.Ti.Px, where k1 is a constant appropriate for this auto mode operational condition, Ti is the current value of the torque that is being supplied as input torque to the four wheel drive power transfer device 3 as sensed by the center differential device input torque sensor 49, and Px is a speed stage correction coefficient; and then as before the flow of control passes next to the step 106.

Alternatively again, in the step 105 at which point it has been determined that the current value of engine throttle opening is greater than the determinate value therefor and the operational mode is the manual mode, the microprocessor sets the value of said torque transmission capacity Tc for the clutch 21 to kx.Ti, where kx is a constant appropriate for this manual mode operational condition, and as before Ti is the current value of the torque that is being supplied as input torque to the four wheel drive power transfer device 3 as sensed by the center differential device input torque sensor 49; and then as before the flow of control passes next to the step 106.

Next, in the step 106 to which the flow of control passes from all the three branches of program flow detailed above, the transmission control device 45 outputs a pulsed electrical signal to the electromagnetically actuated hydraulic fluid switching valve 41 of duty ratio appropriate to cause the clutch 21 of the center differential device 10 of the four wheel drive power transfer device 3 to be engaged to such an extent as to provide a torque transmission capacity therefor corresponding to the value Tc just determined, so as to rotationally couple together the sun gear 13 and the ring gear 14 of said center differential device 10 to a degree determined by said torque transmission capacity Tc, so as therefore to allow said center differential device 10 to perform its differential action between the front vehicle wheels and the rear vehicle wheels while being impeded by an amount corresponding to said torque transmission capacity Tc, to thus drive said front vehicle wheels and said rear vehicle wheels from the engine 1 while distributing rotational power and torque between them with differential action impeded by this appropriate amount; and then the flow of control passes next to exit this routine, without doing anything further.

And, by the repetition of the FIG. 3 program in a relatively tight and quick cycle with a period of the order of miliseconds, the control of the clutch 21 of the central differential device 10 of the four wheel drive power transfer device 3 is maintained.

Thus, when the engine throttle opening is less than the determinate value therefor, an OFF signal with a duty ratio value of substantially zero is dispatched to the electromagnetically actuated hydraulic fluid switching valve 41, so that the torque transmission capacity Tc of the clutch 21 is set to be substantially zero; but, when the engine throttle opening is greater than the determinate value therefor: if the manual mode select device 50 is set to a position indicating the auto operational mode, a pulse signal with a duty ratio value corresponding to k1.Ti.Px is dispatched to the electromagnetically actuated hydraulic fluid switching valve 41, so that the torque transmission capacity Tc of the clutch 21 is set to the value k1.Ti.Px; while, if said manual mode select device 50 is set to a position indicating the manual operational mode, a pulse signal with a duty ratio value corresponding to kx.Ti is dispatched to the electromagnetically actuated hydraulic fluid switching valve 41, so that the torque transmission capacity Tc of the clutch 21 is set to the value kx.Ti. The coefficient k1 is a positive value not greater than unity, and is set according to the distribution ratio of torque between the front vehicle wheels and the rear vehicle wheels which as mentioned above is determined by the gearing ratio provided by the central differential device 10 of the four wheel drive power transfer device 3; while the speed stage coefficient Px is a positive value which also is not greater than unity, and is set to unity when the set speed stage of the tranmsission mechanism 7 is the first speed stage, while it is set to sequentially smaller values less than unity according as the set speed stage of the transmission mechanism 7 is a speed stage thereof other than the first speed stage and increasing sequentially.

Figure 4:
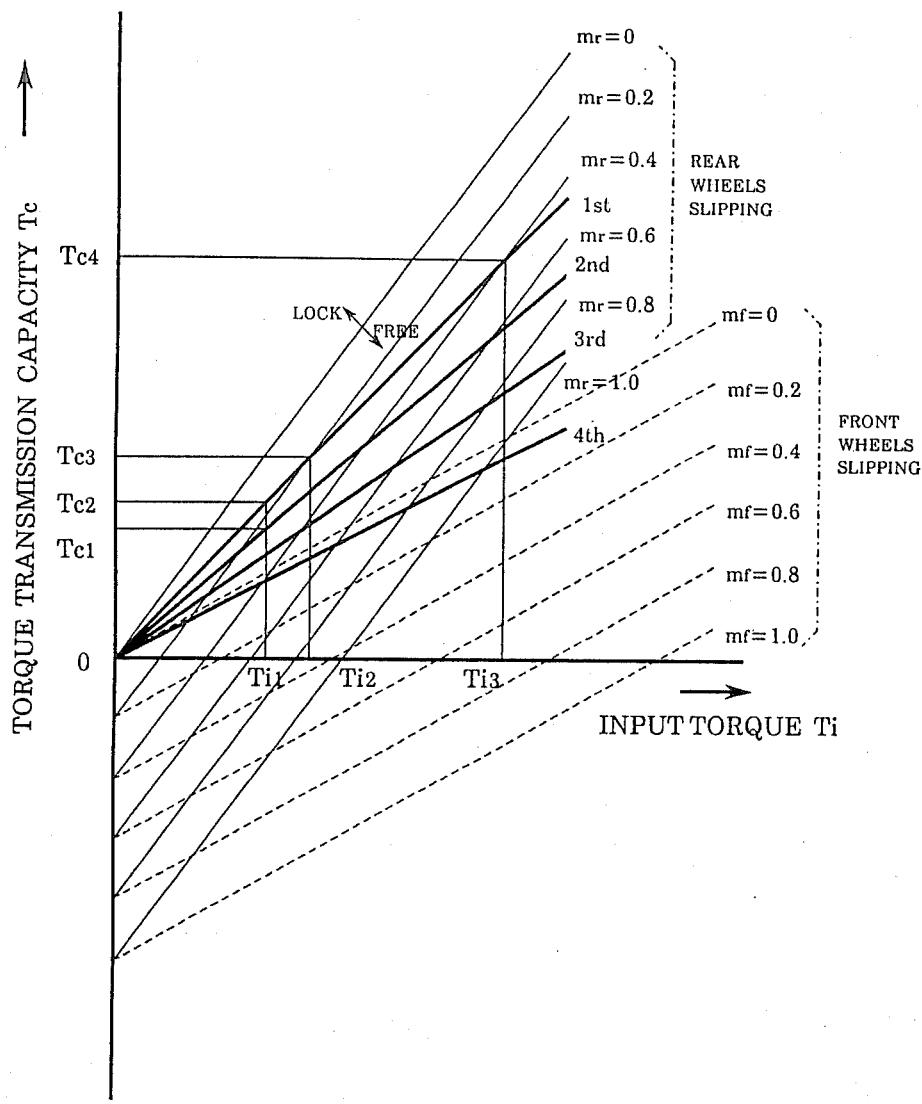
FIG. 4 is a graph for said first preferred embodiments, showing along the vertical axis the torque transmission capacity Tc of the FIG. 2 clutch, as related to the input torque to said central differential device of said four wheel drive power transfer device which is shown along the horizontal axis.

Thereby, the torque transmission capacity Tc of the clutch 21 is set to substantially zero when the vehicle engine throttle opening is equal to not more than said determinate value therefor, so that the central differential device 10 is put into the substantially completely disengaged operational condition; but, when the engine throttle opening is equal to at least said determinate value therefor, and the operational mode is the auto operational mode, then as shown in FIG. 4 the torque transmission capacity Tc of the clutch 21 is increased along with increase in the input torque Ti of the central differential device 10, and the rate of increase is reduced the higher is the set speed stage of the transmission mechanism 7; and, when the engine throttle opening is equal to at least said determinate value therefor, and the operational mode is one or another manually set operational mode, then the torque transmission capacity Tc of the clutch 21 is increased along with increase in the input torque Ti of the central differential device 10, and the rate of increase is determined by the current type of manual characteristics setting.

For a tire of the vehicle to slip, the torque T0 applied to the tire must be the same or not greater than the torque which the tire can transmit to the road surface $Tt = mu.Fn.R$ (mu is the coefficient of friction of the tire with respect to the road, Fn is the vertical force being sustained by the tire, and R is the effective radius of the tire), in other words T0 must be not more than Tt, and if T0 is greater than Tt then wheel slippage will occur. Therefore in order to avoid slippage or to reduce slippage, it is sufficient to reduce the torque T0 applied to the tire.

In a four wheel drive device of the general type described above having a center differential device and a differential restriction device, the current values of output torque Tr to the rear wheels and the output torque Tt to the front wheels are determined by the particular front to rear torque distribution ratio of the center differential device and by the torque transmission capacity of the differential restriction device; and in the four wheel drive device as described above, according to the present invention, the torque transmission capacity Tc of the clutch 21 which is the differential restriction device is variable, whereby, by quantitative control of this torque transmission capacity Tc, during slippage, the distribution of output torque to the rear wheels and to the front wheels can be quantitatively varied.

In other words, when the rear wheels are slipping, the torque Tr applied to the rear wheels and the torque Tf applied to the front wheels are given by the following equations.

$Tr = \{1/(1+rho)\}Ti - Tc$ $Tf = \{rho/(1+rho)\}Ti + Tc$

When the front wheels are slipping, the torque Tr applied to the rear wheels and the torque Tf applied to the front wheels are given by the following equations.

$Tr = \{1/(1+rho)\}Ti + Tc$ $Tf = \{rho/(1+rho)\}Ti - Tc$

Here rho is the ratio of the number of teeth of the sun gear and the ring gear of the center differential device.

Therefore in order for the rear wheels not to slip, it is sufficient that the following expression holds:

$Tr = \{1/(1+rho)\}Ti - Tc = < Ttr/ir$ ("$< =$" means "less than or equal to", and similarly, throughout this specification)
Therefore:

$Tc > = \{1/(1+rho)\}Ti - (Ttr/ir) > = \{1/(1+rho)\}Ti - (mur.Fnr.Rr/ir)$ where:
Ttr is the torque which the rear wheel tire can transmit to the road surface,
ir is the reduction ratio of the rear differential,
mur is the coefficient of friction of the rear wheel tire with respect to the road surface,
Fnr is the vertical resistance of the rear tire, and:
Rr is the effective radius of the rear wheel tire.

In FIG. 4, the thin lines show $Tc = \{1/(1+rho)\}Ti - (mur.Fnr.Rr/ir)$ for the values mur=0, mur=0.2, mur=0.4, mur=0.6, mur=0.8, and mur=1, respectively.

In order for the front wheels not to slip, it is sufficient that the following expression holds:

$Tf = \{rho/(1+rho)\}Ti - Tc < = Ttf/if$

Therefore:

$Tc > = \{rho/(1+rho)\}Ti - (Ttf/if) > = \{rho/(1+rho)\}Ti - (muf.Fnf.Rf/if)$ where:
Ttf is the torque which the front wheel tire can transmit to the road surface,
if is the reduction ratio of the front differential,
muf is the coefficient of friction of the front wheel tire with respect to the road surface,
Fnf is the vertical resistance of the front tire, and:
Rf is the effective radius of the front wheel tire.

In FIG. 4 the dashed lines show $Tc = \{rho/(1+rho)\}Ti - (muf.Fnf.Rf/if)$ for values of muf=0, muf=0.2, muf=0.4, muf=0.6, muf=0.8, and muf=1, respectively.

It should be noted that in the embodiment shown in the drawings the ring gear 14 of the center differential device 10 is connected to the rear wheel drive shaft 15 and the sun gear 13 of the center differential device 10 is connected to the front wheel drive shaft 17, so that $\{1/(1+rho)\}/\{rho/(1+rho)\}$ is approximately 7/3 to 6/4.

As shown in FIG. 4, if the torque transmission capacity Tc of the clutch 21 is set according to the engaged speed stage of the transmission mechanism 7 in order to increase proportionally according to increase in the input torque Ti, for example when the transmission mechanism 7 is in the first speed stage and the rear wheel coefficient of friction mur of the road surface being driven on=0.2, then if the input torque Ti is not more than a certain value Ti2, even if slippage occurs on the rear wheels, the central differential device 10 will be maintained substantially in a locked up state, and a rotational speed difference will not substantially occur between the front wheels and the back wheels. At this time, the torque transmission capacity Tc of the clutch 21 will be less than a certain value Tc3, and a drive torque corresponding to the torque transmission Tc restricted to not more than this certain value Tc3 will be transmitted from the rear wheels to the front wheels through the differential control clutch 21, and thereby the slippage amount of the rear wheels will be reduced and at the same time the drive torque applied to the front wheels will be increased, and at this time if the front wheels are not slipping, the drive torque effectively applied to driving the vehicle will be increased. Under the same conditions, if the rear wheel coefficient of friction mur of the road surface being driven on=0.4, if the input torque Ti is not more than a certain value Ti3 (Ti3 is greater than Ti2), even if slippage occurs at the rear wheels, the central differential device 10 will be maintained substantially in a locked up state, and a rotational speed difference will not substantially occur between the front wheels and the rear wheels. At this time, the torque transmission capacity Tc of the clutch 21 will be less than a certain value Tc4 (Tc4 is greater than Tc3), and a drive torque corresponding to the torque transmission capacity Tc which is held below this certain value Tc4 is transmitted from the rear wheels to the front wheels through the differential control clutch 21, and thereby the slippage amount of the rear wheels is reduced and at the same time the drive torque applied to the front wheels is increased, and in this case also, at this time, if the front wheels are not slipping, the drive torque effectively applied to driving the vehicle is increased.

Therefore, during slippage, the amount of transmission of drive torque between the front wheels and the rear wheels by the differential control clutch 21 is restricted to be a smaller value when the coefficient of friction mu of the road surface being driven on is smaller. By this means, under conditions when the coefficient of friction mu is small, excessive transmission of drive torque from a wheel or wheels which is/are slipping to the wheel or wheels which is/are not slipping is avoided, and thereby slipping is prevented from being extended to those wheels which are not slipping.

Ideally, as explained above, it is sufficient and desirable to carry out torque transmission capacity control of the differential control clutch 21 according to the input torque and the coefficient of friction of the road surface which is being driven upon, but in practice it is difficult to detect the coefficient of friction of the road surface which is being driven upon continuously in such a way as to meet the appropriate accuracy requirements. In response to this, according to the present invention, as an approximation type method of control, control of the torque transmission capacity Tc of the clutch 21 is carried out according to the input torque to the central differential device 10, which is relatively readily detectable.

According to this first preferred embodiment, the torque transmission capacity Tc of the clutch 21 for a given input torque Ti is set to a larger value, the lower is the engaged speed stage of the speed change device 7, and, for example, if the input torque Ti is a certain value Ti1, then when the engaged speed stage of the speed change device 7 is the second speed stage the torque transmission capacity Tc is set to a certain value Tc1, but if the engaged speed stage is the first speed stage then said torque transmission capacity Tc is set to a certain value Tc2 which is larger than the certain value Tc1, and even if the rear wheel coefficient of friction mur of the road surface being driven upon is relatively low as being=0.2, the center differential device 10 will be in a locked up state.

Since when the input torque Ti is zero the torque transmission capacity Tc of the differential control clutch 21 is set to be zero, and when the throttle opening of the internal combustion engine 1 is not more than a certain value the torque transmission capacity Tc is likewise set to be zero, in other words the differential control clutch 21 is set to a substantially completely disengaged state, at these times the center differential device 10 carries out its differential function without restriction. Therefore in many cases, when the vehicle is turning, at which time typically the accelerator pedal depression is released or is very much reduced, as is appropriate during such turning the central differential device 10 carries out effectively its differential function, and the occurrence of the tight corner braking phenomenon is avoided.

Detection of the input torque Ti to the central differential device 10 may be carried out by detecting the input torque applied through the speed change device 7 from the internal combustion engine 1 using an input torque sensor, but the input torque detection may also be performed by calculation from the throttle opening or accelerator pedal depression amount of the internal combustion engine 1 and from the engaged speed stage of the speed change device 7, and in this case there will no longer be any necessity to provide a special input torque sensor such as the sensor 49 of the shown preferred embodiment.

The increase rate of the torque transmission capacity Tc of the clutch 21 with respect to the input torque Ti is determined appropriately by the vehicle driver when the manual operational mode is set by appropriately positioning the manual code select device 50, and this setting can be carried out freely according to the decision of the driver.

The Second Preferred Embodiments

Figure 5:
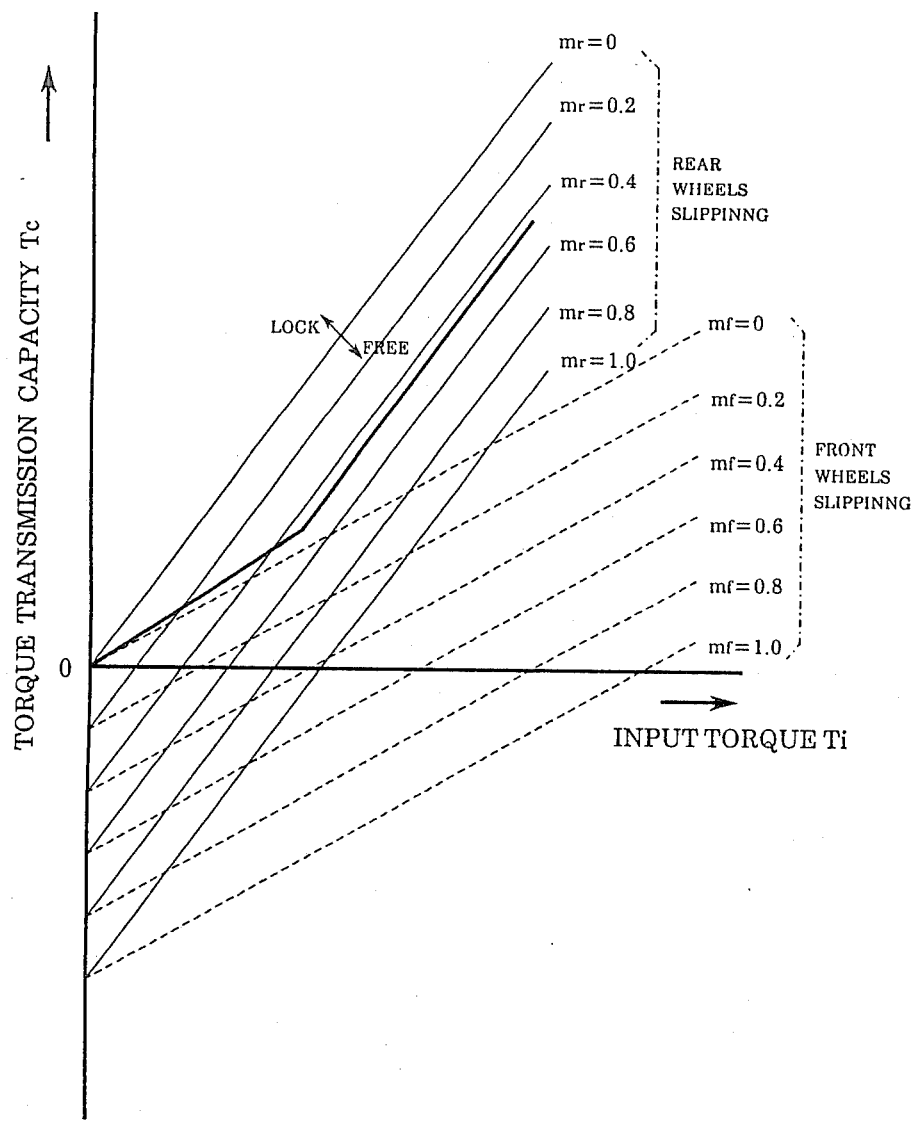
FIG. 5 is a graph relating to the second preferred embodiments of the slippage control device and method of the present invention, similar to FIG. 4 for the first preferred embodiments, and similarly showing along the vertical axis the torque transmission capacity Tc of the FIG. 2 clutch, as related to the input torque to the central differential device of the four wheel drive power transfer device which is shown along the horizontal axis.

FIG. 5 is a graph relating to the second preferred embodiments of the slippage control device and method of the present invention, similar to FIG. 4 for the first preferred embodiments, and similarly showing along the vertical axis the torque transmission capacity Tc of the FIG. 2 clutch, as related to the input torque to the central differential device of the four wheel drive power transfer device which is shown along the horizontal axis. In these second preferred embodiments, the torque transmission capacity Tc of the differential control clutch 21, as before, generally increases according to an increase in the input torque Ti, and this control characteristic; and, in addition to the characteristics shown in FIG. 4 with respect to the first preferred embodiments, the rate of increase of said torque transmission capacity Tc of the clutch 21 with respect to the input torque Ti to the central differential device 10 varies according to the size of the input torque Ti, and particularly increases along with increase thereof, as shown in FIG. 5. A flow chart like to the FIG. 3 flow chart for these second preferred embodiments will be easily fashioned by one of ordinary skill in the applicable art without undue experimentation, based upon the disclosures in this specification; and, hence, no particular such flow chart will be expatiated upon herein, in view of the desirability of conciseness of disclosure. Further, advantages relating to these second preferred embodiments will not be particularly descanted upon herein.

The Third and the Fourth Preferred Embodiments

It should be noted that the differential control device such as the differential control clutch 21, instead of being provided with its variable torque transmission capacity as in the above disclosed first and second preferred embodiments between the two output members (the sun gear 13 and the ring gear 14) of the center differential device 10, may as an alternative be connected between the input member of said central differential device 10, in other words the carrier 11, and one of said two output members of the center differential device, again with a variable torque transmission capacity.

Figure 6:
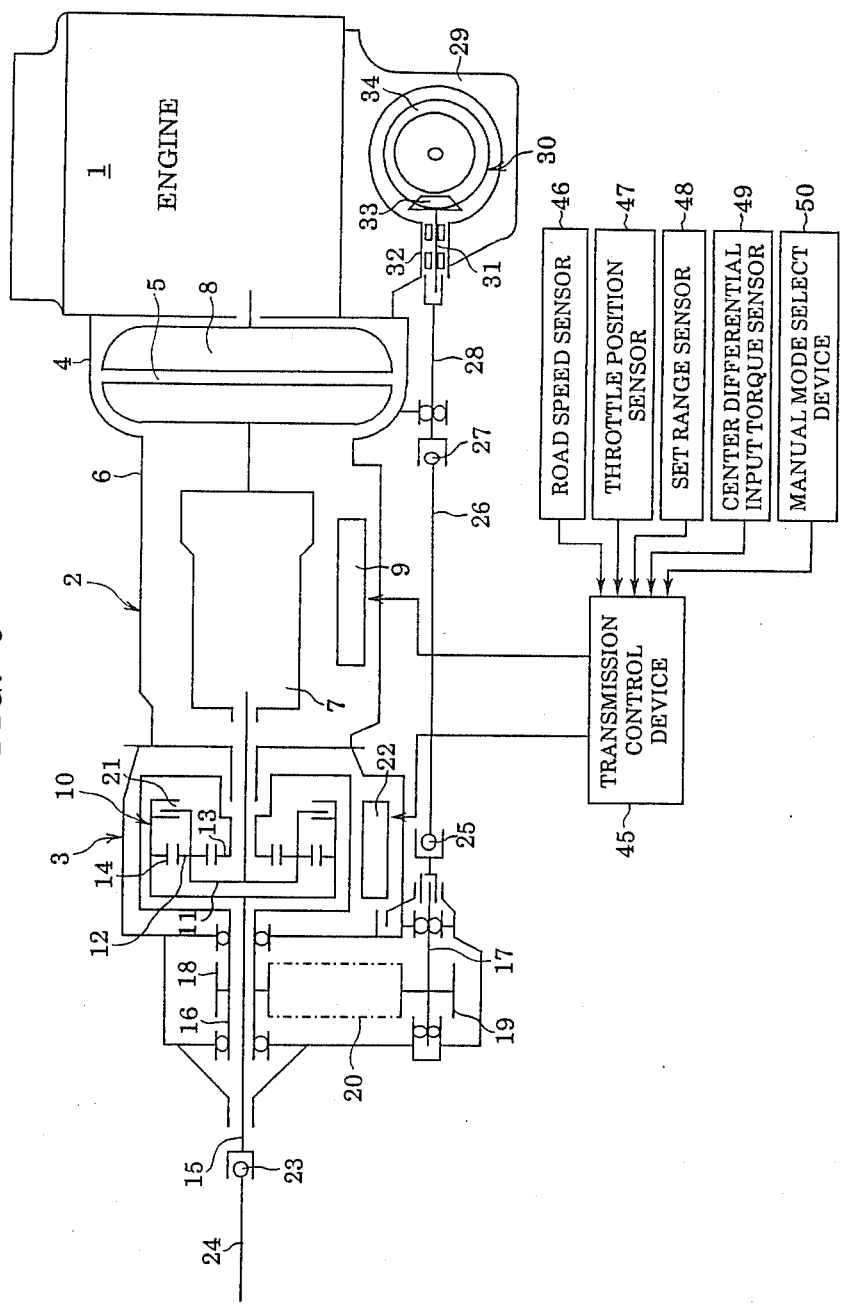
FIG. 6 is similar to FIG. 1, being a schematic longitudinal skeleton view of a vehicle power train and of a control system therefor which incorporates the third preferred embodiment of the slippage control device of the present invention, for practicing the third preferred method embodiment.

Thus in FIG. 6, which is similar to FIG. 1, there is shown a schematic longitudinal skeleton view of a vehicle power train and of a control system therefor, which incorporates the third preferred embodiment of the slippage control device of the present invention, for practicing the third preferred method embodiment. In this figure, parts which are like to parts shown in FIG. 1 are denoted by the same reference numerals. In this third preferred embodiment, the difference with regard to the power train of the vehicle is that the clutch 21 of the central differential device 10 is provided between the carrier 11 and the ring gear 14 thereof. The same benefits and advantages are obtained as in the case of the above described first and second preferred embodiments.

Figure 7:
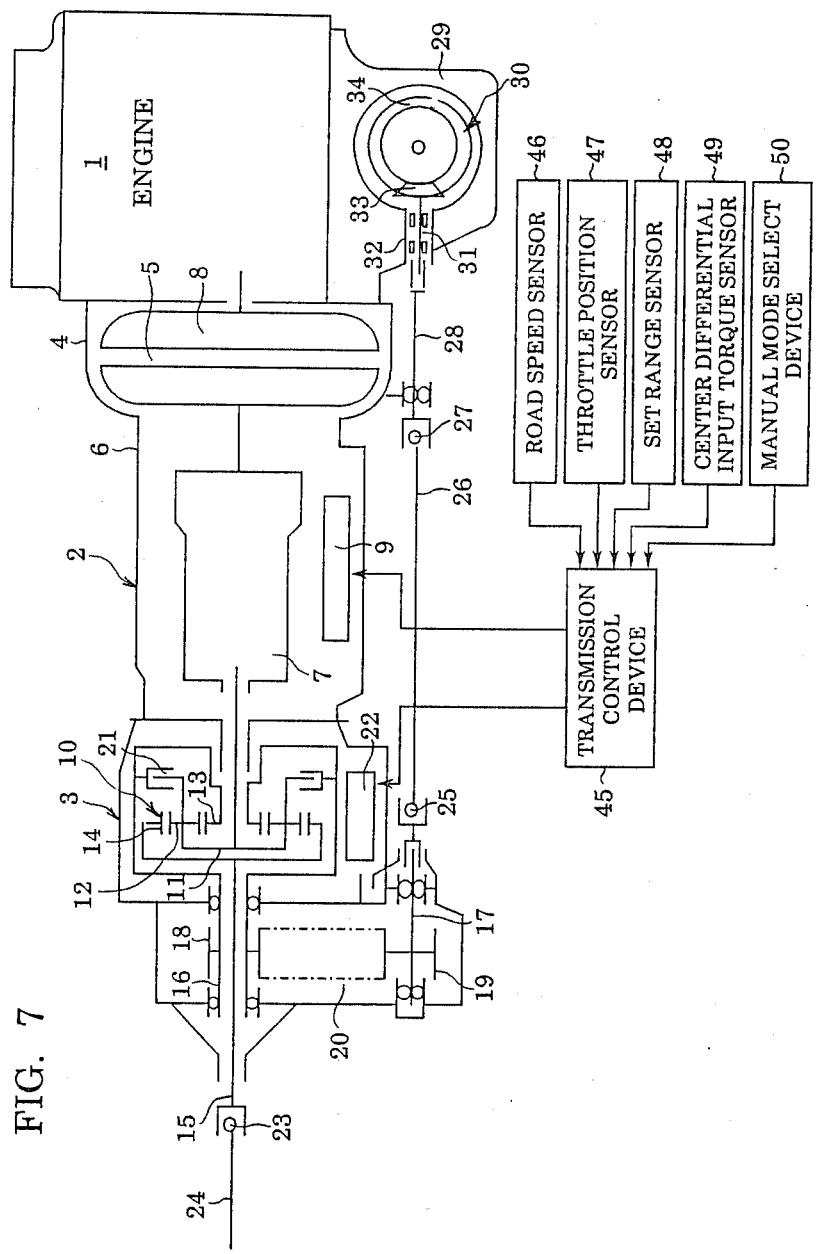
FIG. 7 is similar to FIGS. 1 and 6, being a schematic longitudinal skeleton view of a vehicle power train and of a control system therefor which incorporates the fourth preferred embodiment of the slippage control device of the present invention, for practicing the fourth preferred method embodiment.

And in FIG. 7, which is similar to FIGS. 1 and 6, there is shown a schematic longitudinal skeleton view of a vehicle power train and of a control system therefor, which incorporates the fourth preferred embodiment of the slippage control device of the present invention, for practicing the fourth preferred method embodiment. Again, in this figure, parts which are like to parts shown in FIGS. 1 and 6 are denoted by the same reference numerals. In this fourth preferred embodiment, the difference with regard to the power train of the vehicle is that the clutch 21 of the central differential device 10 is now provided between the carrier 11 and the sun gear 13 thereof. In this case also, the same effects and benefits as in the above described first through third preferred embodiments will be obtained.

The Fifth Preferred Embodiments

No particular flow chart is shown for the portion of the control program which directs the operation of the transmission control device 45, according to the fifth preferred embodiment of the slippage control method of the present invention, so as to realize the fifth preferred embodiment of the slippage control device of the present invention. This is because, based upon the functional disclosures set out in this specification, various possibilities for the details thereof can be easily supplemented as appropriate by one of ordinary skill in the transmission control and the programming arts. Such a program portion is again executed at regular intervals of for example a few milliseconds.

Figure 8:
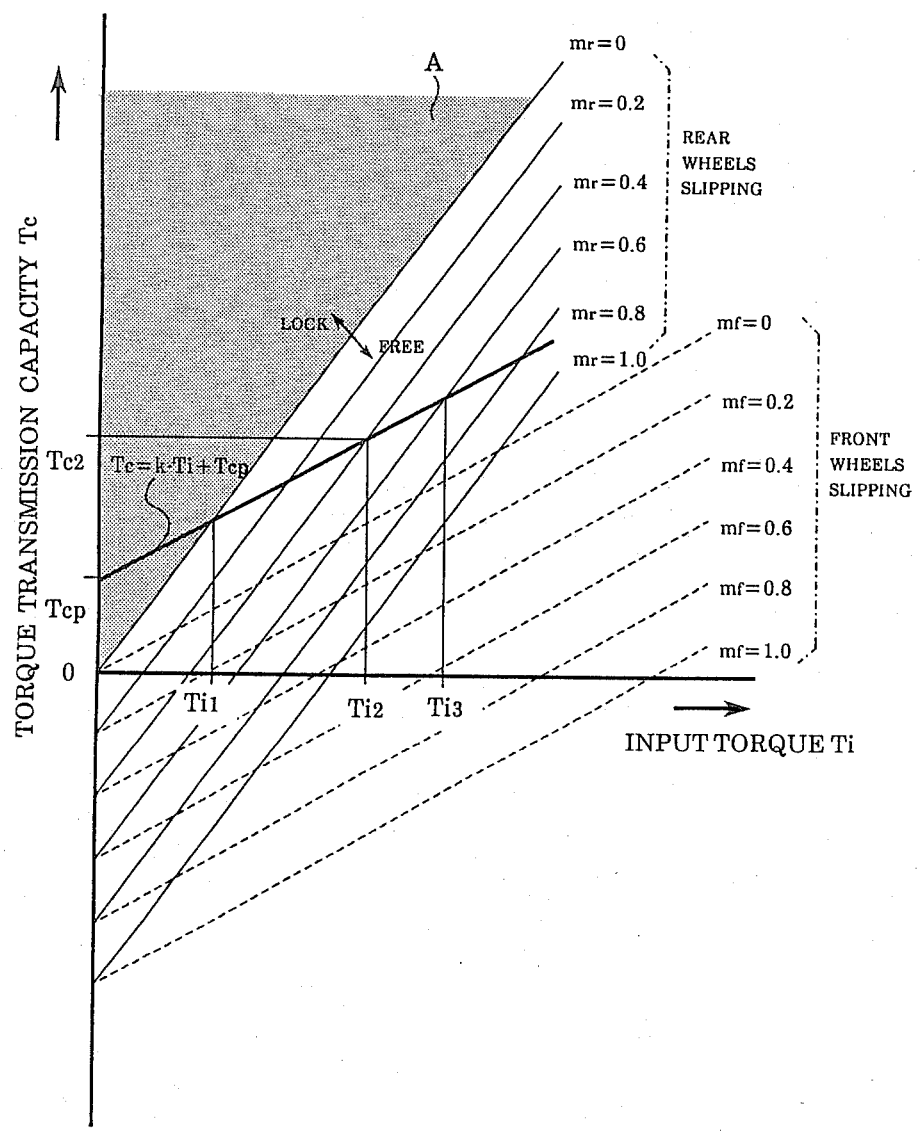
FIG. 8 is a graph relating to the fifth preferred embodiments of th slippage control device and method of the present invention, similar to FIGS. 4 and 5 for the first and second preferred embodiments respectively, and similarly showing along the vertical axis the torque transmission capacity Tc of the control clutch of the central differential device of the four wheel drive power transfer device, as related to the input torque thereto which is shown along the horizontal axis.

In these fifth preferred embodiments, the control is carried out in the manner specified by the graph shown in FIG. 8 of the accompanying drawings: a pulse signal with a duty ratio value corresponding to $k.Ti+Tcp$ is dispatched to the electromagnetically actuated hydraulic fluid switching valve 41, so that the torque transmission capacity Tc of the clutch 21 is set to the value $k.Ti+Tcp$. Ti represents the value of the torque which is being supplied by the transmission mechanism 2 as input torque to the four wheel drive power transfer device 3, while the value k is a coefficient and the value Tcp is a constant.

As before, in FIG. 8, the thin lines show $Tc=\{1/(1+rho)\}Ti-(mur.Fnr.Rr/ir)$ for the values mur=0, mur=0.2, mur=0.4, mur=0.6, mur=0.8, and mur=1, respectively; and the dashed lines show $Tc=\{rho/(1+rho)\}Ti-(muf.Fnf.Rf/if)$ for values of muf=0, muf=0.2, muf=0.4, muf=0.6, muf=0.8, and muf=1, respectively. And, as before, it should be noted that in these fifth preferred embodiments, since in the power train to which they are applied, like the FIG. 1 power train, the ring gear 14 of the center differential device 10 is connected to the rear wheel drive shaft 15 and the sun gear 13 of the center differential device 10 is connected to the front wheel drive shaft 17: $\{1/(1+rho)\}/\{rho/(1+rho)\}$ is approximately 7/3 to 6/4. In FIG. 8, the region denoted by "A" is the region where Tc is greater than or equal to $\{1/(1+rho)\}Ti$, i.e. is that region in which the central differential control clutch 21 is always completely engaged.

Since the torque transmission capacity Tc of the central differential control clutch 21 is controlled according, for example as described above, to the expression $Tc=k.Ti+Tcp$, the torque transmission capacity characteristic in these fifth preferred embodiments of the present invention is as shown by the heavy line in FIG. 8, and this torque transmission characteristic extends across the various characteristic lines $Tc=\{1/(1+rho)\}Ti-(mur.Fnr.Rr/ir)$.

By controlling the torque transmission capacity Tc as described above, if the input torque Ti is not more than a certain value Ti1, then Tc is greater than or equal to $\{1/(1+rho)\}Ti$, and even in a low coefficient of friction road surface driving situation when the coefficient of friction mu of the tires on the vehicle wheels with respect to the road surface being driven on is substantially zero, the differential control clutch 21 is completely engaged, and when the input torque from the transmission mechanism 2 to the four wheel drive power transfer device 3 is at least this certain value Ti1, then depending on the coefficient of friction mu of the vehicle tires with respect to the road surface being driven on the differential control clutch 21 can become incompletely engaged. For example, in the case that mu=0.4, when the input torque Ti becomes at least Ti2, the center differential control clutch 21 allows relative rotation of the front wheels and the rear wheels, and thereby occurrence of the tight corner braking phenomenon is avoided. If the input torque Ti is a certain value Ti2, and the torque transmission capacity Tc of the clutch 21 is set to a certain value Tc2, then in this state if the coefficient of friction mu changes from 0.4 to 0.6, relative rotation of the front and rear vehicle wheels is once again prevented by the differential control clutch 21. At this point so called wind up torque will be produced between the front and rear vehicle wheels, and the vehicle driving power will be reduced, whereupon the driver will tend to naturally increase the output power of the engine by depressing the accelerator pedal of the vehicle, and thereby, when the input torque Ti reaches a certain value Ti3, the central differential control clutch 21 will once again permit relative rotation between the front vehicle wheels and the rear vehicle wheels, and thus the tight corner braking phenomenon producing state will be terminated.

The Sixth through the Tenth Preferred Embodiments

For the above described effects to occur, it is sufficient for the torque transmission capacity characteristic to extend to cut across the various characteristics $Tc=\{1/(1+rho)\}Ti-(mur.Fnr.Rr/ir)$, and said torque transmission capacity characteristic can also be set for example a shown in FIGS. 9 through 13, according to sixth through tenth preferred embodiments of the present invention, by the function of appropriate program portions of which again no particular flow charts are shown, because again, based upon the functional disclosures set out in this specification, various possibilities for the details thereof can be easily supplemented as appropriate by one of ordinary skill in the transmission control and the programming arts.

As before, in these figures, the thin lines show $Tc=\{1/(1+rho)\}Ti-(mur.Fnr.Rr/ir)$ for the values mur=0, mur=0.2, mur=0.4, mur=0.6, mur=0.8, and mur=1, respectively; the dashed lines show $Tc=\{rho/(1+rho)\}Ti-(muf.Fnf.Rf/if)$ for values of muf=0, muf=0.2, muf=0.4, muf=0.6, muf=0.8, and muf=1, respectively; and the regions of each figure denoted by "A" are the regions where Tc is greater than or equal to $\{1/(1+rho)\}Ti$, i.e. are those regions in which the central differential control clutch 21 is always completely engaged. It will be seen that, in each of these cases, the torque transmission capacity Tc of the central differential control clutch 21 is controlled as shown by the heavy line in the relevant figure, and it will be noted that in each case this torque transmission characteristic extends across the various characteristic lines $Tc = \{1/(1+rho)\}Ti - (mur.Fnr.Rr/ir)$.

Figure 9:
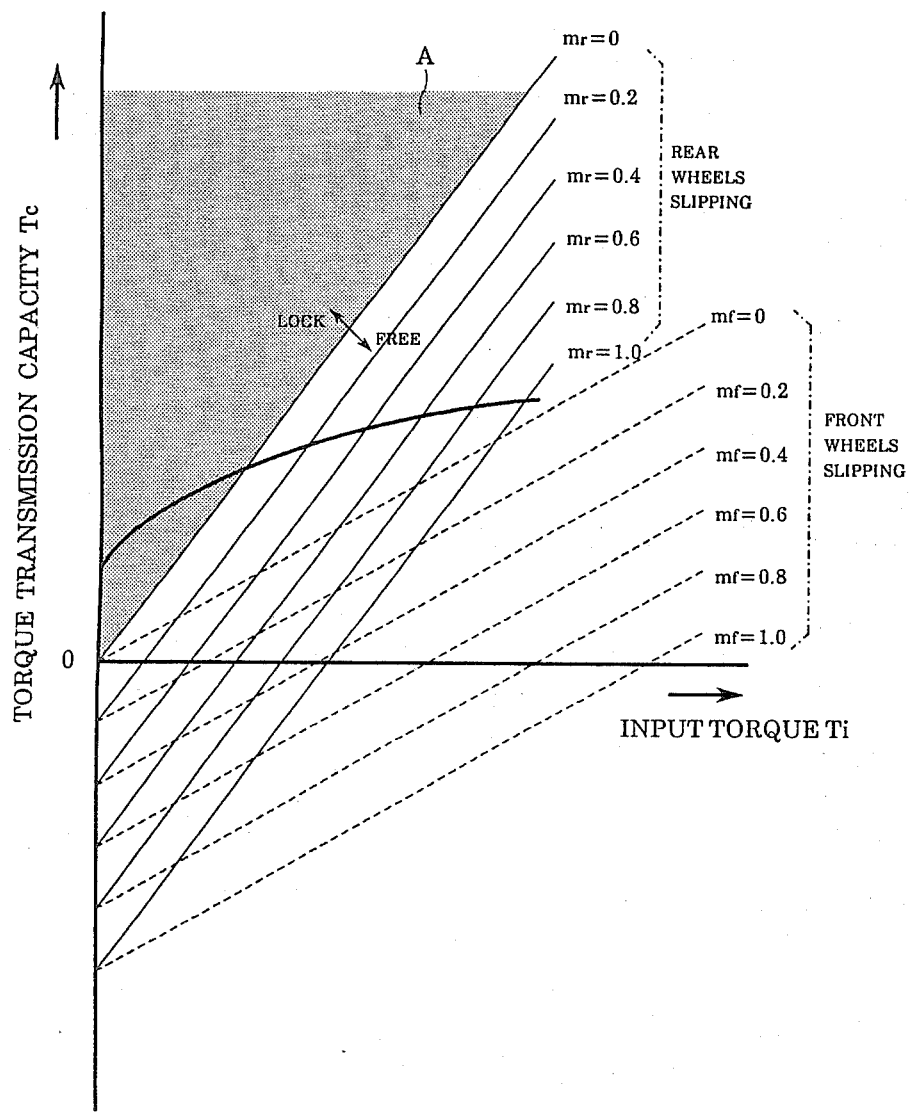
FIG. 9 is a graph relating to the sixth preferred embodiments of the slippage control device and method of the present invention, similar to FIGS. 4, 5, and 8 for the first, second, and fifth preferred embodiments respectively, and similarly showing along the vertical axis the torque transmission capacity Tc of the control clutch of the central differential device of the four wheel drive power transfer device, as related to the input torque thereto which is shown along the horizontal axis.
Figure 10:
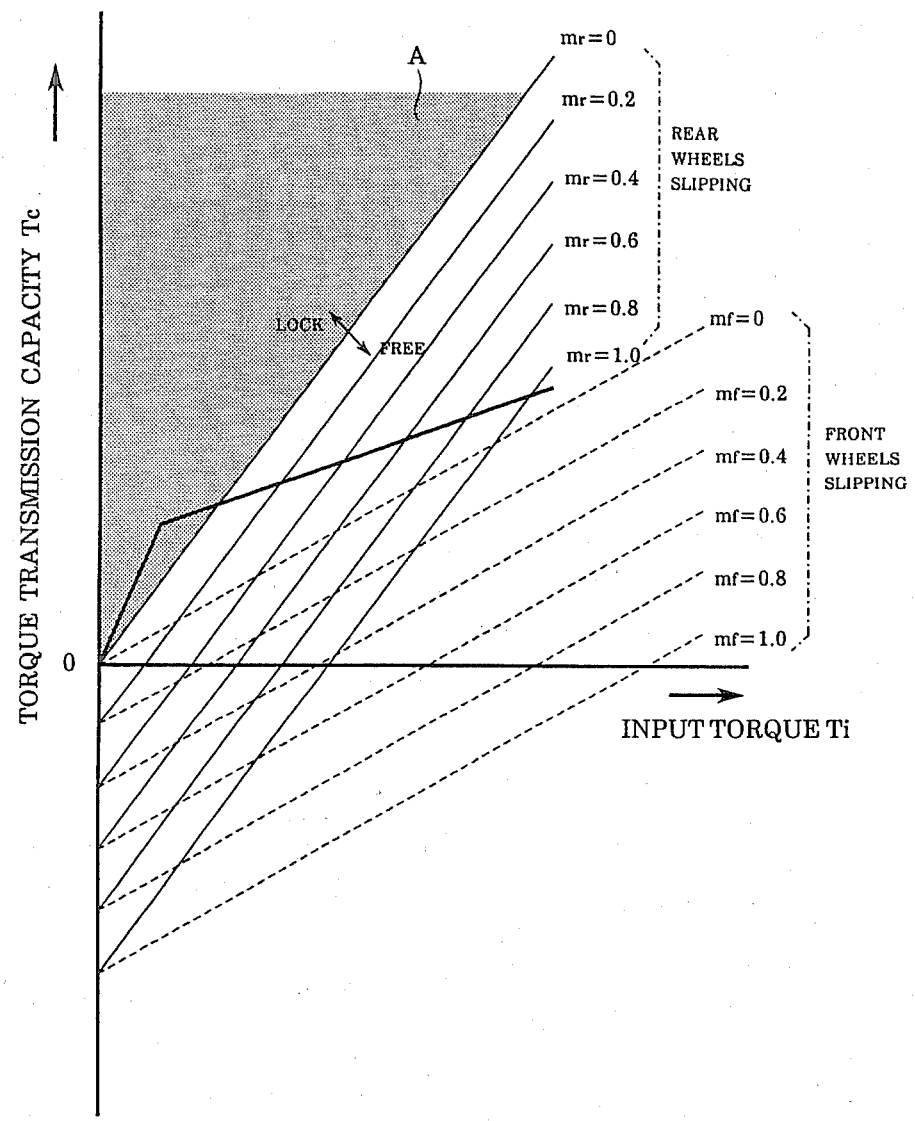
FIG. 10 is a graph relating to the seventh preferred embodiments of the slippage control device and method of the present invention, similar to FIGS. 4, 5, 8, and 9 for the first, second, fifth, and sixth preferred embodiments respectively, and similarly showing along the vertical axis the torque transmission capacity Tc of the control clutch of the central differential device of the four wheel drive power transfer device, as related to the input torque thereto which is shown along the horizontal axis.
Figure 11:
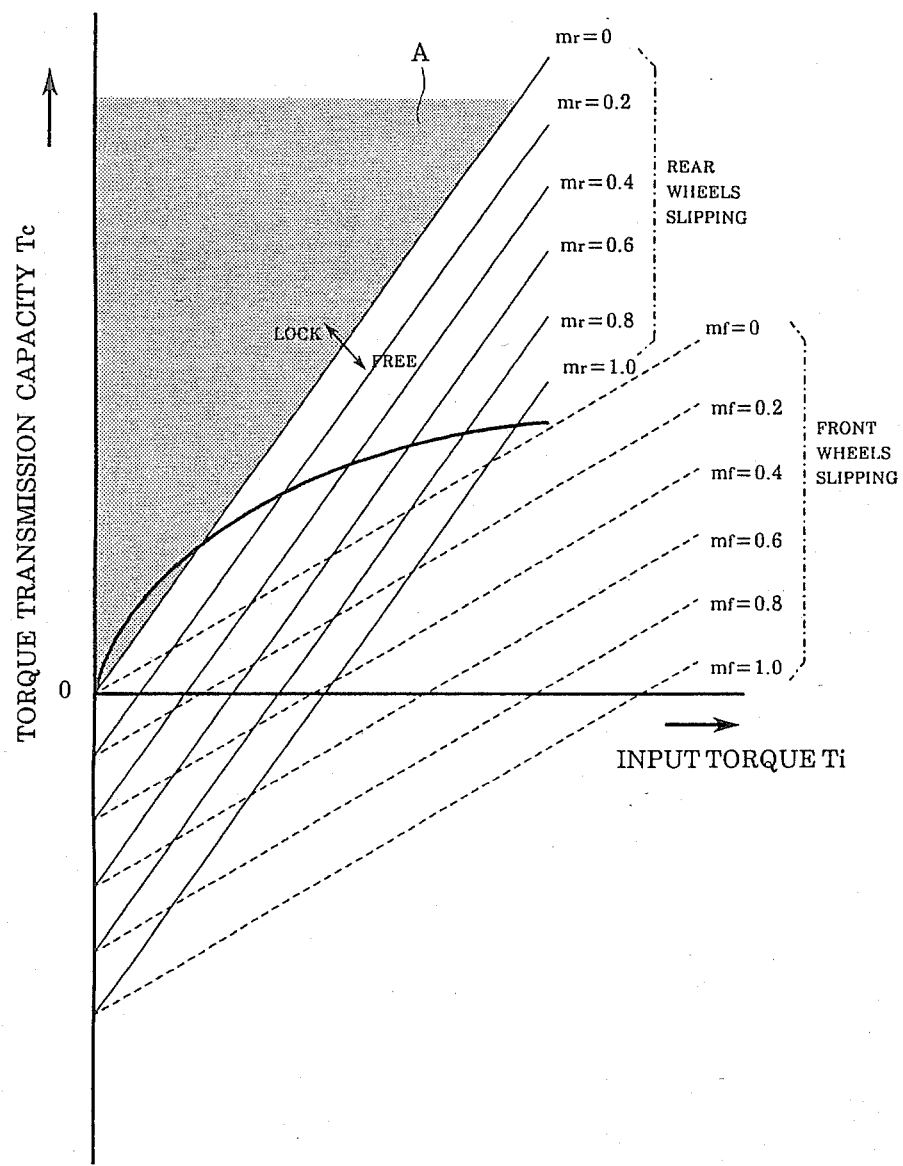
FIG. 11 is a graph relating to the eighth preferred embodiments of the slippage control device and method of the present invention, similar to FIGS. 4, 5, 8, 9, and 10 for the first, second, fifth, sixth, and seventh preferred embodiments respectively, and similarly showing along the vertical axis the torque transmission capacity Tc of the control clutch of the central differential device of the four wheel drive power transfer device, as related to the input torque thereto which is shown along the horizontal axis.
Figure 12:
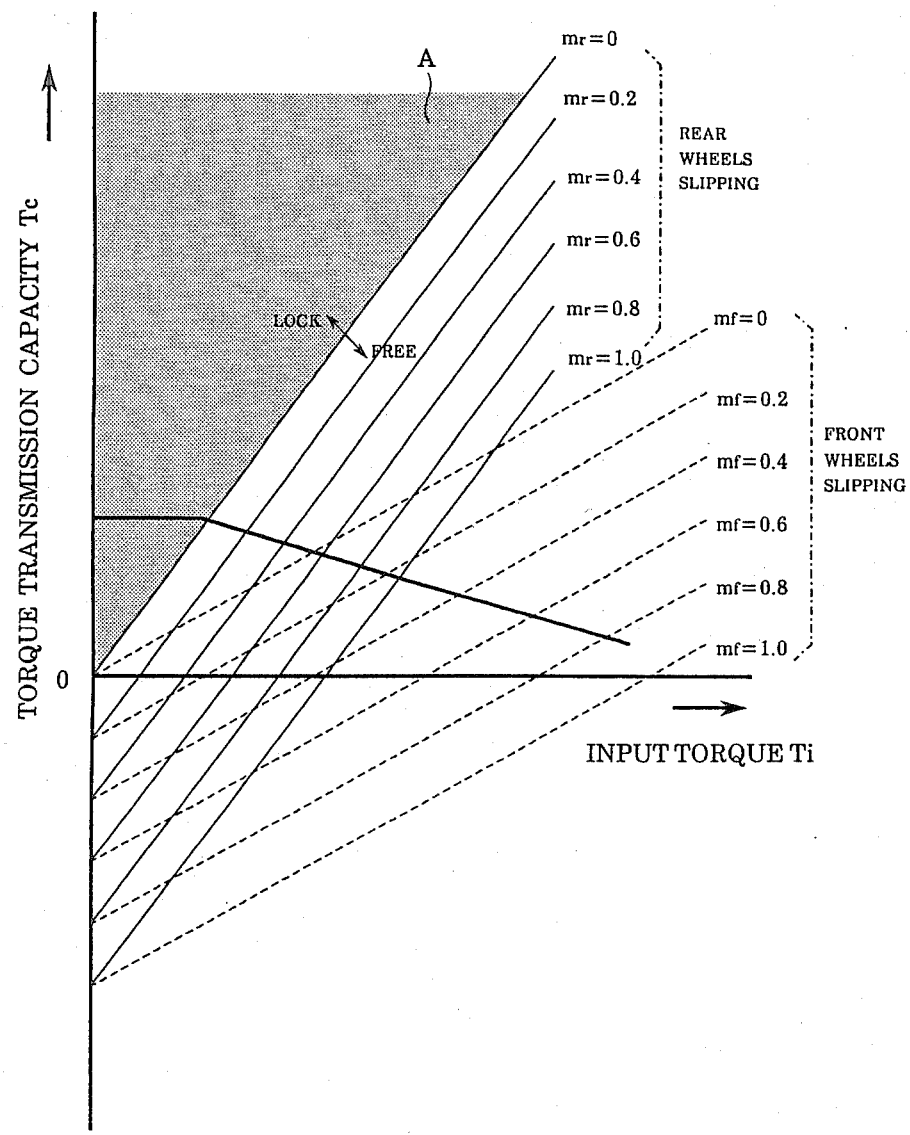
FIG. 12 is a graph relating to the ninth preferred embodiments of the slippage control device and method of the present invention, similar to FIGS. 4, 5 and 8 through 11 for the first, second, and fifth through eighth preferred embodiments respectively, and similarly showing along the vertical axis the torque transmission capacity Tc of the control clutch of the central differential device of the four wheel drive power transfer device, as related to the input torque thereto which is shown along the horizontal axis.
Figure 13:
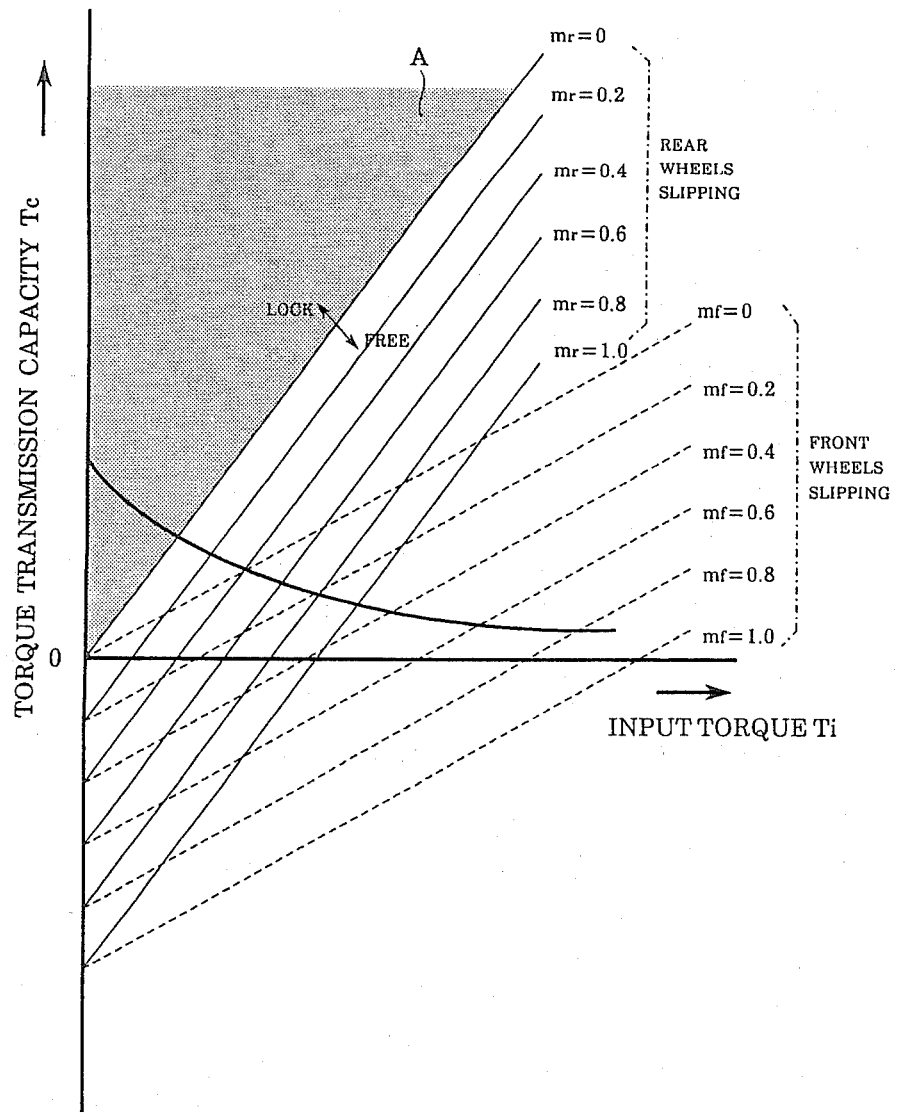
FIG. 13 is a graph relating to the tenth preferred embodiments of the slippage control device and method of the present invention, similar to FIGS. 4, 5, and 8 through 12 for the first, second, and fifth through ninth preferred embodiments respectively, and similarly showing along the vertical axis the torque transmission capacity Tc of the control clutch of the central differential device of the four wheel drive power transfer device, as related to the input torque thereto which is shown along the horizontal axis.

In the sixth preferred embodiments, as shown in FIG. 9, the torque transmission capacity Tc of the central differential control clutch 21 is controlled so as to be a positive non zero value when the input torque value Ti is zero, and so as to increase with increasing input torque Ti but to have a negative rate of change of increase rate. In the seventh preferred embodiments, as shown in FIG. 10, the torque transmission capacity Tc of the central differential control clutch 21 is controlled so as to be a substantially zero value when the input torque value Ti is zero, and so as to increase with increasing input torque Ti but to have a sudden change of increase rate in the negative direction at a certain input torque value. In the eighth preferred embodiments, as shown in FIG. 11, the torque transmission capacity Tc of the central differential control clutch 21 is controlled so as to be a substantially zero value when the input torque value Ti is zero, and so as to increase with increasing input torque Ti but to have a negative rate of change of increase rate. In the ninth preferred embodiments, as shown in FIG. 12, the torque transmission capacity Tc of the central differential control clutch 21 is controlled so as to be a positive non zero value when the input torque value Ti is zero, so as to remain substantially the same so as not substantially to increase or decrease with increasing input torque Ti up to a certain input torque value, and to have a sudden change of increase rate in the negative direction after said certain torque value so as thereafter to decrease steadily with a substantially constant rate of change. And in the tenth preferred embodiments, as shown in FIG. 13, the torque transmission capacity Tc of the central differential control clutch 21 is controlled so as to be a positive non zero value when the input torque value Ti is zero, and so as to decrease with increasing input torque Ti but to have a positive rate of change of increase rate. All of these characteristics may have their particular advantages, in particular circumstances of application.

The Eleventh Preferred Embodiments

No particular flow chart is shown for the portion of the control program which directs the operation of the transmission control device 45, according to the eleventh preferred embodiment of the slippage control method of the present invention, so as to realize the eleventh preferred embodiment of the slippage control device of the present invention. This is again because, based upon the functional disclosures set out in this specification, various possibilities for the details thereof can be easily supplemented as appropriate by one of ordinary skill in the transmission control and the programming arts. Such a program portion is again executed at regular intervals of for example a few milliseconds.

Figure 14:
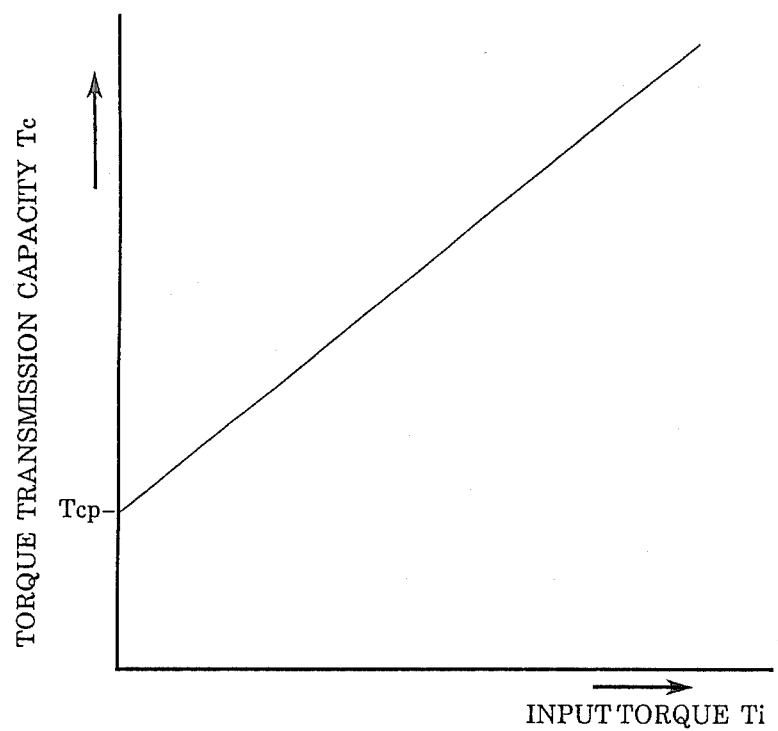
FIG. 14 is a graph relating to the eleventh preferred embodiments of the slippage conrol device and method of the present invention, similar to but much simpler than FIGS. 4, 5, and 8 through 13 for the first, second, and fifth through tenth preferred embodiments respectively, and similarly showing along the vertical axis the torque transmission capacity Tc of the control clutch of the central differential device of the four wheel drive power transfer device, as related to the input torque thereto which is shown along the horizontal axis.

In these eleventh preferred embodiments, which closely resemble the fifth preferred embodiments, the control is carried out in the manner specified by the graph shown in FIG. 14 of the accompanying drawings: a pulse signal with a duty ratio value corresponding to $k.Ti + Tcp$ is dispatched to the electromagnetically actuated hydraulic fluid switching value 41, so that the torque transmission capacity Tc of the clutch 21 is set to the value $k.Ti + Tcp$. Again, Ti represents the value of the torque which is being supplied by the transmission mechanism 2 as input torque to the four wheel drive power transfer device 3, while the value k is a coefficient and the value Tcp is a constant.

As before, in FIG. 14, the line shows the torque transmission capacity Tc of the central differential control clutch 21, as it is related to the torque Ti input to the central differential device 10 of the four wheel drive power transfer device 3. By controlling the torque transmission capacity Tc as described above, if the input torque Ti is zero or substantially zero, then Tc is substantially equal to Tcp, and thereby so called pre torque is provided, and thereafter the torque transmission capacity of the central differential control clutch 21 is increased as the input torque Ti thereto increases. Thus, even when the input torque is zero or substantially zero, the central differential control clutch 21 is maintained in a condition of being able to transmit some torque, and is not completely disengaged.

By this means the differential control clutch 21 is maintained at a certain torque transmission capacity Tcp even if the input torque Ti is zero, and is not completely disengaged. Since the increase in the transmission capacity Tc of the differential control clutch 21 with an increase the input torque Ti begins from the value Tcp, control to increase the torque transmission capacity can be carried out without producing a large stock accompanying a sudden change in the driving conditions of the vehicle, and with good responsiveness.

Also, under driving conditions when the input torque Ti to the clutch 21 is low, even if one of the front wheels or rear wheels should peradventure slip with respect to the road surface, at an absolute minimum limit the torque transmission capacity corresponding to this certain value Tcp is transmitted by the differential control clutch 21 to the wheels which are not slipping, and on this occasion a complete loss of drive power to all wheels is cleanly and crisply avoided.

It should be noted that in the above described eleventh preferred embodiments the four wheel drive control clutch is a differential control clutch 21, but in the present invention the four wheel drive control clutch is not restricted to being such a differential control clutch, but may be a center clutch including the function of a center differential device and connecting the front vehicle wheels and rear vehicle wheels with a certain torque transmission capacity.

The setting of the pre torque of the four wheel drive control clutch may be carried out by the application of a servo hydraulic pressure to a hydraulic servo, as is contemplated in the above described implementation, but such a pre torque may also be applied by means of a biasing spring or the like physical means.

The Twelfth Preferred Embodiments

Figure 15:
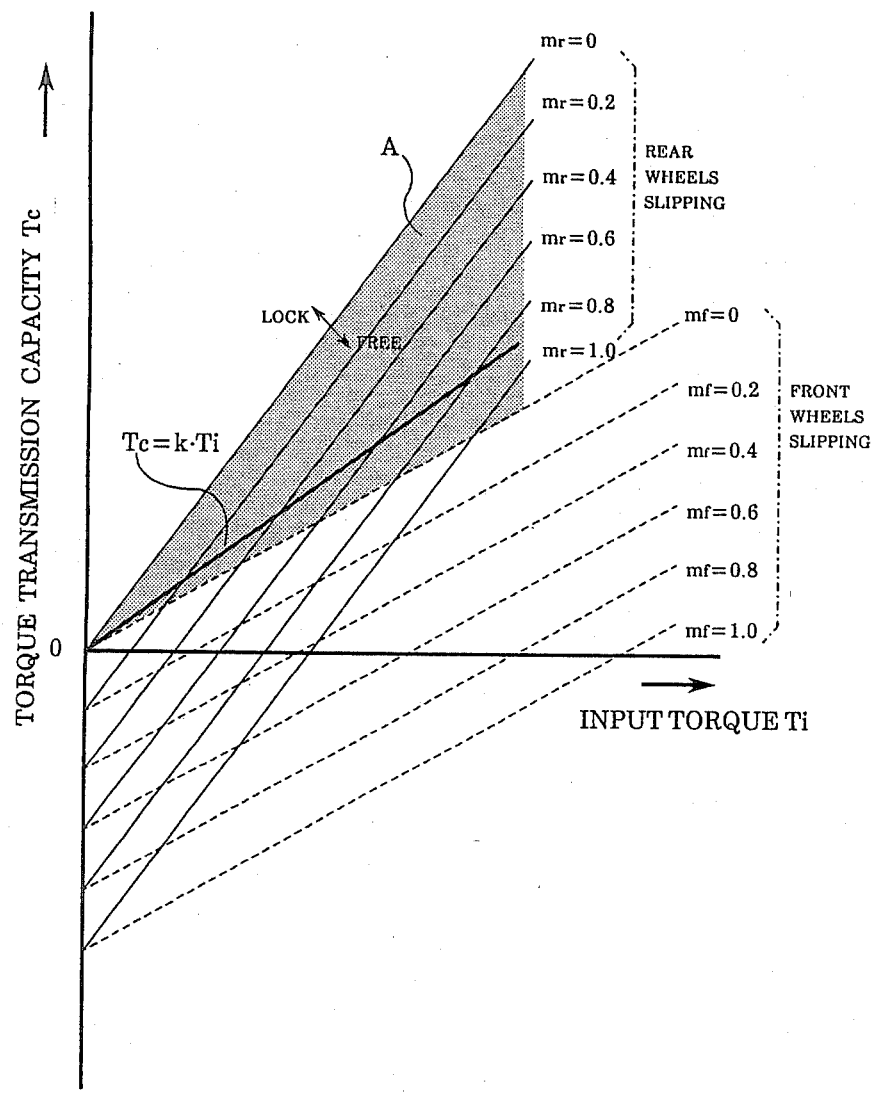
FIG. 15 is a graph relating to the twelfth preferred embodiments of the slippage control device and method of the present invention, similar to FIGS. 4, 5, and 8 through 14 for the first, second, and fifth through eleventh preferred embodiments respectively, and similarly showing along the vertical axis the torque transmission capacity Tc of the control clutch of the central differential device of the four wheel drive power transfer device, as related to the input torque thereto which is shown along the horizontal axis.

FIG. 15 shows the operation according to the twelfth preferred embodiments of the device and the method of the present invention, said operation being provided by the functioning of appropriate program portions of which again no particular flow charts are shown, because again, based upon the functional disclosures set out in this specification, various possibilities for the details thereof can be easily supplemented as appropriate by one of ordinary skill in the transmission control and the programming arts.

In these twelfth preferred embodiments, as shown in FIG. 15, the control is carried out in a linear and proportional manner: a pulse signal with a duty ratio value corresponding to k.Ti is dispatched to the electromagnetically actuated hydraulic fluid switching valve 41, so that the torque transmission capacity Tc of the clutch 21 is set to the value k.Ti. Ti again represents the value of the torque which is being supplied by the transmission mechanism 2 as input torque to the four wheel drive power transfer device 3, while the value k is a coefficient. The torque transmission capacity Tc of the central differential control clutch 21 is thus controlled so as to be a substantially zero value when the input torque value Ti is zero, and so as to increase with increasing input torque Ti steadily with a substantially constant rate of change. This characteristic may have its particular advantages, in particular circumstances of application. As before, in this figure, the thin lines show $Tc = \{1/(1+rho)\}Ti - (mur.Fnr.Rr/ir)$ for the values mur=0, mur=0.2, mur=0.4, mur=0.6, mur=0.8, and mur=1, respectively; the dashed lines show $Tc = \{rho/(1+rho)\}Ti - (muf.Fnf.Rf/if)$ for values of muf=0, muf=0.2, muf=0.4, muf=0.6, muf=0.8, and muf=1, respectively; and the region of the figure denoted by "A" is the region where Tc is greater than or equal to $\{1/(1+rho)\}Ti$, i.e. is that region in which the central differential control clutch 21 is always completely engaged. It will be seen that the torque transmission capacity Tc of the central differential control clutch 21 is controlled as shown by the heavy line in the figure, and it will be noted that in this case this torque transmission characteristic extends across the various characteristic lines $Tc = \{1/(1+rho)\}Ti - (mur.Fnr.Rr/ir)$ for slippage determination for the rear wheels but not across the various characteristic lines $Tc = \{1/(1+rho)\}Ti - (muf.Fnf.Rf/if)$ for slippage determination for the front wheels. Again, in the embodiment shown in the drawings the ring gear 14 of the center differential device 10 is connected to the rear wheel drive shaft 15 and the sun gear 13 of the center differential device 10 is connected to the front wheel drive shaft 17, so that $\{1/(1+rho)\}/\{rho/(1+rho)\}$ is approximately 7/3 to 6/4.

Therefore, for the front vehicle wheels not to slip with respect to the road surface, the coefficient k in the expression $Tc = k.Ti$ is determined appropriately in order that the relation $\{1/(1+rho)\}Ti >= Tc <= \{rho/(1+rho)\}Ti$ should hold, or in other words in order that the torque transmission capacity Tc of the differential control clutch 21 should be within the region indicated by "A" in FIG. 15. In fact, the solid line which is the characteristic curve of behavior of these twelfth preferred embodiments does lie entirely within the region indicated by "A" in FIG. 15, as will be clear from a cursory glance at that figure.

In the case of these twelfth preferred embodiments, by appropriately controlling the torque transmission capacity Tc of the central differential control clutch 21 according to the input torque Ti, the center differential device 10 is in fact never put completely in the locked up state, so that, if the front vehicle wheels should be in a position to slip, or if in other words if an excessive drive torque should be about to be applied to the front vehicle wheels, that excess torque will be transmitted as so called circulation torque through the differential control clutch 21 to the rear vehicle wheels. Thereby the application of excess drive torque to the front vehicle wheels is avoided, and even if the coefficient of friction of the tires fitted to the front vehicle wheels with respect to the road surface is for example extremely low, slipping of the front vehicle wheels will be definitely avoided.

The Thirteenth Preferred Embodiments

Figure 16:
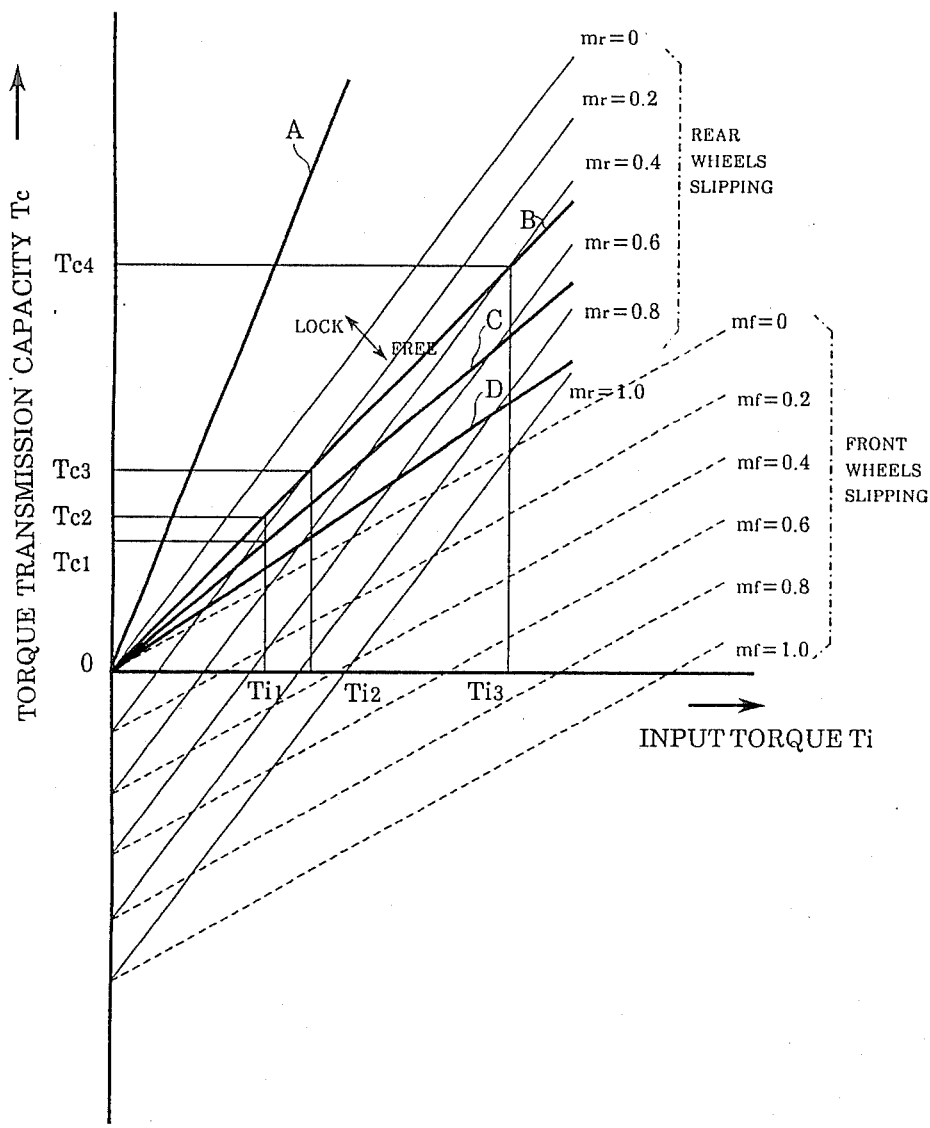
FIG. 16 is a graph relating to the thirteenth preferred embodiments of the slippage control device and method of the present invention, similar to FIGS. 4, 5, and 8 through 15 for the first, second, and fifth through twelfth preferred embodiments respectively, and similarly showing along the vertical axis the torque transmission capacity Tc of the control clutch of the central differential device of the four wheel drive power transfer device, as related to the input torque thereto which is shown along the horizontal axis.

FIG. 16 shows the operation according to the thirteenth preferred embodiments of the device and the method of the present invention, said operation being provided by the functioning of appropriate program portions of which again no particular flow charts are shown, because again, based upon the functional disclosures set out in this specification, various possibilities for the details thereof can be easily supplemented as appropriate by one of ordinary skill in the transmission control and the programming arts.

In these thirteenth preferred embodiments, as shown in FIG. 16, the control is carried out in a linear and proportional manner, with the constant of proportion now depending upon the setting of the manual mode select device 50 as shown in FIG. 1: a pulse signal with a duty ratio value corresponding to kx.Ti is dispatched to the electromagnetically actuated hydraulic fluid switching valve 41, with kx being a coefficient the value of which depends upon the setting of said manual mode select device 50, so that the torque transmission capacity Tc of the clutch 21 is set to the value kx.Ti. Thus, Ti again represents the value of the torque which is being supplied by the transmission mechanism 2 as input torque to the four wheel drive power transfer device 3, while the coefficient value kx is varied according to manual setting by the vehicle driver. The torque transmission capacity Tc of the central differential control clutch 21 is thus controlled so as to be a substantially zero value when the input torque value Ti is zero, and so as to increase with increasing input torque Ti steadily with a substantially constant rate of change which is determined by the vehicle driver according to circumstances, as appropriate. This characteristic may have its particular advantages, in particular circumstances of application. As before, in FIG. 16, the thin lines show $Tc = \{1/(1+rho)\}Ti - (mur.Fnr.Rr/ir)$ for the values mur=0, mur=0.2, mur=0.4, mur=0.6, mur=0.8, and mur=1, respectively; and the dashed lines show $Tc = \{rho/(1+rho)\}Ti - (muf.Fnf.Rf/if)$ for values of muf=0, muf=0.2, muf=0.4, muf=0.6, muf=0.8, and muf=1, respectively. In the shown thirteenth preferred embodiments, the manual mode select device 50 has four positions to which it may be set by the driver, and the four heavy lines in FIG. 16 denoted as "A", "B", "C", and "D" show the control behavior for the torque transmission capacity Tc of the central differential control clutch 21 in each case. Again, in the embodiment shown in the drawings the ring gear 14 of the center differential device 10 is connected to the rear wheel drive shaft 15 and the sun gear 13 of the center differential device 10 is connected to the front wheel drive shaft 17, so that $\{1/(1+rho)\}/\{rho/(1+rho)\}$ is approximately 7/3 to 6/4.

Therefore, if the torque transmission capacity Tc of the control clutch 21 is set by the manual characteristics setting device 50 as shown by the line "A" in FIG. 16, at all times the central differential control clutch 21 is maintained in the completely engaged state, and the center differential device 10 will be constantly in the locked up state, and will not perform any differential function.

On the other hand, if the torque transmission capacity Tc is set by the manual characteristics setting device 50 as shown by the line "B" in FIG. 16, if the coefficient of friction of the road surface being driven on mur is equal to 0.2, if the input torque Ti to the central differential device 10 is not more than a certain value Ti2, even if slip occurs at the rear vehicle wheels, the center differential device 10 will be maintained substantially in a locked up state, and a rotational speed difference will not occur between the front vehicle wheels and the rear vehicle wheels, and at this time the torque transmission capacity Tc of the central differential control clutch 21 will be less than a certain value Tc3, and a drive torque corresponding to the torque transmission capacity Tc which is held below this certain value Tc3 is transmitted from the rear vehicle wheels to the front vehicle wheels through said central differential control clutch 21, and thereby the slippage amount of the rear vehicle wheels is reduced and at the same time the drive torque applied to the front vehicle wheels is increased, and at this time, if the front vehicle wheels are not slipping, the drive torque effectively applied to driving the vehicle is increased.

Under the same conditions, if the coefficient of friction of the road surface being driven on mur is equal to 0.4, if the input torque Ti to the central differential device 10 is not more than a certain value Ti3 (Ti3 is greater than Ti2), even if slippage occurs at the rear vehicle wheels, the center differential device 10 will be maintained substantially in a locked up state, and a rotational speed difference will not occur between the front vehicle wheels and the rear vehicle wheels, and at this time the torque transmission capacity Tc of the differential control clutch 21 will be less than a certain value Tc4 (Tc4 is greater than Tc3), and a drive torque corresponding to the torque transmission capacity Tc which is held below this certain value Tc4 is transmitted from the rear vehicle wheels to the front vehicle wheels through the differential control clutch 21, and thereby the slippage amount of the rear vehicle wheels is reduced and at the same time the drive torque applied to the front vehicle wheels is increased, and in this case also, if the front vehicle wheels are not slipping, the drive torque effectively applied to driving the vehicle is increased.

Therefore in this case during slippage, the transmission amount of drive torque between the front vehicle wheels and the rear vehicle wheels by the differential control clutch 21 is restricted to be a smaller value when the coefficient of friction of mu of the road surface being driven upon is smaller. By this means, under conditions when the coefficient of friction is small, excessive transmission of drive torque from a vehicle wheel which is slipping to a vehicle wheel which is not slipping is avoided, and thereby slippage is prevented from being extended to those of the vehicle wheels which are not currently slipping.

Further, if the torque transmission capacity Tc of the central differential device control clutch 21 is set by the manual characteristics setting device 50 as shown by the line "C" or by the line "D" in FIG. 16, the range of differential operation of the center differential device 10 is increased.

Since, in all cases, when the torque Ti which is being input to the central differential device 10 of the four wheel drive power transfer device 3 from the transmission mechanism 2 is substantially zero the torque transmission capacity Tc of the differential control clutch 21 is set to be substantially zero, and if, as explained earlier to be further preferable, when the throttle opening of the internal combustion engine 1 is not more than a certain value the torque transmission capacity Tc of the differential control clutch 21 is also set to be substantially zero, in other words the differential control clutch 21 is set to a completely disengaged state, in these operational conditions the center differential device 10 carries out its differential function without restriction. Therefore, in many cases, when the vehicle is turning around a curve, when as is typical in these operational circumstances the accelerator pedal depression is released or is reduced by the vehicle driver, appropriately during such turning the center differential device 10 carries out effectively its differential function, and the occurrence of the tight corner braking phenomenon is thereby avoided.

Second Exemplary Overall Vehicle Power Train Structure

Figure 17:
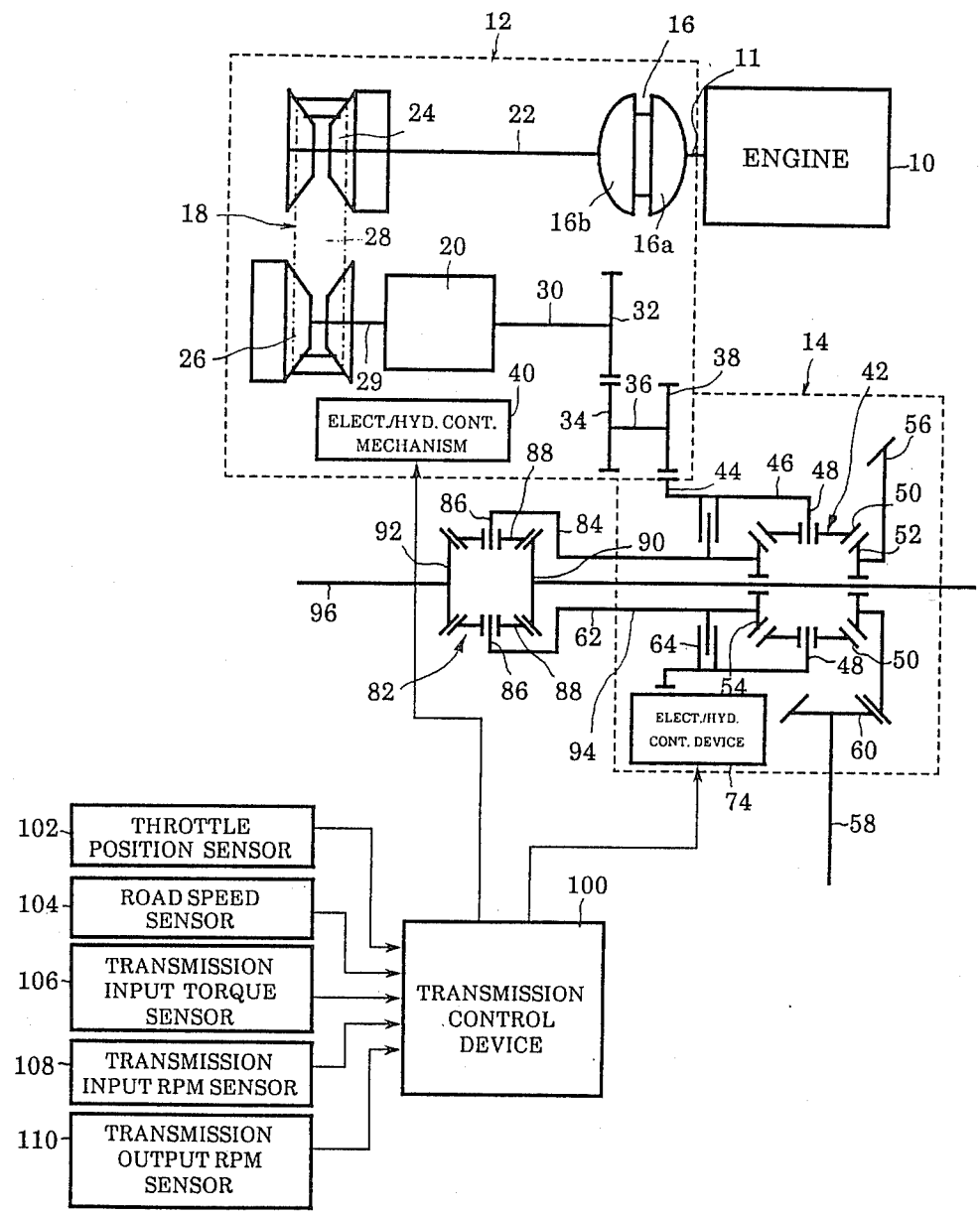
FIG. 17, which is similar to FIG. 1, is a schematic longitudinal skeleton view of another vehicle power train and of a control system therefor which incorporates certain other ones of the preferred embodiments of the slippage control device of the present invention, for practicing the respective preferred method embodiments.

FIG. 17 is a schematic longitudinal skeleton view of a vehicle power train which incorporates some others of the preferred embodiments of the four wheel drive power transmission system slippage control device of the present invention, said device performing corresponding method embodiments. In this figure, the reference numeral 10 denotes an internal combustion engine of said vehicle, which is mounted, in this second exemplary case, transversely in the front engine room (not particularly shown) of said vehicle. And the reference numeral 12 denotes an automatic speed change device (automatic transmission) of a per se known type, while 14 denotes a four wheel drive power transfer device which is always operating in so called full time four wheel drive mode, so as always to drive both the rear pair of wheels of the vehicle and also the front pair of wheels of the vehicle, albeit with the differential action provided by this four wheel drive power transfer device 14 being selectably either provided or not provided, as will be explained in detail hereinafter.

In more detail, the automatic speed change device 12 incorporates a fluid torque converter 16 of a per se known construction, and the power input shaft 11 of this fluid torque converter 16 is connected to and receives rotational power from a crank shaft of the internal combustion engine 10. And the fluid torque converter 16 comprises a pump impeller member 16a and a turbine member 16b, as is per se conventional, while the automatic speed change device 12 comprises, in this case, an infinitely variable or continuously variable belt type speed change mechanism 18 and a forward /reverse switchover device 20. And an input pulley 24 of the continuously variable speed change mechanism 18 is connected to and receives rotational power from the power output shaft 22 of the fluid torque converter 16; and thereby the continuously variable speed change mechanism 18 receives rotational power from the internal combustion engine 10, with a certain degree of slippage and also torque amplification being provided for said rotational power by the fluid torque converter 16 (unless a lock up clutch thereof, if provided thereto, is activated) as is per se conventional. This continuously variable speed change mechanism 18 may be of a per se known type, and incorporates, as well as the input pulley 24, an output pulley 26, and a drive belt 28 spanning between said input pulley 24 and said output pulley 26, and, according to selective variation in a reciprocal manner of the effective radiuses of said input pulley 24 and said output pulley 26 provided by an electrically controlled electric/hydraulic control mechanism 40 of a per se known sort, provides any desired one of an infinite and continuous set of speed reduction stages between its power input shaft 22 and its power output shaft 29, its said power output shaft 29 driving the forward/reverse switchover device 20 which in its turn via a power output shaft 30, an intermediate gear wheel 32, another intermediate gear wheel 34 meshed with said intermediate gear wheel 32, a power output shaft 36, and an output gear pinion 38, drives the four wheel drive power transfer device 14 as will be explained shortly. The forward/reverse switchover device 20 is also controlled by the electrically controlled electric/hydraulic control mechanism 40.

This four wheel drive power transfer device 14 incorporates a center differential device 42 of a bevel gear wheel type for providing full time differential action between the front wheels of the vehicle and the rear wheels of the vehicle during the full time four wheel drive operation thereof. Now the detailed construction of this center differential device 42 will be explained. It comprises a differential case 46 which is provided integrally with a power input gear wheel 44 which is meshed with the aforementioned output gear pinion 38, and to this differential case 46 there are rotatably mounted by two pinion shafts 48 two differential pinions 50 which directly oppose one another. On the right as seen in the figure there is provided a rear wheel power output gear wheel 52 which is meshed with both of these differential pinions 50, and similarly on the left as seen in the figure there is provided a front wheel power output gear wheel 54 which is likewise meshed with both of the differential pinions 50.

To the rear wheel power output gear wheel 52 there is connected a rear wheel output side gear wheel 56, and a rear wheel drive gear wheel 60 is meshed with this rear wheel output side gear wheel 56 and drives a rear wheel drive shaft 58. This rear wheel drive shaft 58 rotationally drives the front end of a rear wheel propeller shaft (not particularly shown) the rear end of which rotationally drives a power input shaft of a rear wheels differential device (not particularly shown either) for driving the rear wheels (also not shown) of the vehicle.

Further, to the front wheel power output gear wheel 54 there is connected the end of a tubular front wheel drive shaft 62 which rotationally drives the differential case 84 of a front wheels differential device 82 of a bevel gear wheel type for providing differential action between the front wheels of the vehicle. Now the detailed construction of this front wheels differential device 82 will be explained. It comprises said differential case 84, and to this differential case 84 there are rotatably mounted by two pinion shafts 86 two differential pinions 88 which directly oppose one another. On the left as seen in the figure there is provided a left front wheel power output gear wheel 92 which is meshed with both of these differential pinions 88, and similarly on the right as seen in the figure there is provided a right front wheel power output gear wheel 90 which is likewise meshed with both of the differential pinions 88. The left front wheel power output gear wheel 92 rotationally drives a left front wheel drive shaft 96 which leads to the left front wheel of the vehicle (not particularly shown) to drive it, and similarly the right front wheel power output gear wheel 90 rotationally drives a right front wheel drive shaft 94 which passes through the center of the center differential device 42 and then leads to the right front wheel of the vehicle (not particularly shown either) to drive it.

Further, within the four wheel drive power transfer device 14 there is provided a hydraulically operated wet type multi plate type clutch 64, which selectively either rotationally connects together, in this second exemplary case, the differential casing 46 which is the rotational power input member of the center differential device 42 and the tubular front wheel drive shaft 62, or alternatively allows said members to rotate freely with respect to one another. This wet clutch 64 is selectively operated by an electrically actuated electric/hydraulic control device 74. Accordingly, the four wheel drive power transfer device 14, which receives rotational power input from the continuously variable speed change mechanism 18 and outputs said rotational power to the rear wheel power output shaft 58 and to the front wheel power output shaft 62, can be caused either to provide differential action for distributing said rotational power between said rear wheel power output shaft 58 and said front wheel power output shaft 62 or not to provide any such differential action and just to drive said shafts 58 and 62 independently. This clutch 64 of the central differential device 42 of the four wheel drive power transfer device 14 is similar to the clutch 21 described earlier with respect to FIG. 2, as fitted to the first exemplary gear train of FIG. 1, and thus will not be particularly detailed here; and the actuation and control system for said clutch 64 is similar to that for said previously described clutch 21, already detailed, and hence will not be described in detail either: again, said actuation and control system for said clutch 64 functions to engage said clutch 64 to provide a torque transmission capacity between the rear wheel power output shaft 58 and the front wheel power output shaft 62 which can be varied, according to the duty ratio of a pulsed electrical signal supplied by the electrically actuated electric/hydraulic control device 74 to it, to be any value between substantially zero and the substantially full rotational coupling together condition; and thereby the differential action of said central differential device 42 of said four wheel drive power transfer device 14 can be impeded by any amount between substantially zero and substantially the fully impeded condition.

This vehicle power train operates in a manner which will be clear to one of ordinary skill in the art, based upon the discussions in this specification, and hence will not be further explained in view of the desirability of conciseness of explanation.

The Transmission Control System

The following detectors and sensors are provided to this system (vide FIG. 17). A throttle position sensor 102 detects a value representative of the current load on the internal combustion engine 10 by measuring the opening angle of the throttle valve (not particularly shown) of a carburetor (not shown either) of said engine 10, and outputs an electrical signal representative thereof. A road speed sensor 104 detects a value representative of the road speed of the vehicle by measuring the rotational speed of the rear wheel power output shaft 15, and outputs an electrical signal representative thereof. A speed change mechanism input torque sensor 106 senses the torque that is being supplied as input torque to the continuously variable speed change mechanism 18, and outputs an electrical signal representative thereof. A speed change mechanism input rotational speed sensor 108 senses the rotational speed of the input member (the input pulley 24) of the continuously variable speed change mechanism 18, and outputs an electrical signal representative thereof. And a speed change mechanism output rotational speed sensor 110 senses the rotational speed of the output member (the output pulley 26) of the continuously variable speed change mechanism 18, and outputs an electrical signal representative thereof. The output signals of these five sensors and switches 102, 104, 106, 108, and 110 are fed to a transmission control device 100.

This transmission control device 100 outputs control signals for controlling the electric/hydraulic control device 74 for the four wheel drive power transfer device 14 and the electrical/hydraulic control mechanism 40 for the continuously variable speed change mechanism 18, as will now be explained. No concrete illustration of the structure of any particular realization of the transmission control device 100 will be given herein, since various possibilities for the details thereof can be easily supplemented by one of ordinary skill in the electronic art based upon the functional disclosures set out in this specification. In the various further to be described preferred embodiments of the present invention, in each case, the transmission control device 100 is typically concretely realized as a micro computer and its associated circuitry, said micro computer operating at the behest of a control program, various ones of which will be partially detailed shortly.

The Fourteenth Preferred Embodiments

Figure 18:
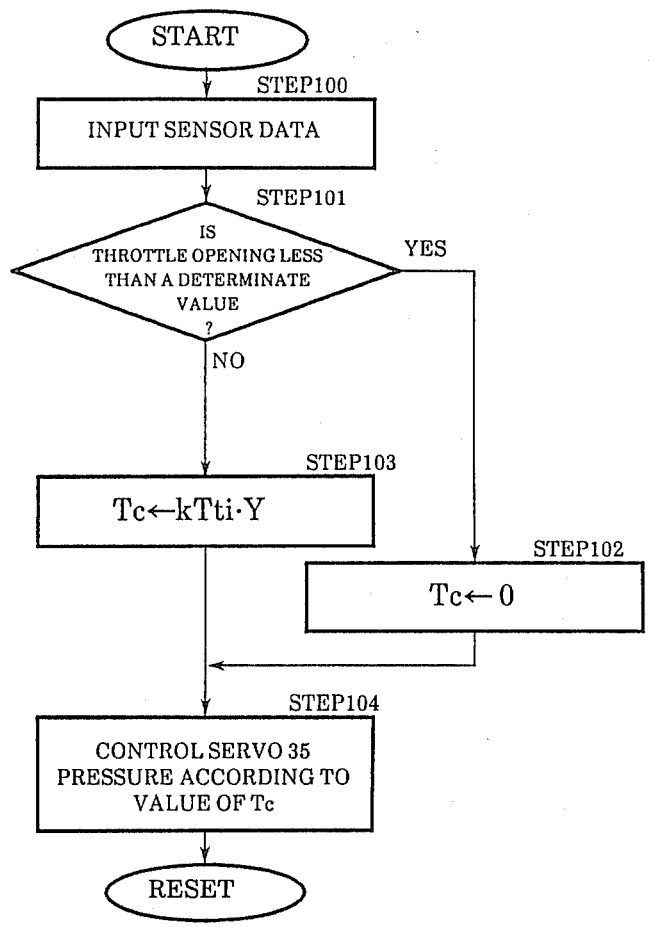
FIG. 18, which is similar to FIG. 3 for the first preferred embodiments, is a partial flow chart for illustrating a slippage control portion of a program obeyed by a micro computer incorporated in the control system of FIG. 17, to realize the fourteenth preferred embodiments of the slippage control device and method of the present invention, said program portion being executed at regular and frequent intervals.

Now, in FIG. 18, a fragmentary flow chart is shown for a portion of the aforementioned control program which directs the operation of the transmission control device 100, according to the fourteenth preferred embodiment of the slippage control method of the present invention, so as to realize the fourteenth preferred embodiment of the slippage control device of the present invention. This flow chart will now be explained. It should be understood that the transmission control device 100 generally functions so as to engage an appropriate speed of the continuously variable speed change mechanism 18 of the transmission mechanism 2 according to the current values of various vehicle operating parameters such as the vehicle road speed as sensed by the vehicle road speed sensor 104, the engine load (throttle opening) as sensed by the throttle position sensor 102, and possibly other parameters; such a function may be performed in a per se conventional way, and no particular program therefor is shown or suggested in this specification, since various possibilities for the details thereof can be easily supplemented as appropriate by one of ordinary skill in the transmission control and the programming arts, particularly when based upon the functional disclosures set out in this specification. The flow chart of FIG. 18 only shows the portion of the control program of the transmission control device 100 which controls the clutch 64 of the center differential device 42 of the four wheel drive power transfer device 14, i.e. only shows the slippage control routine of the transmission control device 100. This program portion is executed at regular intervals of for example a few milliseconds, of course after the engine 10 is started as the four wheel drive vehicle incorporating it is driven.

Thus, in this slippage control routine, at its beginning after the START block, in its first step 100, the microprocessor incorporated in the transmission control device 100 inputs the data from the various sensors described above, and then the flow of control passes next to the decision step 101.

In this decision step 101, said microprocessor makes a decision as to whether or not the current value of engine throttle opening is less than a determinate value which corresponds to just above the idling engine operational condition. If the answer to this decision is YES, so that in fact the current value of engine throttle opening is less than said determinate value, then next the flow of control passes to the step 102. On the other hand, if the answer to this decision is NO, so that in fact the current value of engine throttle opening is greater than said determinate value, then next the flow of control passes to the step 103.

In the step 102 at which point it has been determined that the current value of engine throttle opening is less than the determinate value therefor, the microprocessor sets to zero the value of a variable Tc that represents the torque transmission capacity to which it is desired that the clutch 64 should be set; and then the flow of control passes next to the step 104.

Alternatively, on the other hand, in the step 103 at which point it has been determined that the current value of engine throttle opening is greater than the determinate value therefor, the microprocessor sets the value of said torque transmission capacity Tc for the clutch 64 to kTti.Y, where k1 is an appropriate constant, Tti is the current value of the torque that is being supplied as input torque to the continuously variable speed change mechanism 18 as sensed by the input torque sensor 106 therefor, and Y is the current speed ratio being provided by the continuously variable speed change mechanism 18; and then as before the flow of control passes next to the step 104. In other words, Y is the ratio of the current output rotational speed of the continuously variable speed change mechanism 18 to the current input rotational speed thereof, as determined by the sensors 108 and 110 therefor. Thus, with the reduction of this speed ratio Y, for the same value of torque Tti input to the continuously variable speed change mechanism 18, the torque transmission capacity Tc for the clutch 64 is reduced.

Next, in the step 104 to which the flow of control passes from all the three branches of program flow detailed above, the transmission control device 100 outputs a pulsed electrical signal to the electrically actuated electric/hydraulic control device 74 of duty ratio appropriate to cause the clutch 64 of the center differential device 42 of the four wheel drive power transfer device 14 to be engaged to such an extent as to provide a torque transmission capacity therefor corresponding to the value Tc just determined, so as to rotationally couple together the differential casing 46 and the tubular front wheel drive shaft 62 to a degree determined by said torque transmission capacity Tc, so as therefore to allow said center differential device 42 to perform its differential action between the front vehicle wheels and the rear vehicle wheels while being impeded by an amount corresponding to said torque transmission capacity Tc, to thus drive said front vehicle wheels and said rear vehicle wheels from the engine 10 while distributing rotational power and torque between them with differential action impeded by this appropriate amount; and then the flow of control passes next to exit this routine, without doing anything further.

And, by the repetition of the FIG. 18 program in a relatively light and quick cycle with a period of the order of milliseconds, the control of the clutch 64 of the central differential device 42 of the four wheel drive power transfer device 14 is maintained.

Figure 19:
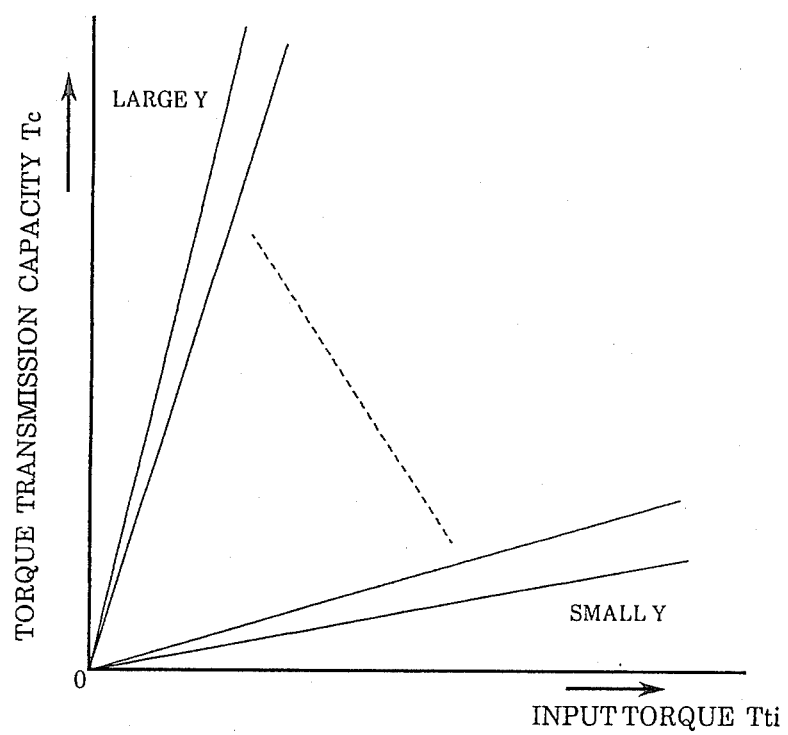
FIG. 19 is a graph relating to said fourteenth preferred embodiments of the slippage control device and method of the present invention, similar to FIGS. 4, 5, and 8 through 16 for the first, second, and fifth through thirteenth preferred embodiments respectively, and similarly showing along the vertical axis the torque transmission capacity Tc of the control clutch of the central differential device of the four wheel drive power transfer device, as related to input torque, now, to a continuously variable speed change mechanism, which is shown along the horizontal axis.

Thus, when the engine throttle opening is less than the determinate value therfor, an OFF signal with a duty ratio value of substantially zero is dispatched, so that the torque transmission capacity Tc of the clutch 64 is set to be substantially zero; but, when the engine throttle opening is greater than the determinate value therefor, a pulse signal with a duty ratio value corresponding to k.Tti.Y is dispatched, so that the torque transmission capacity Tc of the clutch 64 is set to the value k.Titi.Y. Thereby, the torque transmission capacity Tc of the clutch 64 is set to substantially zero when the vehicle engine throttle opening is equal to not more than said determinate value therefor, so that the central differential device 42 is then put into the substantially completely disengaged operational condition; but, when the engine throttle opening is equal to at least said determinate value therefor, then as shown in FIG. 19 the torque transmission capacity Tc of the clutch 64 is increased proportionally along with increase in the input torque Tti to the continuously variable speed change mechanism 18, and the proportional rate of increase is the smaller, the lower is the current speed ratio Y being provided by the continuously variable speed change mechanism 18.

Detection of the input torque Tti to the continuously variable speed change mechanism 18 may be carried out by detecting the input torque directly by using an input torque sensor, but this input torque is almost the same as the output torque of the engine 10, and hence in practice detection of the value Tti may also be performed by calculation from the throttle opening or accelerator pedal depression amount of the internal combustion engine 10, and in this case there will no longer be any necessity to provide a special input torque sensor such as the sensor 106 of the shown fourteenth preferred embodiments.

The Fifteenth Preferred Embodiments

Figure 20:
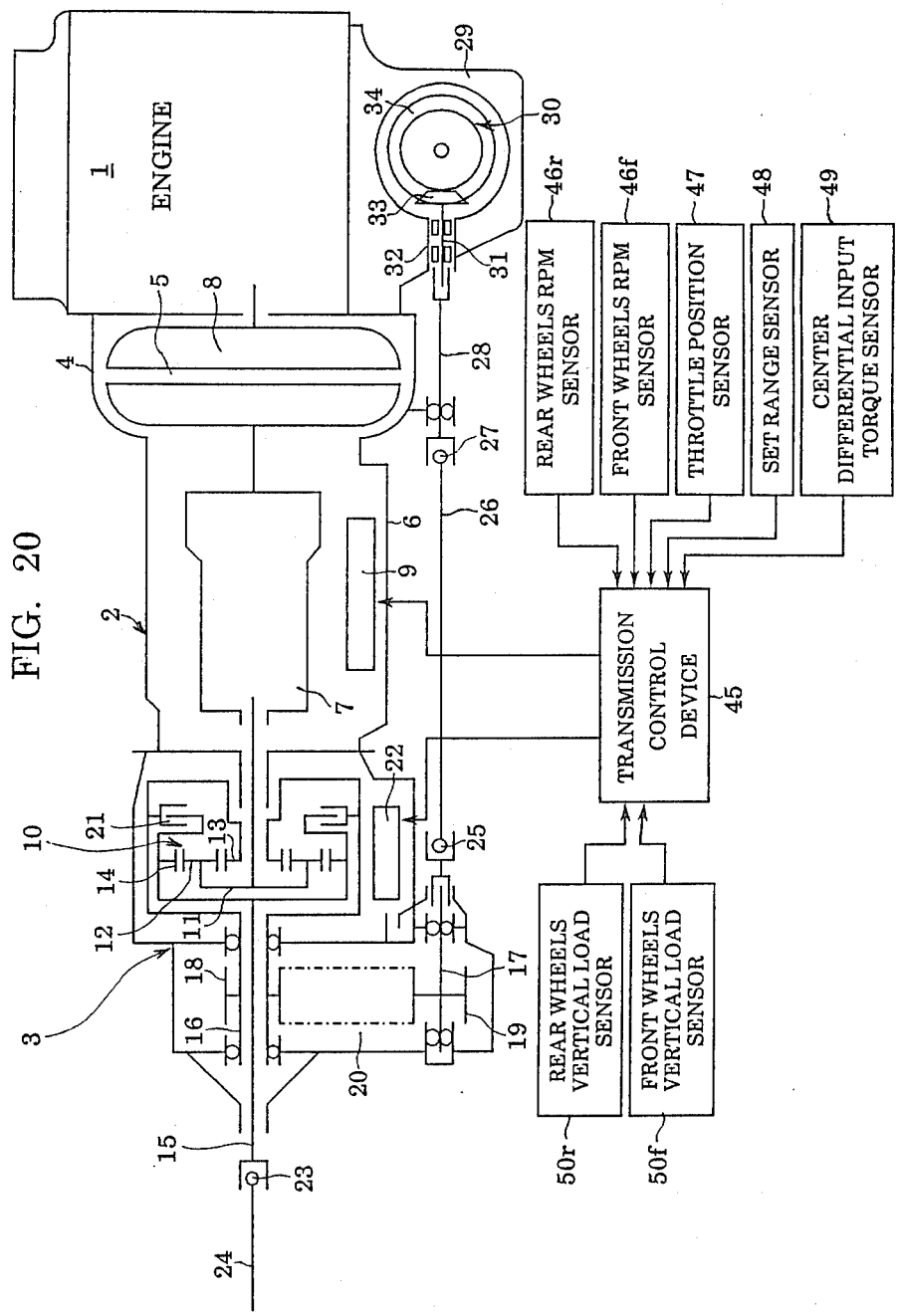
FIG. 20, which is similar to FIG. 1, is a schematic longitudinal skeleton view of another vehicle power train and of a control system therefor which incorporates the fifteenth preferred embodiment of the slippage control device of the present invention, for practicing the fifteenth preferred method embodiment.

FIG. 20 is a schematic longitudinal skeleton view of a vehicle power train which incorporates the fifteenth preferred embodiment of the four wheel drive power transmission system slippage control device of the present invention, said device performing corresponding the fifteenth preferred method embodiment. In this figure, the only difference from the FIG. 1 power train relates to the sensors which are provided. In detail, a rear vehicle wheels rotational speed sensor 46r senses the rotational speed of the rear wheels (not particularly shown) of the vehicle, and outputs an electrical signal representative thereof. A front vehicle wheels rotational speed sensor 46f senses the rotational speed of the front wheels (not particularly shown wither) of the vehicle, and outputs an electrical signal representative thereof. A throttle position sensor 47 detects a value representative of the current load on the internal combustion engine 10 by measuring the opening angle of the throttle valve (not particularly shown) of a carburetor (not shown either) of the engine 1, and outputs an electrical signal representative thereof. A set range sensor 48 detects the set position of a manual range setting valve which is provided for the transmission mechanism 2, or of a setting means therefor, and outputs an electrical signal representative thereof; this manual range setting valve is not particularly shown in the figures, but said setting means therefor is provided in the passenger compartment of the vehicle so as to be readily accessible to the driver of the vehicle, and can be set to any one of a number of set positions corresponding to various operational ranges for the transmission mechanism 2 such as "D" range, "2" range, "L" range, "R" range, "N" range, and "P" range. A central differential device input torque sensor 49 senses the torque that is being supplied as input torque to the central differential device 10, and outputs an electrical signal representative thereof. A rear vehicle wheels vertical load sensor 50r senses the current vertical load to which said rear wheels of the vehicle are currently being subjected, and outputs an electrical signal representative thereof. And a front vehicle wheels vertical load sensor 50f senses the current vertical load to which said front wheels of the vehicle are currently being subjected, and outputs an electrical signal representative thereof. The output signals of these seven sensors and switches 46r, 46f, 47, 48, 49, 50r, and 50f are fed to the transmission control device 45.

Figure 21:
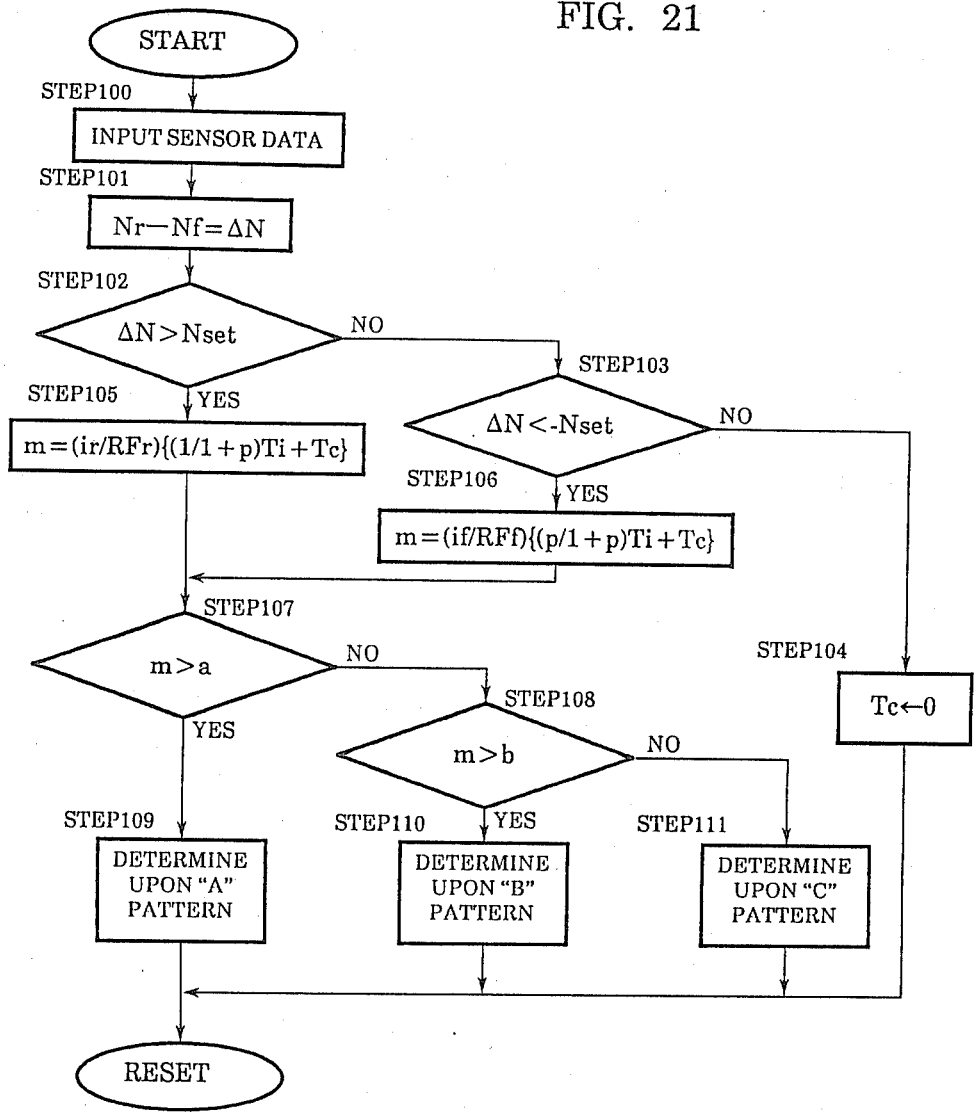
FIG. 21, which is similar to FIG. 18 for the fourteenth preferred embodiments, is a partial flow chart for illustrating a slippage control portion of a program obeyed by a micro computer incorporated in the control system of FIG. 20, to realize the fifteenth preferred embodiments of the slippage control device and method of the present invention, said program portion being executed at regular and frequent intervals.

This transmission control device 45 outputs control signals for controlling the electric/hydraulic control device 22 for the four wheel drive power transfer device 3 and the electrical/hydraulic control mechanism 9 for the gear transmission mechanism 7. Again, no concrete illustration of the structure of any particular realization of the transmission control device 45 will be given herein, since various possibilities for the details thereof can be easily supplemented by one of ordinary skill in the electronic art based upon the functional disclosures set out in this specification. In FIG. 21, a fragmentary flow chart is shown for a portion of the aforementioned control program which directs the operation of the transmission control device 45, according to the fifteenth preferred embodiment of the slippage control method of the present invention, so as to realize the fifteenth preferred embodiment of the slippage control device of the present invention. This flow chart will now be explained. It should be understood that, as before, the transmission control device 45 generally functions so as to engage an appropriate speed of the gear transmission mechanism of the transmission mechanism 2 according to the current values of various vehicle operating parameters such as the vehicle road speed as determined according to the rotational speed of the rear vehicle wheels as sensed by the sensor 46r therefor or the rotational speed of the front vehicle wheels as sensed by the sensor 46f therefor, the engine load (throttle opening) as sensed by the throttle position sensor 47, the currently set range for the transmission to operate in as sensed by the set range sensor 48, and possibly other parameters; such a function may be performed in a per se conventional way, and no particular program therefor is shown or suggested in this specification, since various possibilities for the details thereof can be easily supplemented as appropriate by one of ordinary skill in the transmission control and the programming arts, particularly when based upon the functional disclosures set out in this specification. The flow chart of FIG. 21 thus, now, only shows the portion of the control program of the transmission control device 45 which determines the value Tc for controlling the clutch 21 of the center differential device 10 of the four wheel drive power transfer device 3, i.e. only shows the slippage control routine of the transmission control device 45. This program portion is executed at regular intervals of for example a few milliseconds.

Thus, in this slippage control routine, at its beginning after the START block, in its first step 100, the microprocessor incorporated in the transmission control device 45 inputs the data from the various sensors described above, and then the flow of control passes next to the step 101.

In the step 101, the difference deltaN between the rate of rotation of the rear vehicle wheels as sensed by the sensor 46r therefor and the rate of rotation of the front vehicle wheel as sensed by the sensor 46f therefor is calculated; and then the flow of control passes next to the decision step 102.

In this decision step 102, said microprocessor makes a decision as to whether or not the current value of deltaN (taken as a signed value) is greater than a determinate positive value Nset, which corresponds to the absolute value of the difference between the rotational speeds of the rear vehicle wheels and the front vehicle wheels which is sufficient to diagnose the considerably slipping vehicle operational condition. If the answer to this decision is NO, so that in fact the current value of deltaN is less than said determinate value Nset, then next the flow of control passes to the decision step 103. On the other hand, if the answer to this decision is YES, so that in fact the current value of deltaN is greater than said determinate value Nset, this indicates slippage of at least one of the rear vehicle wheels, and then next the flow of control passes to the step 105.

In the decision step 103, said microprocessor makes a decision as to whether or not the current value of deltaN (again taken as a signed value) is less than minus said determinate positive value Nset. If the answer to this decision is NO, so that in fact the current absolute value of deltaN is less than said determinate value Nset, then next the flow of control passes to the step 104. On the other hand, if the answer to this decision is YES, so that in fact the current value of deltaN is negative and less than minus said determinate value Nset, this indicates slippage of at least one of the front vehicle wheels, and then next the flow of control passes to the step 106.

In the step 104 at which point in the program flow it has been determined that neither the front vehicle wheels nor the rear vehicle wheels are currently slipping, the microprocessor sets to zero the value of a variable Tc that represents the torque transmission capacity to which it is desired that the clutch 64 should be set; and then the flow of control passes next to leave this program portion, without doing anything further. This means that in these operational conditions of no wheel slippage the central differential device 10 of the four wheel drive power transfer device 3 is allowed to perform its differential action in an unhindered fashion, i.e. the clutch 21 is fully disengaged. Thereby, occurrence of the tight corner braking phenomenon while the vehicle is going around a corner is definitely prevented.

Alternatively, in the step 105 at which point it has been determined that the rear vehicle wheels are slipping, the microprocessor derives an expression for m, the coefficient of the road surface on which the vehicle is being driven, from the formula $m=(ir/RFr)\{(1/1+rho)Ti+Tc\}$, and then the flow of control passes next to the decision step 107.

On the other hand, in the step 106 at which point it has been determined that the front vehicle wheels are slipping, the microprocessor similarly derives an expression for m, the coefficient of the road surface on which the vehicle is being driven, from the formula $m=(if/RFf)\{(rho/1+rho)Ti+Tc\}$, and then similarly the flow of control passes next to the decision step 107.

In these alternative steps 105 and 106, one or the other of which is executed when the vehicle is in a slippage operational condition: "ir" represents the rear differential device reduction ratio; "if" represents the front differential device reduction ratio; "R" represents the effective tire radius; "Fr" represents the vertical load on the rear wheels as detected by the rear wheels load sensor 50r; "Ff" represents the vertical load on the front wheels as detected by the front wheels load sensor 50f; "rho" represents the ratio of the number of teeth of the sun gear 13 to the number of teeth of the ring gear 14, in the center differential device 10 of the four wheel drive power transfer device 3; "Ti" represents the input torque applied to the four wheel drive transfer device 3 detected by the input torque sensor 49; and "Tc" represents the torque transmission capacity of the differential control clutch 21.

Next, in the decision step 107 to which the flow of control passes when it is thus determined that any one or more of the vehicle wheels is currently undergoing the slippage operation condition, a decision is made as to whether the determined value m of the road surface coefficient of friction is greater than a determinate value designated as "a", or not. If the result of this decision is YES, so that m>a holds, then the flow of control passes next to the step 109; but, if the result of this decision is NO, so that m<a holds, then the flow of control passes next to the decision step 108.

In the decision step 108 to which the flow of control passes when it is thus determined that m<a, a decision is made as to whether the determined value m of the road surface coefficient of friction is greater than a determinate value designated as "b" which is less than the value a, or not. If the result of this decision is YES, so that a>m>b holds, i.e. the coefficient of friction m is between a and b, then the flow of control passes next to the step 110; but, if the result of this decision is NO, so that m<b<a holds, then the flow of control passes next to the step 111.

Figure 22:
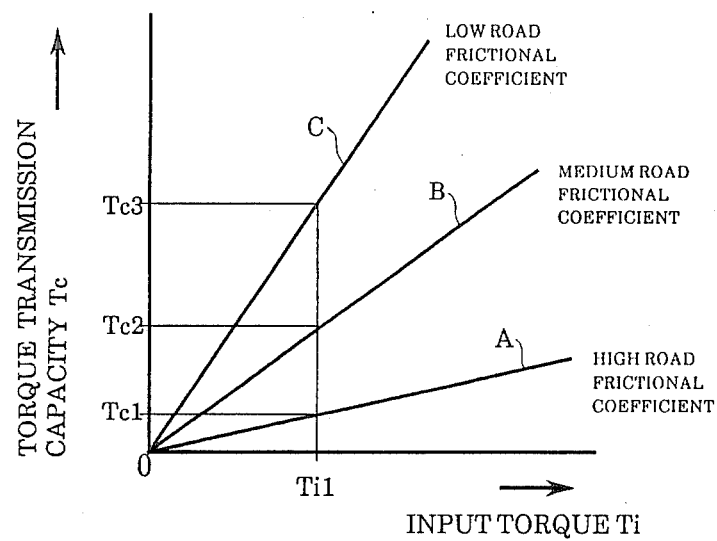
FIG. 22 is a graph relating to said fourteenth preferred embodiments of the slippage control device and method of the present invention, similar to FIGS. 4, 5, 8 through 16, and 19 for the first, second, fifth through thirteenth, and fourteenth preferred embodiments respectively, and similarly showing along the vertical axis the torque transmission capacity Tc of the control clutch of the central differential device of the four wheel drive power transfer device, as related to input torque to said central differential device which is shown along the horizontal axis.

In the step 109, at which point in the program flow it has been determined that the coefficient of friction m of the vehicle wheels with respect to the road surface is relatively high, although at least one of said vehicle wheels is currently undergoing slippage, the torque transmission capacity of the differential clutch 21 is determined according to the pattern shown in FIG. 22 by the line "A", i.e. is determined proportionally to the torque Ti input to the central difference device 10 with a relatively low coefficient of proportionality; and then the flow of control passes next to exit this program fragment, without doing anything further.

On the other hand, in the step 110, at which point in the program flow it has been determined that the coefficient of friction m of the vehicle wheels with respect to the road surface is medium and at least one of said vehicle wheels is currently undergoing slippage, the torque transmission capacity Tc of the differential clutch 21 is determined according to the pattern shown in FIG. 22 by the line "B", i.e. is determined proportionally to the torque Ti input to the central differential device 10 with a medium coefficient of proportionality; and then as before the flow of control passes next to exit this program fragment, without doing anything further.

Finally, in the step 111, at which point in the program flow it has been determined that the coefficient of friction m of the vehicle wheels with respect to the road surface is relatively low and at least one of said vehicle wheels is currently undergoing slippage, the torque transmission capacity Tc of the differential clutch 21 is determined according to the pattern shown in FIG. 22 by the line "C", i.e. is determined proportionally to the torque Ti input to the central differential device 10 with a relatively high coefficient of proportionality; and then as before the flow of control passes next to exit this program fragment, without doing anything further.

And, by the repetition of the FIG. 21 program in a relatively tight and quick cycle with a period of the order of milliseconds, the control of the clutch 64 of the central differential device 42 of the four wheel drive power transfer device 3 is maintained.

Thus, whichever of the control patterns of FIG. 22 is utilized—pattern "A", pattern "B", or pattern "C"—the control pattern is set to, the torque transmission capacity Tc of the differential control clutch 21 is increased with an increase in the input torque Ti, and the rate of increase, i.e. the proportionality constant thereof, is the higher, the lower is the coefficient of friction of the road surface.

Therefore, referring now to the FIG. 22 graph, taking the input torque Ti to the central differential device 10 of the four wheel drive power transfer device 3 as being a constant certain value Ti1: when the coefficient of friction of the road surface being driven on is relatively high (line "A" in the figure) the torque transmission capacity Tc of the differential control clutch 21 will be set to a relatively small value Tc1; when the coefficient of friction of the road surface being driven on is a medium value (line "B" in the figure) the torque transmission capacity Tc of the differential control clutch 21 will be set to a certain value Tc2 which is greater than the certain value Tc1; and, when the coefficient of friction of the road surface being driven on is relatively low (line "C" in the figure) the torque transmission capacity Tc of the differential control clutch 21 will be set to an even greater value Tc3. Thus, even if the input torque Ti is constant, when the coefficient of friction of the road surface being driven on is high the torque transmission capacity Tc of the differential control clutch 21 will be set to a relatively small value, whereas when the coefficient of friction of the road surface being driven on is low the torque transmission capacity Tc of the differential control clutch 21 will be set to a relatively large value, and, by means of this torque transmission capacity control, even if either the front vehicle wheels or the rear vehicle wheels are slipping, the tight corner braking phenomenon is avoided, and moreover, a reduction in the drive power to all wheels of the vehicle because of slippage occurring at one vehicle wheel is avoided.

The Sixteenth Preferred Embodiments

Figure 23:
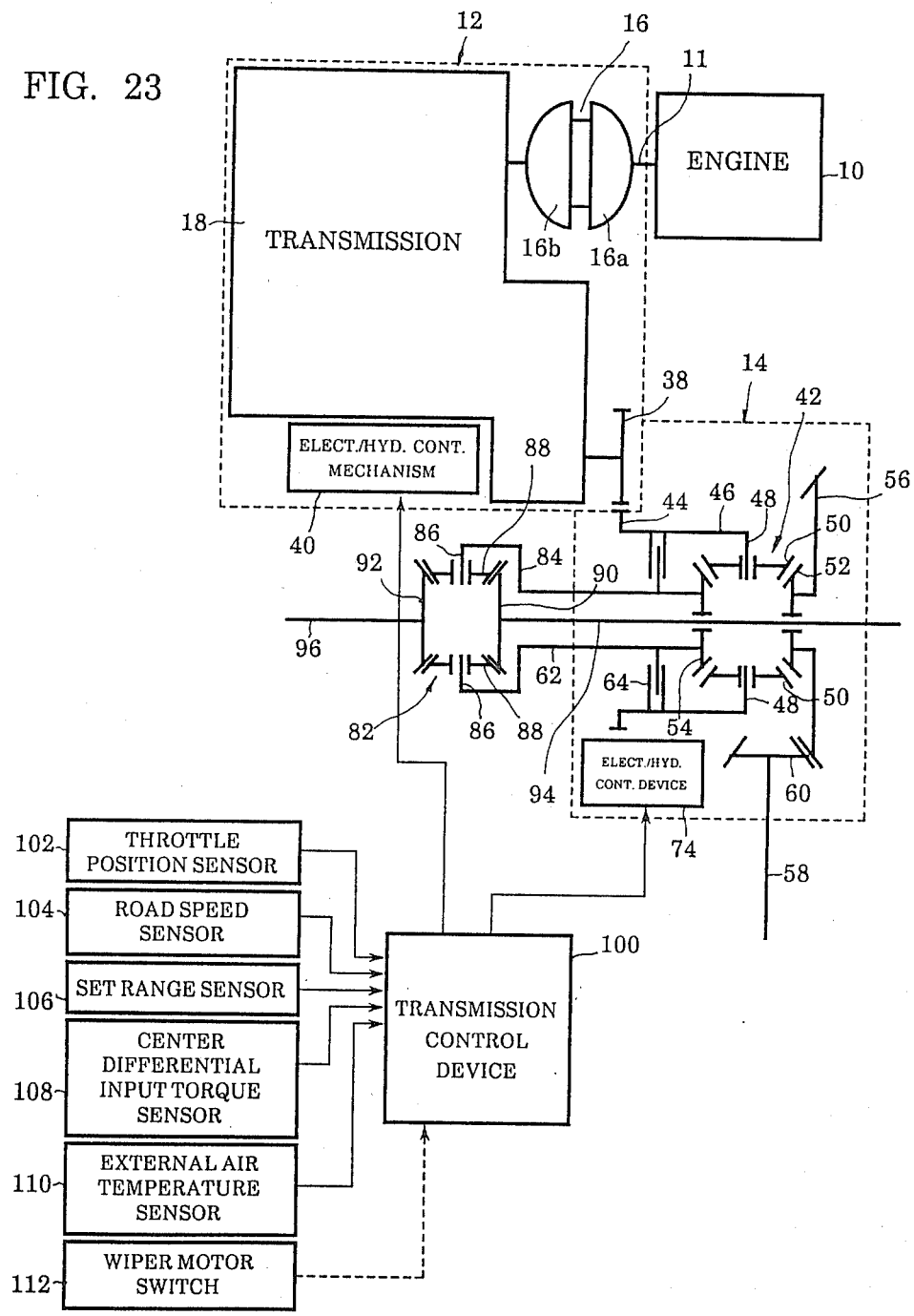
FIG. 23, which is similar to FIGS. 1 and 20, is a schematic longitudinal skeleton view of another vehicle power train and of a control system therefor which incorporates the sixteenth preferred embodiment of the slippage control device of the present invention, for practicing the sixteenth preferred method embodiment.

FIG. 23 is a schematic longitudinal skeleton view of a vehicle power train which incorporates the sixteenth preferred embodiment of the four wheel drive power transmission system slippage control device of the present invention, said device performing corresponding the sixteenth preferred method embodiment. In this figure, the differences from the FIG. 17 power train are that the transmission mechanism itself, rather than being of a continously variable type, is a gear transmission mechanism of a per se known type, being designated by the reference numeral 18. Furthr, the sensors which are provided are different. In detail, a throttle position sensor 102 detects a value representative of the current load on the internal combustion engine 10 by measuring the opening angle of the throttle valve (not particularly shown) of a carburetor (not shown either) of said engine 10, and outputs an electrical signal representative thereof. A road speed sensor 104 detects a value representative of the current road speed of the vehicle, and outputs an electrical signal representative thereof. A set range sensor 106 detects the set position of a manual range setting valve which is provided for the transmission mechanism 2, or of a setting means therefor, and outputs an electrical signal representative thereof. A central differential device input torque sensor 108 senses the torque that is being supplied as input torque to the central differential device 14, and outputs an electrical signal representative thereof. An external air temperature sensor senses the temperature of the air external to the vehicle, and outputs an electrical signal representative thereof. And a wiper motor switch 112 is informative of whether or not the wipers of the vehicle are currently switched on, and outputs an electrical signal representative thereof. The output signal of these six sensors and switches 102, 104, 106, 108, 110, and 112 are fed to the transmission control device 100.

Figure 24:
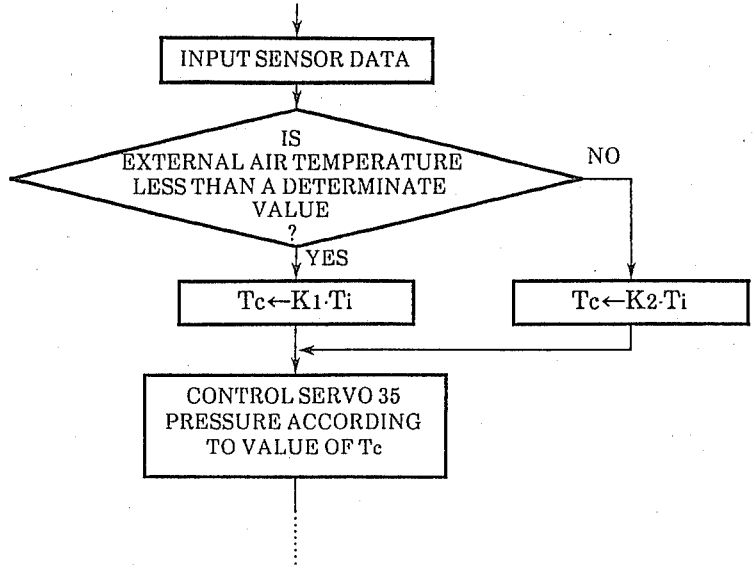
FIG. 24, which is similar to FIGS. 18 and 21 for the fourteenth and fifteenth preferred embodiments, is a partial flow chart for illustrating a slippage control portion of a program obeyed by a micro computer incorporated in the control system of FIG. 23, to realize the sixteenth preferred embodiments of the slippaage control device and method of the present invention, said program portion being executed at regular and frequent intervals.

This transmission control device 100 outputs control signals for controlling the electric/hydraulic control device 74 for the four wheel drive power transfer device 3 and the electrical/hydraulic control mechanism 40 for the gear transmission mechanism 18. Again, no concrete illustration of the structure of any particular realization of the transmission control device 100 will be given herein, since various possibilities for the details thereof can be easily supplemented by one of ordinary skill in the electronic art based upon the functional disclosures set out in this specification. In FIG. 24, a fragmentary flow chart is shown for a portion of the aforementioned control program which directs the operation of the transmission control device 100, according to the sixteenth preferred embodiment of the slippage control method of the present invention, so as to realize the sixteenth preferred embodiment of the slippage control device of the present invention. This flow chart will now be explained. It should be understood that, as before, the transmission control device 100 generally functions so as to engage an appropriate speed of the gear transmission mechanism 18 of the transmission mechanism 12 according to the current values of various vehicle operating parameters such as the vehicle road speed as as sensed by the sensor 104 therefor, the engine load (throttle opening) as sensed by the throttle position sensor 102, the currently set range for the transmission to operate in as sensed by the set range sensor 106, and possibly other parameters; such a function may be performed in a per se conventional way, and no particular program therefor is shown or suggested in this specification, since various possibilities for the details thereof can be easily supplemented as appropriate by one of ordinary skill in the transmission control and the programming arts, particularly when based upon the functional disclosures set out in this specification. The flow chart of FIG. 24 thus, now, only shows the portion of the control program of the transmission control device 100 which determines the value Tc for controlling the clutch 64 of the center differential device 42 of the four wheel drive power transfer device 14, i.e. only shows the slippage control routine of the transmission control device 100. This program portion is again executed at regular intervals of for example a few milliseconds.

Thus, in this slippage control routine, at its beginning after the START block, in its first decision step, the microprocessor makes a decision as to whether or not the current value of the external temperature is less than a determinate value, such as for example 0° C. If the answer to this decision is YES, so that in fact the external temperature is currently lower than said determinate value therefor, then next the flow of control passes to a step which sets the torque transmission capacity Tc for the clutch 21 to k1.ti, where k1 is a relatively high proportionality constant appropriate for this cold external temperature circumstances operational condition, and Ti is the current value of the torque that is being supplied as input torque to the four wheel drive power transfer device 14 as sensed by the center differential device input torque sensor 108. On the other hand, if the answer to this decision is NO, so that in fact the external temperature is currently higher than said determinate value therefor, then next the flow of control passes to a step which sets the torque transmission capacity Tc for the clutch 21 to k2.Ti, where k2 is a relatively low proportionality constant appropriate for this high external temperature circumstances operational condition.

Next, in the step to which the flow of control passes from both these two branches of program flow detailed above, the transmission control device 45 outputs a pulsed electrical signal to appropriate to cause the clutch 64 of the center differential device 42 of the four wheel drive power transfer device 14 to be engaged to such an extent as to provide a torque transmission capacity therefor corresponding to the value Tc just determined, so as to therefore allow said center differential device 42 to perform its differential action between the front vehicle wheels and the rear vehicle wheels while being impeded by an amount corresponding to said torque transmission capacity Tc, to thus drive said front vehicle wheels and said rear vehicle wheels from the engine 10 while distributing rotational power and torque between them with differential action impeded by this appropriate amount; and then the flow of control passes next to exit this program fragment, without doing anything further.

And, by the repetition of the FIG. 24 program in a relatively tight and quick cycle with a period of the order of milliseconds, the control of the clutch 64 of the central differential device 42 of the four wheel drive power transfer device 3 is maintained.

Figure 25:
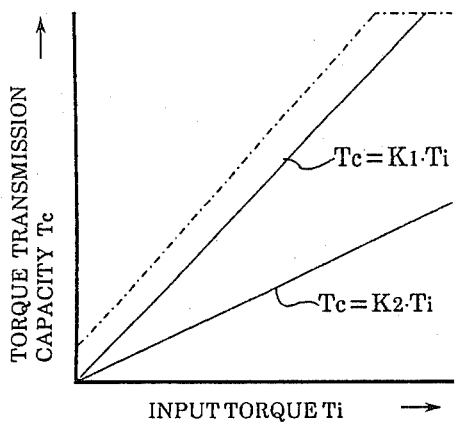
FIG. 25 is a graph relating to said sixteenth preferred embodiments of the slippage control device and method of the present invention, similar to FIGS. 4, 5, 8 through 16, 19, and 22 for the first, second, fifth through thirteenth, fourteenth, and fifteenth preferred embodiments respectively, and similarly showing along the vertical axis the torque transmission capacity Tc of the control clutch of the central differential device of the four wheel drive power transfer device, as related to input torque to said central differential device which is shown along the horizontal axis.

Control of the torque transmission capacity of the differential control clutch 64 is thus in practice carried out as shown in FIG. 25. When the outside temperature is at least said determinate temperature value (exemplarily 0° C.), there is no danger of the road surface being frozen, and at this time the coefficient of friction of the tires on the vehicle wheels with respect to the road surface being driven on is relatively high and the risk of slippage of the drive wheels with respect to the road surface being driven on is relatively small, and therefore in order to avoid the tight braking phenomenon the torque transmission capacity Tc of the differential control clutch 64 is determined according to the input torque Ti applied to the four wheel drive transfer device 14 with a relatively low proportionality coefficient K2.

On the other hand, when the outside temperature is below said determinate temperature value (exemplarily 0° C.), there is then a danger that the road surface being driven on is frozen up, i.e. is covered with frost or snow or ice, and at this time the torque transmission capacity Tc of the differential control clutch 64 is determined according to the input torque Ti applied to the four wheel drive transfer device 14 with a relatively high proportionality coefficient K1. Thereby, in the case that driving is taking place under conditions in which the road surface being driven on is frozen, the vehicle drive state approximates to the four wheel drive state in which the front and rear wheels are directly coupled together, i.e. with the central differential device 14 locked up, and the drivability of the vehicle as a whole is improved, and it becomes more difficult for the vehicle wheels to undergo slippage with respect to the road surface being driven on, and, even if one of the front vehicle wheels or the rear vehicle wheels should slip with respect to the road surface being driven on, a simultaneous and universal reduction in the drive force being supplied to all the vehicle wheels is avoided.

Thus, FIG. 25 shows control characteristics of the torque transmission capacity of the differential control clutch 64 when the outside temperature is less than said determinate value therefor, and when the outside temperature is greater than said determinate value therefor. It should further be noted that, as shown by a dot dashed line in FIG. 25, as an alternative mode of operation, when the outside temperature is less than said determinate value therefor, even if the input torque Ti is zero the torque transmission capacity of the differential control clutch 64 need not be set to zero, but may be set to a certain substantial positive value. Furthermore, as a further modification, since the lower the outside temperature the greater is the danger that the road surface being driven on is frozen up, the torque transmission capacity of the differential control clutch 64 may be set to a larger value the lower is the outside temperature. Thus, the torque transmission capacity Tc of the differential control clutch 21 is increased with an increase in the input torque Ti, and the rate of increase, i.e. the proportionality constant thereof, is the higher, the lower is the coefficient of friction of the road surface likely to be, and, by means of this torque transmission capacity control, even if either the front vehicle wheels or the rear vehicle wheels are slipping, the tight corner braking phenomenon is avoided, and moreover, a reduction in the drive power to all wheels of the vehicle because of slippage occurring at one vehicle wheel is avoided.

The Seventeeth Preferred Embodiments

The vehicle power train which incorporates the seventeeth preferred embodiment of the four wheel drive power transmission system slippage control device of the present invention, said device performing the corresponding seventeenth preferred method embodiment, is not particularly shown in any figure, since FIG. 23 will serve for illustrating said vehicle power train of said seventeenth preferred embodiments as well as for illustrating that of the sixteenth preferred embodiments as described above.

Figure 26:
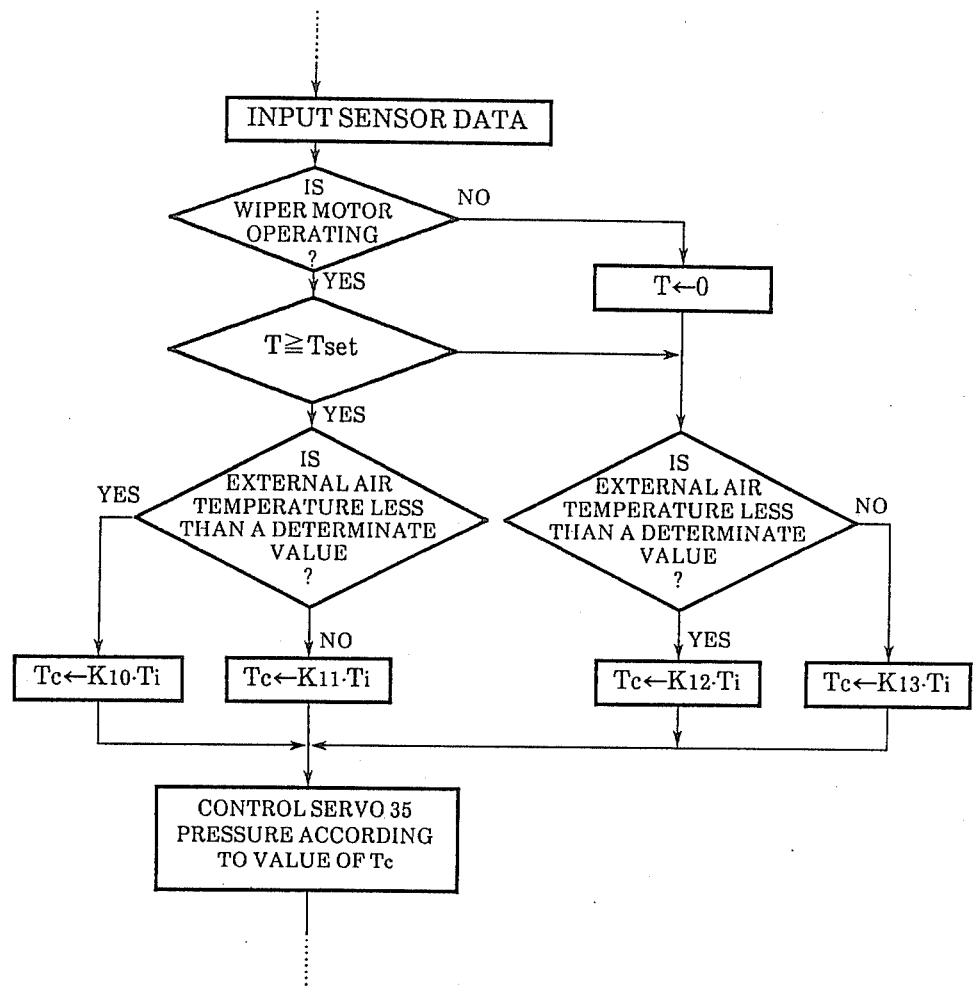
FIG. 26, which is similar to FIGS. 18, 21, and 24 for the fourteenth, the fifteenth, and the sixteenth preferred embodiments respectively, is a partial flow chart for illustrating a slippage control portion of a program obeyed by a micro computer incorporated in the control system of FIG. 23, to realize the seventeenth preferred embodiments of the slippage control device and method of the present invention, said program portion being executed at regular and frequent intervals.

In these seventeeth preferred embodiments of the present invention, the torque transmission capacity of the central differential control clutch 64 is determined not only according to whether the exterior temperature is low or not, but also according to whether or not precipitation is occurring, i.e. according to whether or not the vehicle wiper motor is being operated. In FIG. 26, a fragmentary flow chart is shown for a portion of the control program which directs the operation of the transmission control device 100, according to the seventeenth preferred embodiment of the slippage control method of the present invention, so as to realize the seventeenth preferred embodiment of the slippage control device of the present invention. This flow chart will now be explained; it, again, only shows the portion of the control program of the transmission control device 100 which determines the value Tc for controlling the clutch 64 of the center differential device 42 of the four wheel drive power transfer device 14, i.e. only shows the slippage control routine of the transmission control device 100. This program portion is again executed at regular intervals of for example a few milliseconds.

Thus, in this slippage control routine, at its beginning after the START block, in its first decision step, the microprocessor makes a decision as to whether or not the vehicle wiper motor is being operated, based of course upon the signal which said microprocessor receives from the wiper motor switch 112 (vide FIG. 23). If the answer to this decision is YES, i.e. if the wiper motor is being currently operated, then the flow of control passes next to a decision step "T>=Tset?", while if on the other hand the answer to this decision is NO, i.e. if the wiper motor is not currently being operated, then the value of a time count variable T is set to zero.

In the decision step "T>=Tset?", a decision is made as to whether or not the wiper motor has been operating for more than a determinate time period Tset, taken as indicating steady wiper operation. If the result of this decision is YES, so that steady wiper operation is occurring, then the flow of control passes next to the left side decision step relating to exterior temperature; but, if the result of this decision is NO, so that steady wiper operation is not occurring, then the flow of control passes next to the right side decision step relsting to exterior temperature.

In either of these exterior temperature decision steps, a decision is made as to whether or not the current value of the external temperature is less than a determinate value, such as for example 0° C. If the answer to this decision is YES, so that in fact the external temperature is currently lower than said determinate value therefor, then next the flow of control passes to a step which sets the torque transmission capacity Tc for the clutch 21 to K10.Ti or to K12.Ti, respectively according to whether or not the wiper motor is being steadily operated or not, where K10 and K12 are relatively high proportionality constants appropriate for these types of cold external temperature circumstances operational conditions—in which respectively the road surface is probably wet or frozen with currently falling precipitation or is not probably currently subject to falling precipitation but nevertheless may be covered with icy matter—and Ti is the current value of the torque that is being supplied as input torque to the four wheel drive power transfer device 14 as sensed by the center differential device input torque sensor 108. On the other hand, if the answer to this decision is NO, so that in fact the external temperature is currently higher than said determinate value therefor, then next the flow of control passes to a step which sets the torque transmission capacity Tc for the clutch 21 to K11.Ti or to K13.Ti, respectively according to whether or not the wiper motor is being steadily operated or not, where K11 and K13 are relatively low proportionality constants appropriate for these types of high external temperature circumstances operational conditions—in which respectively the road surface is probably wet or is not probably wet, but anyway cannot realistically be icy since the external temperature is above the determinate value, exemplarily 0° C.

Finally, in the step to which the flow of control passes from all these four branches of program flow detailed above, the transmission control device 100 outputs a pulsed electrical signal appropriate to cause the clutch 64 of the center differential device 42 of the four wheel drive power transfer device 14 to be engaged to such an extent as to provide a torque transmission capacity therefor corresponding to the value Tc just determined, so as to therefore allow said center differential device 42 to perform its differential action between the front vehicle wheels and the rear vehicle wheels while being impeded by an amount corresponding to said torque transmission capacity Tc, to thus drive said front vehicle wheels and said rear vehicle wheels from the engine 10 while distributing rotational power and torque between them with differential action impeded by this appropriate amount; and then the flow of control passes next to exit this program fragment, without doing anything further. And, by the repetition of the FIG. 26 program in a relatively tight and quick cycle with a period of the order of milliseconds, the control of the clutch 64 of the central differential device 42 of the four wheel power transfer device 3 is maintained.

Figure 27:
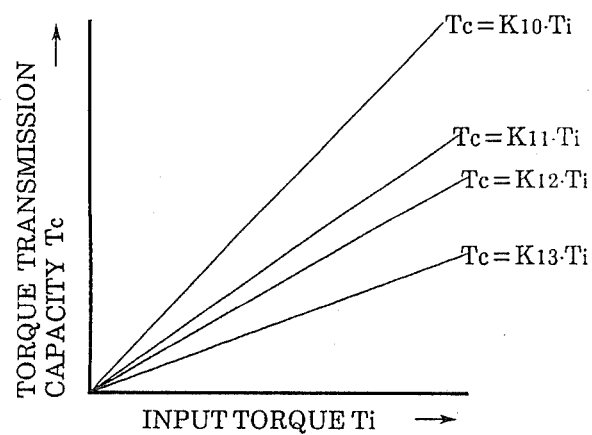
FIG. 27 is a graph relating to said seventeenth preferred embodiments of the slippage control device and method of the present invention, similar to FIGS. 4, 5, 8 through 16, 19, 22, and 25 for the first, second, and fifth through sixteenth preferred embodiments respectively, and similarly showing along the vertical axis the torque transmission capacity Tc of the control clutch of the central differential device of the four wheel drive power transfer device, as related to input torque to said central differential device which is shown along the horizontal axis.

Control of the torque transmission capacity of the differential control clutch 64 is thus in practice carried out as shown in FIG. 27. When the vehicle wiper motor is operating steadily and accordingly almost certainly precipitation (either rain or snow) is currently occurring, then, if the outside temperature is below said determinate temperature value (exemplarily 0° C.), there is a great danger of the road surface being frozen up or being covered with falling snow or sleet, and therefore at this time the coefficient of friction of the tires on the vehicle wheels with respect to the road surface being driven on is likely at its lowest and the risk of slippage of the drive wheels with respect to the road surface being driven on is likely at its greatest, and therefore in order to avoid the tight braking phenomenon the torque transmission capacity Tc of the differential control clutch 64 is determined according to the input torque Ti applied to the four wheel drive transfer device 14 with the relatively highest proportionality coefficient equal to K10, and thereby, in this case that driving is taking place under conditions in which the road surface being driven on is likely to be covered with snow or ice, the vehicle drive state approximates to the four wheel drive state in which the front and rear wheels are directly coupled together, i.e. with the central differential device 14 locked up, and the drivability of the vehicle as a whole is improved, and it becomes more difficult for the vehicle wheels to undergo slippage with respect to the road surface being driven on, and, even if one of the front vehicle wheels or the rear vehicle wheels should slip with respect to the road surface being driven on, a simultaneous and universal reduction in the drive force being supplied to all the vehicle wheels is avoided. On the other hand, still with the wiper motor operating, if the outside temperature is above said determinate temperature value (exemplarily 0° C.), although the road surface is likely covered with rain or water it cannot realistically be frozen up or covered with ice, and at this time the coefficient of friction of the tires on the vehicle wheels with respect to the road surface being driven on is likely somewhat better but still is likely not very high, and the risk of slippage of the drive wheels with respect to the road surface being driven on is likely still quite great, and therefore at this time the torque transmission capacity Tc of the differential control clutch 64 is determined according to the input torque Ti applied to the four wheel drive transfer device 14 with a relatively high proportionality coefficient K11, somewhat lower however than the previous proportionality coefficient K10.

However, when the vehicle wiper motor is not operating steadily, then almost certainly precipitation is not currently occurring (neither rain or snow), and then, if the outside temperature is below said determinate temperature value (exemplarily 0° C.), there is a certain moderate danger of the road surface being frozen up although it cannot be currently subject to falling snow or sleet, and therefore at this time the coefficient of friction of the tires on the vehicle wheels with respect to the road surface being driven on is likely low but not extremely low and the risk of slippage of the drive wheels with respect to the road surface being driven on is likely moderately low, and therefore in order to avoid the tight braking phenomenon the torque transmission capacity Tc of the differential control clutch 64 is determined according to the input torque Ti applied to the four wheel drive transfer device 14 with a proportionality coefficient equal to K12, somewhat lower than the previous proportionality coefficient K11, and thereby, in this case that driving is taking place under conditions in which the road surface being driven on is maybe covered with frost or the like but is not currently undergoing precipitation, the central differential device 14 is provided with moderate differential device inhibition effect. On the other hand, if the wiper motor is as before not operating, and if the outside temperature is above said determinate temperature value (exemplarily 0° C.), then the road surface is unlikely to be even covered with rain or water and certainly is not frozen up or covered with ice, and at this time the coefficient of friction of the tires on the vehicle wheels with respect to the road surface being driven on is likely at its best, and the risk of slippage of the drive wheels with respect to the road surface being driven on is likely at its lowest, and therefore at this time the torque transmission capacity Tc of the differential control clutch 64 is determined according to the input torque Ti applied to the four wheel drive transfer device 14 with a relatively low proportionality coefficient K13, somewhat lower even than the previous proportionality coefficient K12.

When the torque transmission capacity Tc of the control clutch 64 is controlled as described above, the torque transmission capacity Tc varies with the input torque Ti as shown in FIG. 27. It should be noted that in these described seventeenth preferred embodiments the torque transmission capacity Tc when the external temperature is low but rain or snow is not falling is less than in the case that the external temperature is high but rain or snow is falling, but in an alternative preferred embodiment the reverse may be appropriately ordained, and this matter may be determined appropriately according to the driving characteristics of the vehicle and so forth.

It should be noted that, according to the operation of the flow chart shown in FIG. 26, as long as the wiper is not operated continuously for at least the certain predetermined time interval Tset, the increase in the torque transmission capacity of the differential control clutch 64 is not carried out, and this is done in order to avoid an increase in the torque transmission capacity of the differential control clutch 64 occurring as a result of erroneously determining that rain or snow is falling only because the wiper motor is operated by the vehicle driver temporarily in order to clean the windshield of the vehicle.

Furthermore the detection of whether or not the road surface is wet may be performed independently of the operation of the wiper motor, i.e. for example may be carried out by detecting the presence or absence of water spray in for example a tire housing of the vehicle.

Thus, FIG. 27 shows control characteristics of the torque transmission capacity of the differential control clutch 64 when the outside temperature is less than said determinate value therefor, both in the case that the wiper motor is being operated and in the case that said wiper motor is not being operated, and also when the outside temperature is greater than said determinate value therefor, again both in the case that the wiper motor is being operated and in the case that said wiper motor is not being operated. And the torque transmission capacity Tc of the differential control clutch 21 is increased with an increase in the input torque Ti, and the rate of increase, i.e. the proportionality constant thereof, is the higher, the lower is the coefficient of friction of the road surface likely to be, and, by means of this torque transmission capacity control, even if either the front vehicle wheels or the rear vehicle wheels are slipping, the tight corner braking phenomenon is avoided, and moreover, a reduction in the drive power to all wheels of the vehicle because of slippage occurring at one vehicle wheel is avoided.

The Eighteenth Preferred Embodiments

The vehicle power train which incorporates the eighteenth preferred embodiment of the four wheel drive power transmission system slippage control device of the present invention, said device performing the corresponding eighteenth preferred method embodiment, is not particularly shown in any figure, since FIG. 23 will serve for illustrating said vehicle power train of said eighteenth preferred embodiments as well as for illustrating that of the sixteenth and the seventeenth preferred embodiments as described above.

Figure 28:
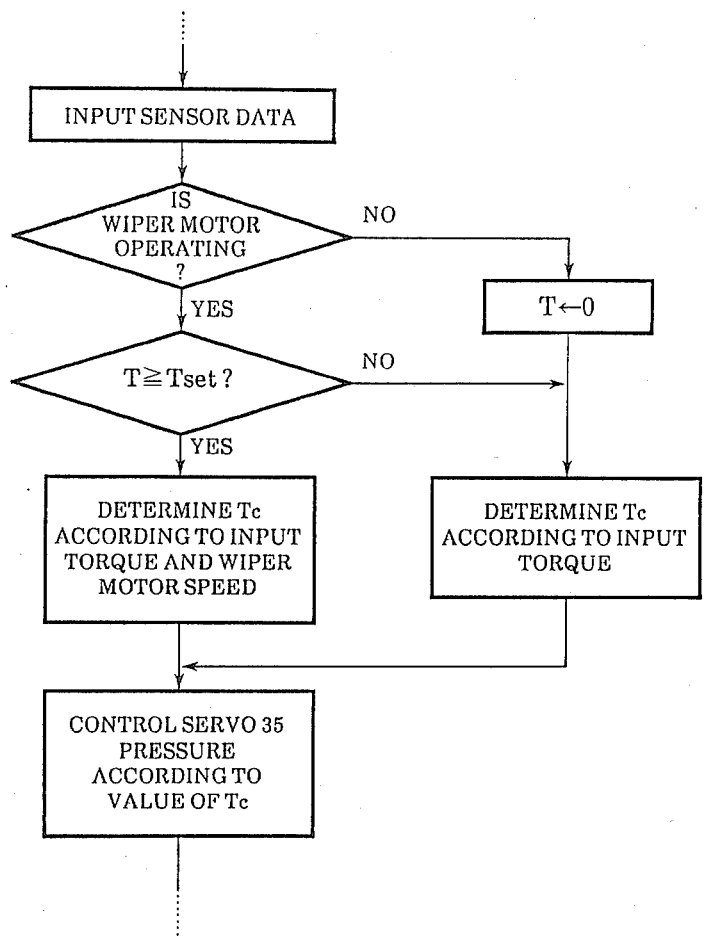
FIG. 28, which is similar to FIGS. 18, 21, 24, and 26 for the fourteenth through the seventeenth preferred embodiments respectively, is a partial flow chart for illustrating a slippage control portion of a program obeyed by a micro computer incorporated in the control system of FIG. 23, to realize the eighteenth preferred embodiments of the slippage control device and method of the present invention, said program portion being executed at regular and frequent intervals.

In these eighteenth preferred embodiments of the present invention, the torque transmission capacity of the central differential control clutch 64 is determined not particularly according to whether the exterior temperature is low or not, but instead according to whether or not precipitation is occurring, i.e. according to whether or not the vehicle wiper motor is being operated; and, further, said torque transmission capacity is determined to be greater or less, according as the precipitation level is greater or less. In FIG. 28, a fragmentary flow chart is shown for a portion of the control program which directs the operation of the transmission control device 100, according to the eighteenth preferred embodiment of the slippage control method of the present invention, so as to realize the eighteenth preferred embodiment of the slippage control device of the present invention. This flow chart will now be explained; it, again, only shows the portion of the control program of the transmission control device 100 which determines the value Tc for controlling the clutch 64 of the center differential device 42 of the four wheel drive power transfer device 14, i.e. only shows the slippage control routine of the transmission control device. This program portion is again executed at regular intervals of for example a few milliseconds.

Thus, in this slippage control routine, at its beginning after the START block, in its first decision step, the microprocessor makes a decision as to whether or not the vehicle wiper motor is being operated, based of course upon the signal which said microprocessor receives from the wiper motor switch 112 (vide FIG. 23). If the answer to this decision is YES, i.e. if the wiper motor is being currently operated, then the flow of control passes next to a decision step "T> =Tset?", while if on the other hand the answer to this decision is NO, i.e. if the wiper motor is not currently being operated, then the value of a time count variable T is set to zero.

In the decision step "T> =Tset?", a decision is made as to whether or not the wiper motor has been operating for more than a determinate time period Tset, taken as indicating steady wiper operation. If the result of this decision is YES, so that steady wiper operation is occurring, then the flow of control passes next to the left side step relating to determination of torque transmission capacity of the clutch 64 in terms of wiper motor speed and also in terms of the input torque being supplied thereto; but, if the result of this decision is NO, so that steady wiper operation is not occurring, then the flow of control passes next to the right side step relating to determination of torque transmission capacity of the clutch 64 only in terms of the input torque being supplied thereto.

In either of these torque transmission capacity determination steps, the value Tc for the torque transmission capacity of the clutch 64 of the center differential device 42 of the four wheel drive power transfer device 14 is determined: in the right hand one of said determination steps, only according to the input torque being supplied to said center differential device 42 as determined from the output signal of the sensor 108 therefor; and, in the left hand one of said determination steps, both according to the input torque being supplied to said center differential device 42 as determined from the output signal of the sensor 108 therefor, and also according to the speed at which the wiper motor of the vehicle is being operated. Generally, in this case, the higher is the speed of the wiper motor, the more severe the precipitation conditions will be at this time, and hence the higher will the value Tc for the torque transmission capacity of the clutch 64 of the center differential device 42 of the four wheel drive power transfer device 14 be set, in order to prevent wheel slippage in these conditions of relatively low frictional coefficient of the vehicle wheels against the road surface.

Finally, in the step to which the flow of control passes from all these four branches of program flow detailed above, the transmission control device 100 outputs a pulsed electrical signal appropriate to cause said clutch 64 of said center differential device 42 of said four wheel drive power transfer device 14 to be engaged to such an extent as to provide a torque transmission capacity therefor corresponding to the value Tc just determined, so as to therefore allow said center differential device 42 to perform its differential action between the front vehicle wheels and the rear vehicle wheels while being impeded by an amount corresponding to said torque transmission capacity Tc, to thus drive said front vehicle wheels and said rear vehicle wheels from the engine 10 while distributing rotational power and torque between them with differential action impeded by this appropriate amount; and then the flow of control passes next to exit this program fragment, without doing anything further. And, by the repetition of the FIG. 28 program in a relatively tight and quick cycle with a period of the order of milliseconds, the control of the clutch 64 of the central differential device 42 of the four wheel drive power transfer device 3 is maintained.

Figure 29:
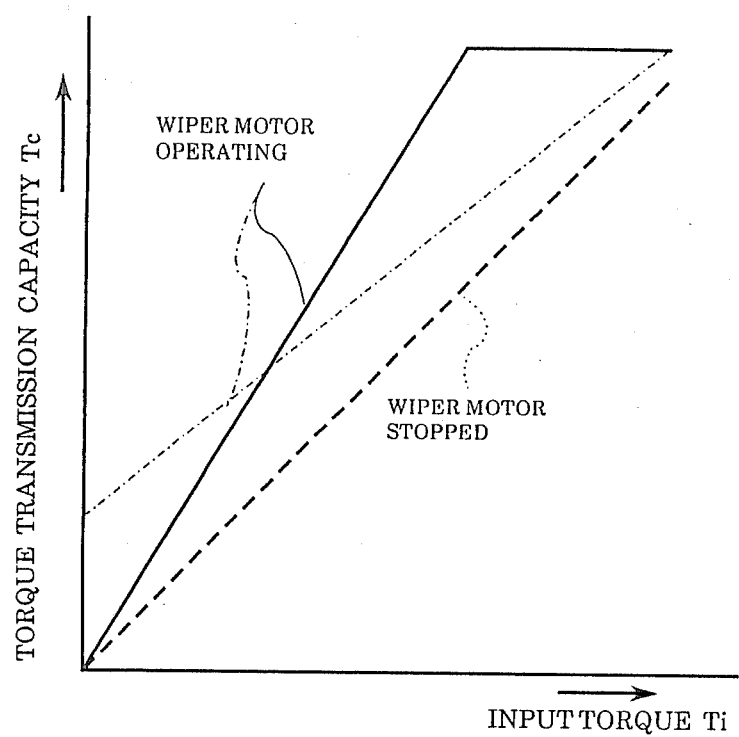
FIG. 29 is a graph relating to said eighteenth preferred embodiments of the slippage control device and method of the present invention, similar to FIGS. 4, 5, 8 through 16, 19, 22, 25, and 27 for the first, second, and fifth through seventeenth preferred embodiments respectively, and similarly showing along the vertical axis the torque transmission capacity Tc of the control clutch of the central differential device of the four wheel drive power transfer device, as related to input torque to said central differential device which is shown along the horizontal axis.

Control of the torque transmission capacity of the differential control clutch 64 is thus in practice carried out as shown in FIG. 29. When the vehicle wiper motor is operating steadily and accordingly almost certainly precipitation (either rain or snow) is currently occurring, then, there is a great danger of the road surface being wet or being covered with falling snow or sleet, and therefore at this time the coefficient of friction of the tires on the vehicle wheels with respect to the road surface being driven on is likely low and the risk of slippage of the drive wheels with respect to the road surface being driven on is likely high, and therefore in order to avoid the tight braking phenomenon the torque transmission capacity Tc of the differential control clutch 64 is determined according to the input torque Ti applied to the four wheel transfer device 14 with a relatively high proportionality coefficient, which is increased the higher is the speed of the wiper motor since this is indictive of the amount of precipitation lying on the road surface, and thereby the drivability of th vehicle as a whole is improved, and it becomes more difficult for the vehicle wheels to undergo slippage with respect to the currently rather slippery road surface being driven on, and, even if one of the front vehicle wheels or the rear vehicle wheels should slip with respect to the road surface being driven on, a simultaneous and universal reduction in the drive force being supplied to all the vehicle wheels is avoided. On the other hand, when the vehicle wiper motor is not operating steadily, then almost certainly precipitation is not currently occurring (neither rain or snow), and thus the road surface is unlikely to be covered with rain or water, and at this time the coefficient of friction of the tires on the vehicle wheels with respect to the road surface being driven on is likely relatively good, and the risk of slippage of the drive wheels with respect to the road surface being driven on is likely relatively low, and therefore at this time the torque transmission capacity Tc of the differential control clutch 64 is determined according to the input torque Ti applied to the four wheel drive transfer device 14 with a relatively low proportionality coefficient.

When the torque transmission capacity Tc of the control clutch 64 is controlled as described above, the torque transmission capacity Tc varies with the input torque Ti as shown in FIG. 29. FIG. 29 shows control characteristics of the torque transmission capacity of the differential control clutch 64 when the wiper motor is operating and when the wiper motor is stopped. It should be noted that in FIG. 4, as shown by a dot dashed line, when the wiper motor is operating, even if the input torque Ti is zero the torque transmission capacity of the differential control clutch 64 need not be set to zero, but it may be set to a certain positive and non zero value.

It should be noted that, according to the operation of the flow chart shown in FIG. 28, as long as the wiper is not operated continuously for at least the certain predetermined time interval Tset, the increase in the torque transmission capacity of the differential control clutch 64 is not carried out, and this is done in order to avoid an increase in the torque transmission capacity of the differential control clutch 64 occurring as a result of erroneously determining that rain or snow is falling only because the wiper motor is operated by the vehicle driver temporarily in order to clean the windshield of the vehicle.

The Nineteenth Preferred Embodiments

Figure 30:
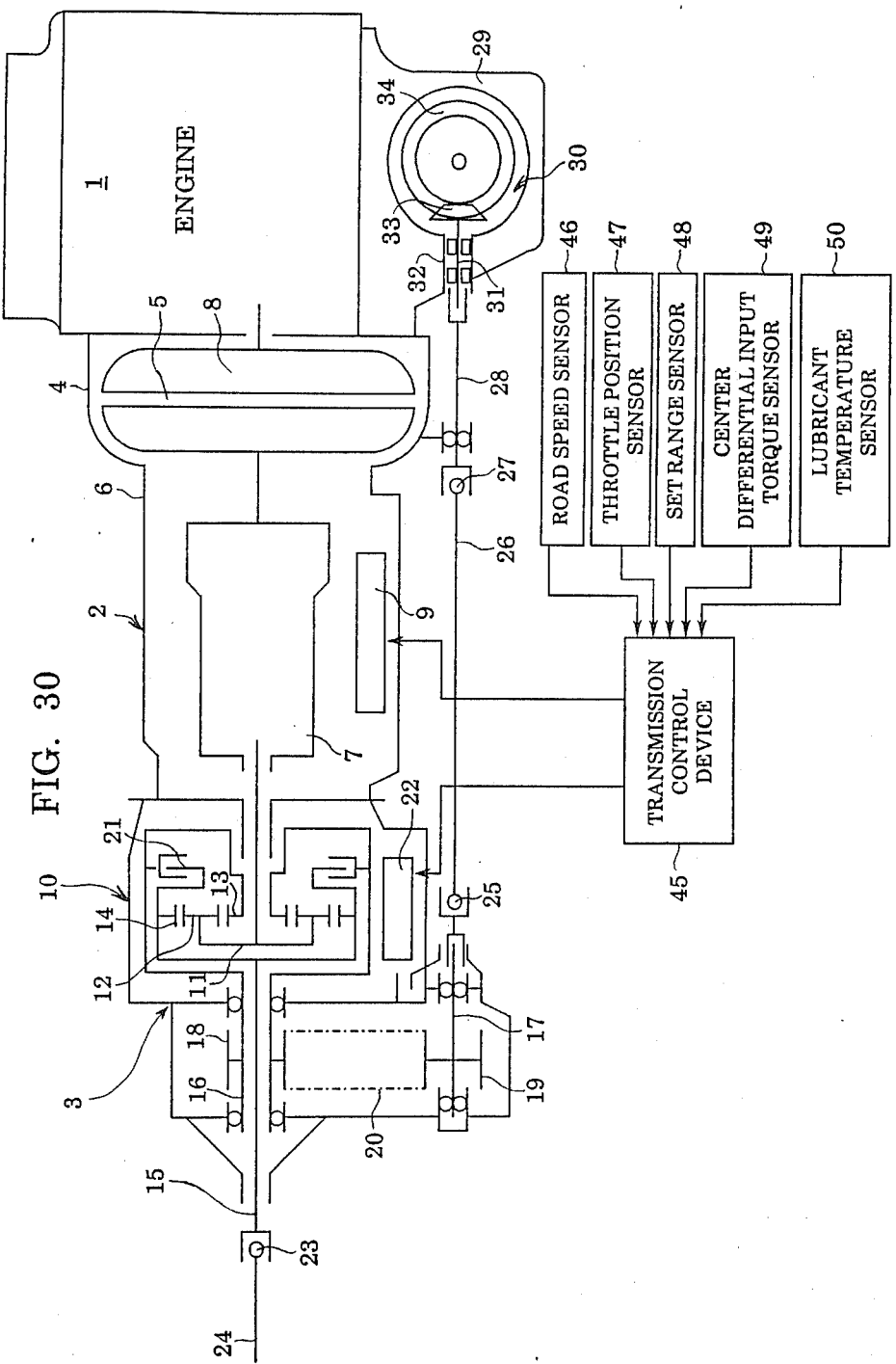
FIG. 30, which is similar to FIGS. 1, 20, and 23, is a schematic longitudinal skeleton view of another vehicle power train and of a control system therefor which incorporates the nineteenth preferred embodiment of the slippage control device of the present invention, for practicing the nineteenth preferred method embodiment.

FIG. 30 is a schematic longitudinal skeleton view of a vehicle power train which incorporates the nineteenth preferred embodiment of the four wheel drive power transmission system slippage control device of the present invention, said device performing corresponding the nineteenth preferred method embodiment. In this figure, the only difference from the FIG. 1 power train relates to the sensors which are provided. In detail, a road speed sensor 46 detects a value representative of the current road speed of the vehicle, and outputs an electrical signal representative thereof. A throttle position sensor 47 detects a value representative of the current load on the internal combustion engine 10 by measuring the opening angle of the throttle valve (not particularly shown) of a carburetor (not shown either) of the engine 1, and outputs an electrical signal representative thereof. A set range sensor 48 detects the set position of a manual range setting valve which is provided for the transmission mechanism 2, or of a setting means therefor, and outputs an electrical signal representative thereof. A central differential device input torque sensor 49 senses the torque that is being supplied as input torque to the central differential device 10, and outputs an electrical signal representative thereof. And a lubricant temperature sensor 50 senses the temperature of the lubricant in the four wheel drive power transfer device 3—specifically, of the lubricant for the central differential device 10 which is being supplied to the clutch 21—and outputs an electrical signal representative thereof. The output signals of these five sensors and switches 46, 47, 48, 49, and 50 are fed to the transmission control device 45.

Figure 31:
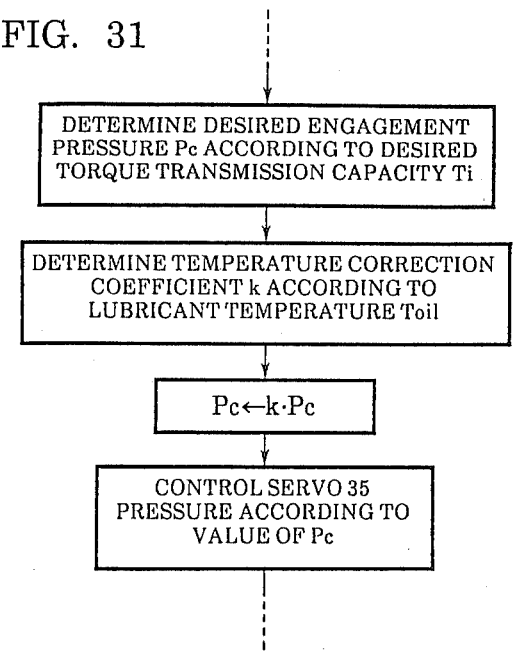
FIG. 31, which is similar to FIGS. 18, 21, 24, 26, and 28 for the fourteenth through the eighteenth preferred embodiments respectively, is a partial flow chart for illustrating a slippage control portion of a program obeyed by a micro computer incorporated in the control system of FIG. 30, to realize the nineteenth preferred embodiments of the slippage control device and method of the present invention, said program portion being executed at regular and frequent intervals.

This transmission control device 45 outputs control signals for controlling the electric/hydraulic control device 22 for the four wheel drive power transfer device 3 and for controlling the electrical/hydraulic control mechanism 9 for the gear transmission mechanism 7. Again, no concrete illustration of the structure of any particular realization of the transmission control device 45 will be given herein, since various possibilities for the details thereof can be easily supplemented by one of ordinary skill in the electronic art based upon the functional disclosures set out in this specification. In FIG. 31, a fragmentary flow chart is shown for a portion of the aforementioned control program which directs the operation of the transmission control device 45, according to the nineteenth preferred embodiment of the slippage control method of the present invention, so as to realize the nineteenth preferred embodiment of the slippage control device of the present invention. This flow chart will now be explained. It should be understood that, as before, the transmission control device 45 generally functions so as to engage an appropriate speed of the gear transmission mechanism 7 of the transmission mechanism 2 according to the current values of various vehicle operating parameters such as the vehicle road speed as sensed by the sensor 46 therefor, the engine load (throttle opening) as sensed by the throttle position sensor 47 therefor, the currently set range for the transmission to operate in as sensed by the set range sensor 48 therefor, and possibly other parameters; such a function may be performed in a per se conventional way, and no particular program therefor is shown or suggested in this specification, since various possibilities for the details thereof can be easily supplemented as appropriate by one of ordinary skill in the transmission control and the programming arts, particularly when based upon the functional disclosures set out in this specification. The flow chart of FIG. 31 therefore, again, only shows the portion of the control program of the transmission control device 45 which determines the value Tc for controlling the clutch 21 of the center differential device 10 of the four wheel drive power transfer device 3, i.e. only shows the slippage control routine of the transmission control device 45. This program portion is executed at regular intervals of for example a few milliseconds.

Thus, in this slippage control routine, at its beginning in its first step, the microprocessor incorporated in the transmission control device 45 determines an appropriate engagement pressure Pc for the clutch 21 of the central differential device 10 of the four wheel drive power transfer device 3, based upon considerations such as those outlined above with respect to the previously described preferred embodiments, in particular based upon the value Ti of the input torque that is being supplied to said central differential device 10 as detected by the sensor 49 therefor.

In the next step, said microprocessor determines a temperature correction coefficient k that should be applied to correct for the temperature denoted as Toil—either high or low—of the lubricant which is being supplied to said clutch 21. It is an experimental fact that the torque transmission capability of a friction engaging mechanism provided by a given engagement pressure thereof is strongly influenced by the temperature of the lubricant which is being supplied to said friction engaging mechanism. Therefore, according to these particular nineteenth embodiments, a correction for said lubricant temperature is made.

In the next step, the microprocessor multiplies this temperature correction coefficient k into the desired clutch engagement pressure Pc.

Finally, in the last shown step, the microprocessor calculates the duty ratio D of a pulsed electrical signal appropriate to cause said clutch 21 of said center differential device 10 of said four wheel drive power transfer device 3 to be engaged with the engagement pressure Pc calculated as just described, so as to provide a torque transmission capacity corresponding to the torque transmission capacity value Tc which is required, so as to therefore allow said center differential device 42 to perform its differential action between the front vehicle wheels and the rear vehicle wheels while being impeded by an amount corresponding to said torque transmission capacity Tc, to thus drive said front vehicle wheels and said rear vehicle wheels from the engine 10 while distributing rotational power and torque between them with differential action impeded by this appropriate amount; and then the flow of control passes next to leave this program portion, without doing anything further.

And, by the repetition of the FIG. 31 program in a relatively tight and quick cycle with a period of the order of milliseconds, the control of the clutch 64 of the central differential device 42 of the four wheel drive power transfer device 3 is maintained.

Figure 32:
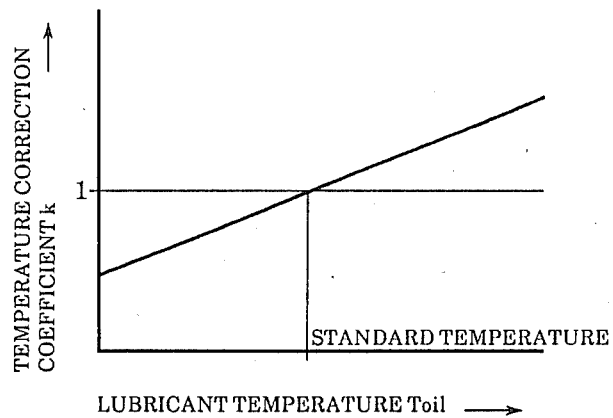
FIG. 32 is a graph relating to said nineteenth preferred embodiments of the slippage control device and method of the present invention, showing along the vertical axis a lubricant temperature correction coefficient k for correcting the engagement pressure for the control clutch of the central differential device of the four wheel drive power transfer device, as related to the temperature of the lubricant being supplied to said central differential device which is shown along the horizontal axis.

As shown in FIG. 32, the temperature correction coefficient k is unity when the lubricant temperature Toil is at a standard temperature, is a value greater than unity when the lubricant temperature Toil is higher than said standard temperature, and is a value less than unity when the lubricant temperature Toil is lower than said standard temperature, and thereby, when the lubricant temperature Toil is high, even though the target torque transmission capacity Tc for the clutch 21 is the same, as compared with the case when said lubricant temperature Toil is equal to the standard temperature, the engagement pressure Pc for the clutch 21 is increased, while on the other hand, when the lubricant temperature Toil is low, even though the target torque transmission capacity Tc for the clutch 21 is the same, as compared with the case when said lubricant temperature Toil is equal to said standard temperature, the engagement pressure Pc for the clutch 21 is decreased. Thus, even when the lubricant temperature Toil fluctuates and the viscosity of the lubricant thereby is caused to fluctuate, the control of the torque transmission capacity of the clutch 21 can be carried out correctly according to the desired control characteristics, without fluctuation in the torque transmission capacity Tc of said differential control clutch 21.

CONCLUSION

Although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. For a four wheel drive power transmission system for a vehicle with two front wheels, two rear wheels, a transmission mechanism, and an engine, comprising a power distribution device for four wheel drive which receives rotational power from said engine via said transmission mechanism and which provides said rotational power to the combination of the front wheels of said vehicle and also to the combination of the rear wheels of said vehicle, said power distribution device for four wheel drive comprising a means for providing differential action between said combination of said front wheels of said vehicle and said combination of said rear wheels of said vehicle, and a means for selectively inhibiting its said differential action by providing torque transmission capacity:
  a slippage control device, comprising:
  (a) a means for estimating the torque being input to said power distribution device for four wheel drive from said transmission mechanism; and:
  (b) a means for controlling the torque transmission capacity of said differential action inhibition means of said power distribution device for four wheel drive according to the thus estimated value of said torque being input to said power distribution device for four wheel drive from said transmission mechanism.

2. A slippage control device according to claim 1, said transmission mechanism being selectively engagable to one or another of at least two speed stages, wherein said means for controlling said torque transmission capacity of said differential action inhibition means of said power distribution device for four wheel drive further does so according to the currently engaged speed stage of said transmission mechanism.

3. A slippage control device according to claim 2, wherein, for the same value of torque being input to said power distribution device for four wheel drive from said transmission mechanism, the lower is the currently engaged speed stage of said transmission mechanism, the higher does said means for controlling the torque transmission capacity of said differential action inhibition means of said power distribution device for four wheel drive thus control said torque transmission capacity to be.

4. A slippage control device according to claim 2, wherein said means for controlling the torque transmission capacity of said differential action inhibition means of said power distribution device for four wheel drive functions so as to increase the rate of increase of said torque transmission capacity with respect to increase of torque being input to said power distribution device for four wheel drive from said transmission mechanism, along with said increase of said input torque.

5. A slippage control device according to claim 2, wherein said means for controlling the torque transmission capacity of said differential action inhibition means of said power distribution device for four wheel drive controls said torque transmission capacity to be relatively small, when said torque being input to said power distribution device for four wheel drive from said transmission mechanism is relatively small.

6. A slippage control device according to claim 5, wherein said means for controlling the torque transmission capacity of said differential action inhibition means of said power distribution device for four wheel drive controls of said torque transmission capacity to be substantially zero, when said torque being input to said power distribution device for four wheel drive from said transmission mechanism is such as indicates the idling engine load operational condition.

7. A slippage control device according to claim 1, wherein said means for controlling the torque transmission capacity of said differential action inhibition means of said power distribution device for four wheel drive functions so as to increase said torque transmission capacity along with increase of torque being input to said power distribution device for four wheel drive from said transmission mechanism.

8. A slippage control device according to claim 1, wherein said means for controlling the torque transmission capacity of said differential action inhibition means of said power distribution device for four wheel drive controls said differential action inhibition means to be substantially locked up and to have an effectively infinite torque transmission capacity, when said torque being input to said power distribution device for four wheel drive from said transmission mechanism is less than a determinate value; and on the other hand controls said differential action inhibition means to be at least somewhat incompletely engaged and to have a limited torque transmission capacity, when said torque being input to said power distribution device for four wheel drive from said transmission mechanism is greater than said determinate value.

9. A slippage control device according to claim 1, wherein said means for controlling the torque transmission capacity of said differential action inhibition means of said power distribution device for four wheel drive controls said torque transmission capacity to be a determinate non zero value, when said torque being input to said power distribution device for four wheel drive from said transmission mechanism is substantially zero.

10. A slippage control device according to claim 9, wherein, as said torque being input to said power distribution device for four wheel drive from said transmission mechanism increases from substantially zero, said means for controlling the torque transmission capacity of said differential action inhibition means of said power distribution device for four wheel drive controls said torque transmission capacity to be increased.

11. A slippage control device according to claim 1, said two front wheels of said vehicle being steering wheels thereof, wherein said means for controlling the torque transmission capacity of said differential action inhibition means of said power distribution device for four wheel drive so controls said torque transmission capacity as to prevent said two front vehicle wheels from slippage.

12. A slippage control device according to claim 11, wherein said means for controlling the torque transmission capacity of said differential action inhibition means of said power distribution device for four wheel drive controls said torque transmission capacity in a manner substantially proportional to said torque being input to said power distribution device for four wheel drive from said transmission mechanism.

13. A slippage control device according to claim 12, wherein the proportionality constant by which said means for controlling the torque transmission capacity of said differential action inhibition means of said power distribution device for four wheel drive controls said torque transmission capacity thereof in relation to said torque being input to said power distribution device for four wheel drive from said transmission mechanism is varied according to manual control.

14. A slippage control device according to claim 1, said transmission mechanism being of a continuously variable type, wherein the torque transmission capacity of said differential action inhibition means of said power distribution device for four wheel drive is controlled according to the estimated value of torque being input to said power distribution device for four wheel drive from said transmission mechanism and according to the speed ratio currently being provided by said transmission mechanism.

15. A slippage control device according to claim 1, further comprising a means for detecting the coefficient of friction of the road surface on which said vehicle is running, wherein the torque transmission capacity of said differential action inhibition means of said power distribution device for four wheel drive is controlled according to the thus detected value of road surface coefficient of friction, so as to be relatively higher when said coefficient of friction is low and to be relatively lower when said coefficient of friction is high.

16. A slippage control device according to claim 1, further comprising a means for detecting the external temperature, wherein the torque transmission capacity of said differential action inhibition means of said power distribution device for four wheel drive is controlled according to the thus detected value of external temperature, so as to be relatively higher when said external temperature is low and so as to be relatively lower when said external temperature is high.

17. A slippage control device according to claim 16, wherein said torque transmission capacity of said differential action inhibition means of said power distribution device for four wheel drive is controlled according to the thus detected value of external temperature, so as to be relatively higher when said external temperature is below approximately 0° C. and so as to be relatively lower when said external temperature is higher than approximately 0° C.

18. A slippage control device according to claim 16, further comprising a means for detecting external precipitation conditions, wherein said torque transmission capacity of said differential action inhibition means of said power distribution device for four wheel drive is further controlled according to the thus detected external precipitation conditions, so as to be relatively higher when external precipitation is occurring and so as to be relatively lower when external precipitation is not occurring.

19. A slippage control device according to claim 18, wherein said means for detecting external precipitation conditions is a wiper motor switch.

20. A slippage control device according to claim 1, further comprising a means for detecting external precipitation conditions, wherein said torque transmission capacity of said differential action inhibition means of said power distribution device for four wheel drive is further controlled according to the thus detected external precipitation conditions, so as to be relatively higher when external precipitation is occurring and so as to be relatively lower when external precipitation is not occurring.

21. A slippage control device according to claim 20, wherein said means for detecting external precipitation conditions is a wiper motor switch.

22. A slippage control device according to claim 21, wherein said torque transmission capacity of said differential action inhibition means of said power distribution device for four wheel drive is further controlled according to the wiper speed set on said wiper switch, so as to be relatively higher when a relatively higher wiper speed is set and so as to be relativley lower when a relatively lower wiper speed is set.

23. A slippage control device according to claim 21, wherein said torque transmission capacity of said differential action inhibition means of said power distribution device for four wheel drive is only so controlled, when said wiper switch has been set for at least a certain time interval.

24. A slippage control device according to claim 1, further comprising a means for detecting temperature of lubricant being supplied to said differential action inhibition means of said power distribution device for four wheel drive, wherein said differential action inhibition means is further controlled according to the thus detected temperature of lubricant supplied thereto.

25. For a four wheel drive power transmission system for a vehicle with two front wheels, two rear wheels, a transmission mechanism, and an engine, comprising a power distribution device for four wheel drive which receives rotational power from said engine via said transmission mechanism and which provides said rotational power to the combination of the front wheels of said vehicle and also to the combination of the rear wheels of said vehicle, said power distribution device for four wheel drive comprising a means for providing differential action between said combination of said front wheels of said vehicle and said combination of said rear wheels of said vehicle, and a means for selectively inhibiting its said differential action by providing torque transmission capacity;

a slippage control method, wherein:

(a) the torque being input to said power distribution device for four wheel drive from said transmission mechanism is estimated; and:

(b) the torque transmission capacity of said differential action inhibition means of said power distribution device for four wheel drive is controlled according to the thus estimated value of said torque being input to said power distribution device for four wheel drive from said transmission mechanism.

26. A slippage control method according to claim 25, said transmission mechanism being selectively engagable to one or another of at least two speed stages, wherein said torque transmission capacity of said differential action inhibition means of said power distribution device for four wheel drive is further controlled according to the currently engaged speed stage of said transmission mechanism.

27. A slippage control method according to claim 26, wherein, for the same value of torque being input to said power distribution device for four wheel drive from said transmission mechanism, the lower is the currently engaged speed stage of said transmission mechanism, the higher does said means for controlling the torque transmission capacity of said differential action inhibition means of said power distribution device for four wheel drive thus control said torque transmission capacity to be.

28. A slippage control method according to claim 26, wherein said means for controlling the torque transmission capacity of said differential action inhibition means of said power distribution device for four wheel drive functions so as to increase the rate of increase of said torque transmission capacity with respect to increase of torque being input to said power distribution device for four wheel drive from said transmission mechanism, along with said increase of said input torque.

29. A slippage control method according to claim 26, wherein said means for controlling the torque transmission capacity of said differential action inhibition means of said power distribution device for four wheel drive controls said torque transmission capacity to be relatively small, when said torque being input to said power distribution device for four wheel drive from said transmission mechanism is relatively small.

30. A slippage control method according to claim 29, wherein said means for controlling the torque transmission capacity of said differential action inhibition means of said power distribution device for four wheel drive controls said torque transmission capacity to be substantially zero, when said torque being input to said power distribution device for four wheel drive from said transmission mechanism is such as indicates the idling engine load operational condition.

31. A slippage control method according to claim 25, wherein said means for controlling the torque transmission capacity of said differential action inhibition means of said power distribution device for four wheel drive functions so as to increase said torque transmission capacity along with increase of torque being input to said power distribution device for four wheel drive from said transmission mechanism.

32. A slippage control method according to claim 25, wherein said means for controlling the torque transmission capacity of said differential action inhibition means of said power distribution device for four wheel drive controls said differential action inhibition means to be substantially locked up and to have an effectively infinite torque transmission capacity, when said torque being input to said power distribution device for four wheel drive from said transmission mechanism is less than a determinate value; and on the other hand controls said differential action inhibition means to be at least somewhat incompletely engaged and to have a limited torque transmission capacity, when said torque being input to said power distribution device for four wheel drive from said transmission mechanism is greater than said determinate value.

33. A slippage control method according to claim 25, wherein said means for controlling the torque transmission capacity of said differential action inhibition means of said power distribution device for four wheel drive controls said torque transmission capacity to be a determinate non zero value, when said torque being input to said power distribution device for four wheel drive from said transmission mechanism is substantially zero.

34. A slippage control method according to claim 33, wherein, as said torque being input to said power distribution device for four wheel drive from said transmission mechanism increases from substantially zero, said means for controlling the torque transmission capacity of said differential action inhibition means of said power distribution device for four wheel drive controls said torque transmission capacity to be increased.

35. A slippage control method according to claim 25, said two front wheels of said vehicle being steering wheels thereof, wherein said means for controlling the torque transmission capacity of said differential action inhibition means of said power distribution device for four wheel drive so controls said torque transmission capacity as to prevent said two front vehicle wheels from slippage.

36. A slippage control method according to claim 35, wherein said means for controlling the torque transmission capacity of said differential action inhibition means of said power distribution device for four wheel drive controls said torque transmission capacity in a manner substantially proportional to said torque being input to said power distribution device for four wheel drive from said transmission mechanism.

37. A slippage control method according to claim 36, wherein the proportionality constant by which said means for controlling the torque transmission capacity of said differential action inhibition means of said power distribution device for four wheel drive controls said torque transmission capacity thereof in relation to said torque being input to said power distribution device for four wheel drive from said transmission mechanism is varied according to manual control.

38. A slippage control method according to claim 25, said transmission mechanism being of a continuously variable type, wherein the torque transmission capacity of said differential action inhibition means of said power distribution device for four wheel drive is controlled according to the estimated value of torque being input to said power distribution device for four wheel drive from said transmission mechanism and according to the speed ratio currently being provided by said transmission mechanism.

39. A slippage control method according to claim 25, wherein further the coefficient of friction of the road surface on which said vehicle is running is detected, and wherein the torque transmission capacity of said differential action inhibition means of said power distribution device for four wheel drive is controlled according to the thus detected value of road surface coefficient of friction, so as to be relatively higher when said coefficient of friction is low and to be relatively lower when said coefficient of friction is high.

40. A slippage control method according to claim 25, wherein the torque transmission capacity of said differential action inhibition means of said power distribution device for four wheel drive is controlled according to the detected value of external temperature, so as to be relatively higher when said external temperature is low and so as to be relatively lower when said external temperature is high.

41. A slippage control method according to claim 40, wherein said torque transmission capacity of said differential action inhibition means of said power distribution device for four wheel drive is controlled according to the detected value of external temperature, so as to be relatively higher when said external temperature is below approximately 0° C. and so as to be relatively lower when said external temperature is higher than approximately 0° C.

42. A slippage control method according to claim 40, wherein further external precipitation conditions are detected, and wherein said torque transmission capacity of said differential action inhibition means of said power distribution device for four wheel drive is further controlled according to the thus detected external conditions, so as to be relatively higher when external precipitation is occurring and so as to be relatively lower when external precipitation is not occurring.

43. A slippage control method according to claim 42, wherein external precipitation conditions are detected according to the setting of a wiper motor switch.

44. A slippage control method according to claim 25, wherein further external precipitation conditions are detected, and wherein said torque transmission capacity of said differential action inhibition means of said power distribution device for four wheel drive is further controlled according to the thus detected external precipitation conditions, so as to be relatively higher when external precipitation is occurring and so as to be relatively lower when external precipitation is not occurring.

45. A slippage control method according to claim 44, wherein said external precipitation conditions are detected according to the setting of a wiper motor switch.

46. A slippage control method according to claim 45, wherein said torque transmission capacity of said differential action inhibition means of said power distribution device for four wheel drive is further controlled according to the wiper speed set on said wiper switch, so as to be relatively higher when a relatively higher wiper speed is set and so as to be relatively lower when a relatively lower wiper speed is set.

47. A slippage control method according to claim 45, wherein said torque transmission capacity of said differential action inhibition means of said power distribution device for four wheel drive is only so controlled, when said wiper switch has been set for at least a certain time interval.

48. A slippage control method according to claim 25, wherein further the temperature of lubricant being supplied to said differential action inhibition means of said power distribution device for four wheel drive is detected, and wherein said differential action inhibition means is further controlled according to the thus detected temperature of lubricant supplied thereto.

* * * * *